(12) United States Patent
Orcutt et al.

(10) Patent No.: US 12,554,156 B2
(45) Date of Patent: Feb. 17, 2026

(54) FOLDABLE APPARATUS AND METHODS OF MAKING

(71) Applicant: CORNING INCORPORATED, Corning, NY (US)

(72) Inventors: Timothy James Orcutt, Corning, NY (US); Michael William Price, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 178 days.

(21) Appl. No.: 18/027,459

(22) PCT Filed: Sep. 21, 2021

(86) PCT No.: PCT/US2021/051281
§ 371 (c)(1),
(2) Date: Mar. 21, 2023

(87) PCT Pub. No.: WO2022/066629
PCT Pub. Date: Mar. 31, 2022

(65) Prior Publication Data
US 2023/0370535 A1   Nov. 16, 2023

Related U.S. Application Data

(60) Provisional application No. 63/083,782, filed on Sep. 25, 2020.

(51) Int. Cl.
*G02F 1/1333* (2006.01)
*G06F 1/16* (2006.01)
*H04M 1/02* (2006.01)

(52) U.S. Cl.
CPC ...... *G02F 1/133305* (2013.01); *G06F 1/1616* (2013.01); *H04M 1/0216* (2013.01)

(58) Field of Classification Search
CPC .................................................. G02F 1/133305
(Continued)

(56) References Cited

U.S. PATENT DOCUMENTS 3,880,632 A   4/1975   Podvigalkina et al.
5,846,638 A   12/1998  Meissner
(Continued)

FOREIGN PATENT DOCUMENTS

CN   105016632 A   11/2015
CN   107876112 A   4/2018
(Continued)

OTHER PUBLICATIONS

Cocheteau et al., "Experimental Characterization and Multi-Physic Modelling of Direct Bonding Mechanical Behaviour: Application to Spatial Optical System", 13th European Conference On Spacecraft Structures, Materials & Environmental Testing, 2014, pp. 1-6.
(Continued)

*Primary Examiner* — Katherine A Christy

(57) ABSTRACT

Foldable apparatus comprise a foldable substrate comprising a substrate layer comprising a first major surface contacting a first inner surface area of a first portion. The first major surface of the substrate layer contacts a second inner surface area of a second portion. The first portion and the second portion are separated by a minimum distance. In aspects, the first portion and/or the second portion is directly bonded to the first major surface. In aspects, the substrate layer is chemically strengthened. In aspects, the first portion and/or the second portion are unstrengthened. Methods comprise contacting at least the first major surface of the substrate layer with a hydroxide-containing solution. Methods comprise forming a foldable substrate by disposing the first
(Continued)

portion over the first major surface, disposing the second portion over the first major surface, and then heating the foldable substrate.

8 Claims, 13 Drawing Sheets

(58) Field of Classification Search
USPC .......................................................... 428/12
See application file for complete search history.

(56) References Cited

U.S. PATENT DOCUMENTS

| | | | |
|---|---|---|---|
| 6,548,176 | B1 | 4/2003 | Gwo |
| 7,387,944 | B2 | 6/2008 | Tong et al. |
| 8,854,623 | B2 | 10/2014 | Fontaine et al. |
| 9,321,647 | B2 | 4/2016 | Moody et al. |
| 10,459,174 | B2 | 10/2019 | Mathai et al. |
| 10,551,880 | B1 | 2/2020 | Ai et al. |
| 2009/0294050 | A1 | 12/2009 | Traggis et al. |
| 2010/0167091 | A1 | 7/2010 | Tachiwana et al. |
| 2013/0309448 | A1* | 11/2013 | Striegler ............... C03C 17/322 428/425.8 |
| 2015/0185782 | A1 | 7/2015 | Kim et al. |
| 2017/0330926 | A1 | 11/2017 | Tang |
| 2019/0011954 | A1* | 1/2019 | Chu ........................ B32B 17/06 |
| 2020/0001577 | A1* | 1/2020 | Woody, V ............. B32B 27/281 |
| 2020/0013765 | A1 | 1/2020 | Fountain, Jr. et al. |
| 2021/0107251 | A1 | 4/2021 | Chen et al. |
| 2021/0107829 | A1 | 4/2021 | Chen et al. |

FOREIGN PATENT DOCUMENTS

| | | |
|---|---|---|
| JP | 3453822 B2 | 10/2003 |
| KR | 10-2018-0101514 A | 9/2018 |
| WO | 2017/087745 A1 | 5/2017 |

OTHER PUBLICATIONS

Cocheteau et al., "Influence Of Roughness On Mechanical Strength Of Direct Bonded Silica And Zerodur® Glasses", International Journal Of Adhesion & Adhesives, vol. 68, 2016, pp. 87-94.

Navarro, "Direct Wafer Bonding Dynamics", Mechanics, Universite De Grenoble, 2014, pp. 1-116.

International Search Report and Written Opinion of the International Searching Authority; PCT/US2021/051281; dated Jan. 11, 2022; pp. 14; International Searching Authority.

Korean Patent Application No. 10-2023-7013379, Office Action dated Oct. 29, 2025, 4 pages (English Translation only), Korean Patent Office.

* cited by examiner

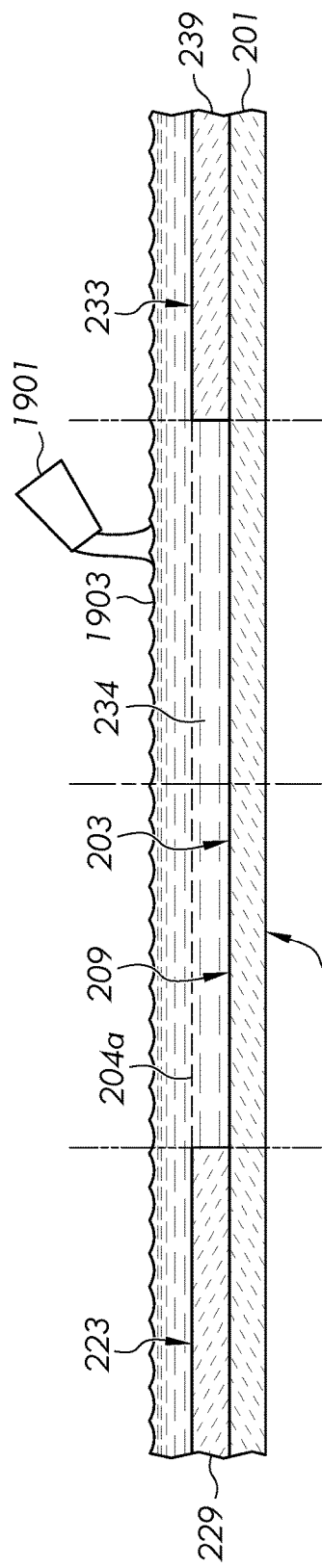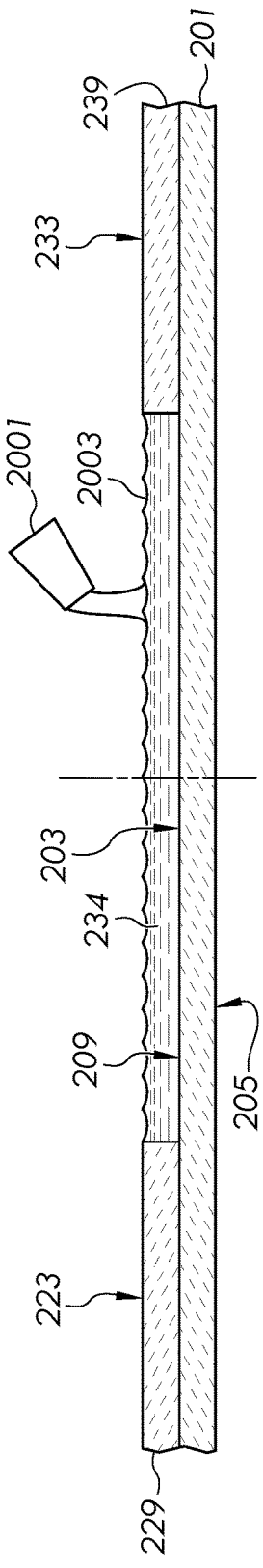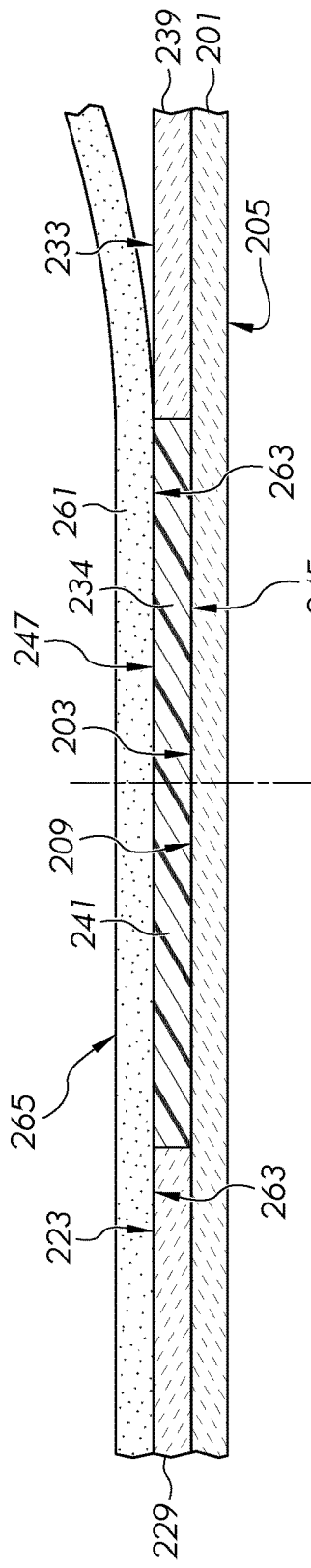

FOLDABLE APPARATUS AND METHODS OF MAKING

CROSS-REFERENCE TO RELATED APPLICATIONS

This application is a national stage entry of International Patent Application Serial No. PCT/US2021/051281, filed on Sep. 21, 2021, which in turn, claims the benefit of priority under 35 U.S.C. § 119 of U.S. Provisional Application Ser. No. 63/083,782 filed on Sep. 25, 2020, the contents of each of which are is relied upon and incorporated herein by reference in its entirety their entireties.

FIELD

The present disclosure relates generally to foldable apparatus and methods of making and, more particularly, to foldable apparatus comprising portions and methods of making foldable substrates.

BACKGROUND

Glass-based substrates are commonly used, for example, in display devices, for example, liquid crystal displays (LCDs), electrophoretic displays (EPD), organic light-emitting diode displays (OLEDs), plasma display panels (PDPs), or the like.

There is a desire to develop foldable versions of displays as well as foldable protective covers to mount on foldable displays. Foldable displays and covers should have good impact and puncture resistance. At the same time, foldable displays and covers should have small minimum bend radii (e.g., about 10 millimeters (mm) or less). However, plastic displays and covers with small minimum bend radii tend to have poor impact and/or puncture resistance. Furthermore, conventional wisdom suggests that ultra-thin glass-based sheets (e.g., about 75 micrometers (μm or microns) or less thick) with small minimum bend radii tend to have poor impact and/or puncture resistance. Furthermore, thicker glass-based sheets (e.g., greater than 125 micrometers) with good impact and/or puncture resistance tend to have relatively large minimum bend radii (e.g., about 30 millimeters or more). Consequently, there is a need to develop foldable apparatus that have low minimum bend radii and good impact and puncture resistance.

SUMMARY

There are set forth herein foldable apparatus comprising foldable substrates, foldable substrates, and methods of making foldable apparatus comprising foldable substrates and foldable substrates that comprise a substrate layer, a first portion, and a second portion. The portions can comprise glass-based and/or ceramic-based portions, which can provide good dimensional stability, reduced incidence of mechanical instabilities, good impact resistance, and/or good puncture resistance. In aspects, the first portion and/or the second portion can comprise glass-based portions and/or ceramic-based portions comprising one or more compressive stress regions, which can further provide increased impact resistance and/or increased puncture resistance. In aspects, the first portion and/or the second portion may be substantially unstrengthened (e.g., low or substantially no compressive stress region associated with chemically strengthening of the corresponding portion), which can increase pen drop performance of the foldable substrate. The substrate layer can comprise a glass-based portion and/or a ceramic-based portion, which can provide good dimensional stability, reduced incidence of mechanical instabilities, good impact resistance, and/or good puncture resistance. The substrate layer can comprise a glass-based substrate and/or a ceramic-based substrate comprising one or more compressive stress regions, which can further provide increased impact resistance and/or increased puncture resistance. By providing a foldable substrate comprising a glass-based material and/or ceramic-based material, the foldable substrate can also provide increased impact resistance and/or puncture resistance while simultaneously facilitating good folding performance. In aspects, the substrate thickness can be sufficiently large (e.g., from about 80 micrometers (microns or μm) to about 2 millimeters) to further enhance impact resistance and puncture resistance. Providing foldable substrates comprising a central region comprising a layer thickness that is less than a substrate thickness can enable small effective minimum bend radii (e.g., about 10 millimeters or less) based on the reduced thickness in the central region.

In aspects, the foldable apparatus and/or foldable substrates can comprise a recess, for example, a first central surface area recessed from a first outer surface area by a first distance. Providing a recess can enable the layer thickness to be less than the substrate thickness. Controlling properties of a first material positioned in a recess and a second material positioned in a second recess can control the position of a neutral axis of the foldable apparatus and/or foldable substrates, which can reduce (e.g., mitigate, eliminate) the incidence of mechanical instabilities, apparatus fatigue, and/or apparatus failure.

In aspects, the foldable apparatus and/or foldable substrates can comprise a first transition portion attaching the central region to the first region and/or a second transition region attaching the central region to the second region. Providing transition regions with continuously increasing thicknesses can reduce stress concentration in the transition regions and/or avoid optical distortions. Providing a sufficient length of the transition region(s) (e.g., about 1 mm or more) can avoid optical distortions that may otherwise exist from an abrupt, stepped change in thickness of the foldable substrate. Providing a sufficiently small length of the transition regions (e.g., about 5 mm or less) can reduce the amount of the foldable apparatus and/or foldable substrates having an intermediate thickness that may have reduced impact resistance and/or reduced puncture resistance.

Apparatus and methods of aspects of the disclosure and reduce (e.g., mitigate, eliminate) the incidence of mechanical instabilities, apparatus fatigue, and/or apparatus failure by avoiding a difference between an expansion of different portions of the foldable apparatus and/or the foldable substrates as a result of chemically strengthening the entire foldable substrate. Rather, in aspects, the substrate layer can be chemically strengthened (e.g., prior to assembly with the first portion and the second portion) while the first portion and/or the second portion can be substantially unstrengthened. In aspects, the substrate layer, the first portion, and/or the second portion can be chemically strengthened prior to assembly of the foldable substrate and/or the foldable apparatus. Controlling the difference between the expansion of different portions after assembly can reduce the chemical strengthening induced strain between portions of the foldable apparatus and/or the foldable substrates that can facilitate a greater fold-induced strain before the foldable apparatus and/or foldable substrates reach a critical buckling strain (e.g., onset of mechanical instabilities). Further, reducing mechanical instabilities and/or the difference between the substrate layer and the first portion and/or the second portion can reduce optical distortions, for example, caused by strain within the foldable apparatus and/or foldable substrate from such difference(s).

Directly bonding the first portion to the substrate layer and/or directly bonding the second portion to the substrate layer can provide increased impact resistance, increased puncture resistance, reduced optical distortions, and reduced thickness of the foldable substrate and/or foldable apparatus. Direct bonding can allow the first portion and/or second portion to more directly reinforce the mechanical properties, impact properties, and/or puncture resistance of the substrate layer by having an inner surface area of the first portion and/or the first portion directly contact a surface of the substrate layer. Direct bonding can avoid (e.g., eliminate) the use of an adhesive layer between the first portion and the substrate layer and/or between the second portion and the substrate layer, which reduces the number of interfaces in the foldable substrate and can reduce the incidence of optical distortions. Further, the incidence of optical distortions through direct bonding, which can reduce the incidence of bubbles and other defects by providing a solid connection between the bonded surfaces. Direct bonding can reduce the overall thickness of the foldable substrate and/or foldable apparatus, for example, by avoiding (e.g., eliminating) the use of an adhesive layer between the first portion and the substrate layer and/or between the second portion and the substrate layer. Further, properties of a thinner foldable substrate made using direct bonding can have properties comparable to a thicker foldable substrate generated through other means.

Methods of the disclosure can enable making foldable substrates comprising one or more of the above-mentioned benefits. In aspects, methods of the disclosure can achieve the above-mentioned benefits in a single chemically strengthening step, for example making a foldable substrate comprising a chemically strengthened substrate layer, a substantially unstrengthened first portion, and a substantially unstrengthened second portion or by separately chemically strengthening the substrate layer, first portion, and second portion prior to assembly, either of which can reduce time, equipment, space, and labor costs associated with producing a foldable substrate.

Direct bonding of the first portion and/or the second portion to the substrate layer comprises cleaning at least the surface of the substrate layer to be bonded to provide a low roughness surface that is substantially free of organic materials and particulates, which can produce a strong bond and reduce the incidence of optical distortions. Maintaining the substrate layer, first portion, and/or second portion in a high relative humidity environment (e.g., from about 60% to about 90%, from about 70% to about 80%) can increase a density of hydroxyl groups at the surface, which can increase the resulting bond strength while reducing the incidence of optical distortions. Direct bonding can further comprise disposing the first portion and/or the second portion on the substrate layer such that the first portion and the second portion and separated by a minimum distance that can define a recess, which can enable enhanced folding performance. Direct bonding can further comprise heating the first portion, second portion, and substrate layer for a period of time sufficient to generate a strong bond between the first portion and the substrate layer and between the second portion and the substrate layer. Heating to a temperature in a range from about 150° C. to about 400° C. can enable the formation of strong bonds while avoiding detrimental changes to the foldable substrate for excessive heating (e.g., warping, bonding to the heating apparatus and/or carriers, decomposition, decreased compressive stresses from compressive stress regions extending to deeper depths of compression and/or having deeper associated depths of layer). Providing multiple temperatures in decreasing order can enable a high bond strength while decreasing an extent that the compressive stress of the substrate layer is decreased.

Some example aspects of the disclosure are described below with the understanding that any of the features of the various aspects may be used alone or in combination with one another.

Aspect 1. A foldable substrate comprising:
a substrate layer comprising a first major surface and a second major surface opposite the first major surface, a layer thickness is defined between the first major surface and the second major surface is in a range from about 10 micrometers to about 2 millimeters;
a first portion comprising a first outer surface area and a first inner surface area opposite the first outer surface area, a first thickness is defined between the first outer surface area and the first inner surface area is in a range from about 10 micrometers to about 1 millimeter, and the first inner surface area contacts the first major surface;
a second portion comprising a second outer surface area and a second inner surface area opposite the second outer surface area, a second thickness is defined between the second outer surface area and the second inner surface area is in a range from about 10 micrometers to about 1 millimeter, and the second inner surface area contacts the first major surface,
wherein the first portion is spaced apart from the second portion by a minimum distance in a range from about 1 millimeter to about 100 millimeters, and a substrate thickness is defined between the second major surface and the first outer surface area of the first portion.

Aspect 2. The foldable substrate of aspect 1, wherein the first portion is directly bonded to the first major surface.

Aspect 3. The foldable substrate of any one of aspects 1-2, wherein the second portion is directly bonded to the first major surface.

Aspect 4. The foldable substrate of any one of aspects 1-3, wherein the layer thickness is in a range from about 20 micrometers to about 100 micrometers.

Aspect 5. The foldable substrate of any one of aspects 1-4, wherein the first thickness is in a range from about 20 micrometers to about 150 micrometers.

Aspect 6. The foldable substrate of any one of aspects 1-6, wherein the first thickness is greater than the layer thickness, and/or the minimum distance is in a range from about 10 micrometers to about 50 micrometers.

Aspect 7. The foldable substrate of aspect 2, wherein a bond strength between the first portion and the substrate layer is about 1 Joule per meter squared ($J/m^2$) or more.

Aspect 8. The foldable substrate of any one of aspects 1-7, wherein a bond strength between the second portion and the substrate layer is about 1 Joule per meter squared ($J/m^2$) or more.

Aspect 9. The foldable substrate of any one of aspects 1-8, wherein the foldable substrate achieves a parallel plate distance of 5 millimeters.

Aspect 10. The foldable substrate of any one of aspects 1-8, wherein the foldable substrate comprises a minimum parallel plate distance in a range from 2 millimeters to 10 millimeters.

Aspect 11. The foldable substrate of any one of aspects 1-10, wherein the foldable substrate achieves an effective bend radius of 1.5 millimeters.

Aspect 12. The foldable substrate of any one of aspects 1-11, wherein the foldable substrate can withstand a pen drop height of 40 centimeters or more on the first outer surface area or the second outer surface area.

Aspect 13. The foldable substrate of any one of aspects 1-12, wherein the substrate layer comprises a glass-based substrate.

Aspect 14. The foldable substrate of any one of aspects 1-12, wherein the substrate layer comprises a ceramic-based substrate.

Aspect 15. The foldable substrate of any one of aspects 1-14, wherein the first portion comprises a glass-based substrate, and the second portion comprises a glass-based substrate.

Aspect 16. The foldable substrate of any one of aspects 1-14, wherein the first portion comprises a ceramic-based substrate, and the second portion comprises a ceramic-based substrate.

Aspect 17. The foldable substrate of any one of aspects 1-16, wherein the substrate layer comprises a first compressive stress region extending to a first depth of compression from the first major surface, and the substrate layer comprises a second compressive stress region extending to a second depth of compression from the second major surface.

Aspect 18. The foldable substrate of aspect 17, wherein the first depth of compression is in a range from about 15% to about 25% of the layer thickness.

Aspect 19. The foldable substrate of any one of aspects 17-18, wherein the second depth of compression is in a range from about 15% to about 25% of the layer thickness.

Aspect 20. The foldable substrate of any one of aspects 17-19, wherein a first maximum compressive stress of the first compressive stress region is about 500 MegaPascals or more.

Aspect 21. The foldable substrate of any one of aspects 17-20, wherein a second maximum compressive stress of the second compressive stress region is about 500 MegaPascals or more.

Aspect 22. The foldable substrate of any one of aspects 17-21, wherein the first portion comprises a first unstressed region at the first outer surface area, and the second portion comprises a third unstressed region at the second outer surface area.

Aspect 23. The foldable substrate of any one of aspects 17-21, wherein the first portion comprises a second unstressed region at the first inner surface area, and the second portion comprises a fourth unstressed region at the second outer surface area.

Aspect 24. The foldable substrate of any one of aspects 17-21, wherein the first portion comprises a third compressive stress region extending from the first outer surface area to a third depth of compression, a third depth of layer is associated with the third depth of compression, the third depth of layer is in a range from 0% to about 5% of the first thickness, and the second portion comprises a fifth compressive stress region extending from the second outer surface area to a fourth depth of compression, a fourth depth of layer is associated with the fourth depth of compression, the fourth depth of layer is in a range from 0% to about 5% of the second thickness.

Aspect 25. The foldable substrate of any one of aspects 1-21, wherein the first portion comprises a third compressive stress region extending from the first outer surface area to a third depth of compression in a range from about 15% to about 25% of the first thickness, and the second portion comprises a fifth compressive stress region extending from the second outer surface area to a fifth depth of compression in a range from about 15% to about 25% of the second thickness.

Aspect 26. The foldable substrate of any one of aspects 1-25, wherein a first region of the first major surface of the substrate layer contacting the first inner surface area comprises a first surface roughness Ra of 1 nanometer or less, and a second region of the first major surface of the substrate layer contacting the second inner surface area comprises a second surface roughness Ra of 1 nanometer or less.

Aspect 27. The foldable substrate of aspect 26, wherein the first surface roughness Ra is in a range from about 0.01 nm to about 0.3 nm, and the second surface roughness Ra is in a range from about 0.01 nm to about 0.3 nm.

Aspect 28. The foldable substrate of any one of aspects 1-27, wherein the first inner surface area comprises a third surface roughness Ra of 1 nanometer or less, and the second inner surface area comprises a fourth surface roughness Ra of 1 nanometer or less.

Aspect 29. The foldable substrate of aspect 28, wherein the third surface roughness Ra is in a range from about 0.01 nm to about 0.3 nm, and the fourth surface roughness Ra is in a range from about 0.01 nm to about 0.3 nm.

Aspect 30. The foldable substrate of any one of aspects 1-29, wherein a first region of the first major surface of the substrate layer contacting the first inner surface area comprises a first peak-to-valley measurement of 10 nanometers or less, and a second region of the first major surface of the substrate layer contacting the second inner surface area comprises a second peak-to-valley measurement of 10 nanometers or less.

Aspect 31. The foldable substrate of any one of aspects 1-30, wherein the first inner surface area comprises a third peak-to-valley measurement of about 10 nanometers or less, and the second inner surface area comprises a fourth peak-to-valley measurement of about 10 nanometers or less.

Aspect 32. The foldable substrate of any one of aspects 1-31, wherein the first thickness is substantially equal to the second thickness, a recess is defined between a first plane extending between the first outer surface area and the second outer surface area and a first central surface area of the first major surface positioned between the first portion and the second portion.

Aspect 33. A foldable apparatus comprising the foldable substrate of aspect 32, wherein a coating is positioned in the recess.

Aspect 34. The foldable apparatus of aspect 33, wherein the coating contacts the first outer surface area, the coating contacts the second outer surface area, the coating comprises a third major surface opposite the first outer surface area, and a coating thickness defined between the third major surface and the first outer surface area is in a range from about 0.1 micrometers to about 200 micrometers.

Aspect 35. The foldable apparatus of any one of aspects 33-34, further comprising an adhesive layer disposed over the second major surface of the substrate layer, and the adhesive layer comprising an adhesive thickness defined between a first contact surface and a second contact surface opposite the first contact surface.

Aspect 36. A foldable apparatus comprising the foldable substrate of aspect 32, wherein a polymer-based portion is positioned in the recess.

Aspect 37. The foldable apparatus of aspect 36, further comprising a coating disposed over the second major surface of the substrate layer, the coating comprises a third major surface opposite the second major, and a coating thickness defined between the third major surface and the second major surface is in a range from about 0.1 micrometers to about 200 micrometers.

Aspect 38. The foldable apparatus of aspect 37, further comprising an adhesive layer disposed over the polymer-based portion, the first outer surface area, and the second outer surface area, the adhesive layer comprises a first contact and a second contact surface opposite the first contact surface, and an adhesive thickness is defined between the first contact surface and the second contact surface.

Aspect 39. A foldable apparatus comprising the foldable substrate of aspect 32, wherein an adhesive layer is positioned in the recess.

Aspect 40. The foldable apparatus of aspect 39, further comprising a coating disposed over the second major surface of the substrate layer, the coating comprises a third major surface opposite the second major, and a coating thickness defined between the third major surface and the second major surface is in a range from about 0.1 micrometers to about 200 micrometers.

Aspect 41. The foldable apparatus of any one of aspects 39-40, wherein the adhesive layer contacts the first outer surface area and the second outer surface area, the adhesive layer comprises a first contact surface opposite the second contact surface, the second contact surface contacts the first outer surface area, and an adhesive thickness defined between the first outer surface area and the first contact surface.

Aspect 42. The foldable apparatus of aspect 35, aspect 38, or aspect 41, wherein the adhesive thickness is in a range from about 1 micrometer to about 30 micrometers.

Aspect 43. The foldable apparatus of aspect 35, aspect 38, aspect 41, or aspects 42, further comprising a release liner disposed over the first contact surface of the adhesive layer.

Aspect 44. The foldable apparatus of aspect 35, aspect 38, aspect 41, or aspect 42, further comprising a display device disposed over the first contact surface of the adhesive.

Aspect 45. A consumer electronic product, comprising:
a housing comprising a front surface, a back surface, and side surfaces;
electrical components at least partially within the housing, the electrical components comprising a controller, a memory, and a display, the display at or adjacent the front surface of the housing; and
a cover substrate disposed over the display,
wherein at least one of a portion of the housing or the cover substrate comprises the foldable substrate of any one of aspects 1-32 or the foldable apparatus of any one of aspects 33-44.

Aspect 46. A method of making a foldable substrate comprising:
contacting at least a first major surface of a substrate layer with a hydroxide-containing solution, the substrate layer comprising a layer thickness defined between the first major surface and a second major surface opposite the first major surface;
disposing a first portion on the first major surface, the first portion comprising a first thickness defined between a first outer surface area and a first inner surface area opposite the first outer surface area, the first inner surface area contacting the first major surface;
disposing a second portion on the first major surface, the second portion comprising a second thickness defined between a second outer surface area and a second inner surface area opposite the second outer surface area, the second inner surface area contacting the first major surface; and
heating the substrate layer, the first portion, and the second portion at a first temperature in a range from about 100° C. to about 400° C. for a first period of time ranging from about 1 hour to about 24 hours,
wherein the first portion is spaced apart from the second portion by a minimum distance in a range from about 1 millimeter to about 100 millimeters.

Aspect 47. The method of aspect 46, wherein the first temperature is in a range from about 140° C. to about 200° C.

Aspect 48. The method of any one of aspects 46-47, wherein the first period of time is in a range from about 4 hours to about 8 hours.

Aspect 49. The method of aspect 46, further comprising, after the heating the substrate layer, the first portion, and the second portion at the first temperature, heating the substrate layer, the first portion, and the second portion at a second temperature in a range from about 100° C. to about 300° C. for a second period of time ranging from about 3 hours to about 12 hours, wherein the second temperature is less than the first temperature by about 25° C. or more.

Aspect 50. The method of any one of aspects 46-49, wherein the hydroxide-containing solution comprises a pH in a range from about 9 to 12.

Aspect 51. The method of any one of aspects 46-50, wherein the hydroxide-containing solution comprises a temperature in a range from about 40° C. to about 80° C.

Aspect 52. The method of any one of aspects 46-51, wherein the hydroxide-containing solution is in contact with at least the first major surface from about 8 minutes to about 15 minutes.

Aspect 53. The method of any one of aspects 46-52, further comprising:
chemically strengthening the substrate layer before contacting at least the first major surface of the substrate layer with the hydroxide-containing solution, chemically strengthening the substrate layer forms a first compressive stress region extending to a first depth of compression from the first major surface and a second compressive stress region extending to a second depth of compression from the second major surface.

Aspect 54. The method of aspect 53, wherein the first depth of compression is in a range from about 15% to about 25% of the layer thickness, and the second depth of compression is in a range from about 15% to about 25% of the layer thickness.

Aspect 55. The method of any one of aspects 53-54, wherein a first maximum compressive stress of the first compressive stress region is about 500 MegaPascals or more.

Aspect 56. The method of any one of aspects 53-55, wherein a second maximum compressive stress of the second compressive stress region is about 500 MegaPascals or more.

Aspect 57. The method of any one of aspects 53-56, wherein the first portion comprises a first unstressed region at the first outer surface area, and the second portion comprises a third unstressed region at the second outer surface area.

Aspect 58. The method of any one of aspects 53-57, wherein the first portion comprises a second unstressed region at the first inner surface area, and the second portion comprises a fourth unstressed region at the second outer surface area.

Aspect 59. The method of any one of aspects 53-56, wherein the first portion comprises a third compressive stress region extending from the first outer surface area to a third depth of compression, a third depth of layer is associated with the third depth of compression, the third depth of layer is in a range from 0% to about 5% of the first thickness, and the second portion comprises a fifth compressive stress region extending from the second outer surface area to a fourth depth of compression, a fourth depth of layer is associated with the fourth depth of compression, the fourth depth of layer is in a range from 0% to about 5% of the second thickness.

Aspect 60. The method of any one of aspects 53-56, wherein the first portion comprises a third compressive stress region extending from the first outer surface area to a third depth of compression in a range from about 15% to about 25% of the first thickness, and the second portion comprises a fifth compressive stress region extending from the second outer surface area to a fifth depth of compression in a range from about 15% to about 25% of the second thickness.

Aspect 61. The method of any one of aspects 46-60, wherein a first region of the first major surface of the substrate layer contacting the first inner surface area comprises a first surface roughness Ra of 1 nanometer or less, and a second region of the first major surface of the substrate layer contacting the second inner surface area comprises a second surface roughness Ra of 1 nanometer or less.

Aspect 62. The method of aspect 61, wherein the first surface roughness Ra is in a range from about 0.01 nm to about 0.3 nm, and the second surface roughness Ra is in a range from about 0.01 nm to about 0.3 nm.

Aspect 63. The method of any one of aspects 46-62, wherein the first inner surface area comprises a third surface roughness Ra of 1 nanometer or less, and the second inner surface area comprises a fourth surface roughness Ra of 1 nanometer or less.

Aspect 64. The method of aspect 63, wherein the third surface roughness Ra is in a range from about 0.01 nm to about 0.3 nm, and the fourth surface roughness Ra is in a range from about 0.01 nm to about 0.3 nm.

Aspect 65. The method of any one of aspects 46-64, wherein a first region of the first major surface of the substrate layer contacting the first inner surface area comprises a first peak-to-valley measurement of 10 nanometers or less, and a second region of the first major surface of the substrate layer contacting the second inner surface area comprises a second peak-to-valley measurement of 10 nanometers or less.

Aspect 66. The method of any one of aspects 46-65, wherein the first inner surface area comprises a third peak-to-valley measurement of about 10 nanometers or less, and the second inner surface area comprises a fourth peak-to-valley measurement of about 10 nanometers or less.

Aspect 67. The method of any one of aspects 46-66, wherein the first thickness is substantially equal to the second thickness, and a recess is defined between a first plane extending between the first outer surface area and the second outer surface area and a first central surface area of the first major surface positioned between the first portion and the second portion.

Aspect 68. The method of any one of aspects 46-67, further comprising, after the contacting at least a first major surface of a substrate layer with a hydroxide-containing solution but before the disposing the first portion or the second portion on the first major surface, maintaining the substrate layer, first portion, and second portion in an environment comprising a relative humidity from about 70% to about 80% at a temperature from about 20° C. to about 80° C. for about 1 hour or more.

Aspect 69. The method of any one of aspects 46-68, wherein the layer thickness is in a range from about 20 micrometers to about 100 micrometers.

Aspect 70. The method of any one of aspects 46-69, wherein the first thickness is in a range from about 20 micrometers to about 150 micrometers.

Aspect 71. The method of any one of aspects 46-70, wherein the first thickness is greater than the layer thickness, and/or the minimum distance is in a range from about 10 micrometers to about 50 micrometers.

Aspect 72. The method of any one of aspects 46-71, wherein after the heating, a bond strength between the first portion and the substrate layer is about 1 Joule per meter squared ($J/m^2$) or more.

Aspect 73. The method of any one of aspects 46-72, wherein after the heating, a bond strength between the second portion and the substrate layer is about 1 Joule per meter squared ($J/m^2$) or more.

Aspect 74. The method of any one of aspects 46-73, wherein the foldable substrate achieves a parallel plate distance of 5 millimeters.

Aspect 75. The method of any one of aspects 46-73, wherein the foldable substrate achieves a minimum parallel plate distance in a range from 2 millimeters to 10 millimeters.

Aspect 76. The method of any one of aspects 46-75, wherein the foldable substrate achieves an effective bend radius of 1.5 millimeters.

Aspect 77. The method of any one of aspects 46-76, wherein the foldable substrate can withstand a pen drop height of 40 centimeters or more on the first outer surface area or the second outer surface area.

Aspect 78. The method of any one of aspects 46-77, wherein the substrate layer comprises a glass-based substrate.

Aspect 79. The method of any one of aspects 46-77, wherein the substrate layer comprises a ceramic-based substrate.

Aspect 80. The method of any one of aspects 46-79, wherein the first portion comprises a glass-based substrate and the second portion comprises a glass-based substrate.

Aspect 81. The method of any one of aspects 46-79, wherein the first portion comprises a ceramic-based substrate and the second portion comprises a ceramic-based substrate.

Aspect 82. A method of making a foldable apparatus comprising the method of any one of aspects 46-81, the method further comprising:
 disposing a first liquid in a recess defined between a first plane extending between the first outer surface area and the second outer surface area and a first central surface area of the first major surface positioned between the first portion and the second portion; and
 curing the first liquid to form a coating.

Aspect 83. A method of making a foldable apparatus comprising the method of any one of aspects 46-81, the method further comprising:
 disposing an adhesive liquid in a recess defined between a first plane extending between the first outer surface area and the second outer surface area and a first central surface area of the first major surface positioned between the first portion and the second portion; and
 curing the adhesive liquid to form an adhesive layer.

Aspect 84. A method of making a foldable apparatus comprising the method of any one of aspects 46-81, the method further comprising:

disposing a second liquid in a recess defined between a first plane extending between the first outer surface area and the second outer surface area and a first central surface area of the first major surface positioned between the first portion and the second portion; and curing the second liquid to form a polymer-based portion.

BRIEF DESCRIPTION OF THE DRAWINGS

The above and other features and advantages of aspects of the present disclosure are better understood when the following detailed description is read with reference to the accompanying drawings, in which:

FIGS. 12-21 schematically illustrate steps in methods of making a foldable substrate and/or foldable apparatus in accordance with aspects of the disclosure;

Figure 1:
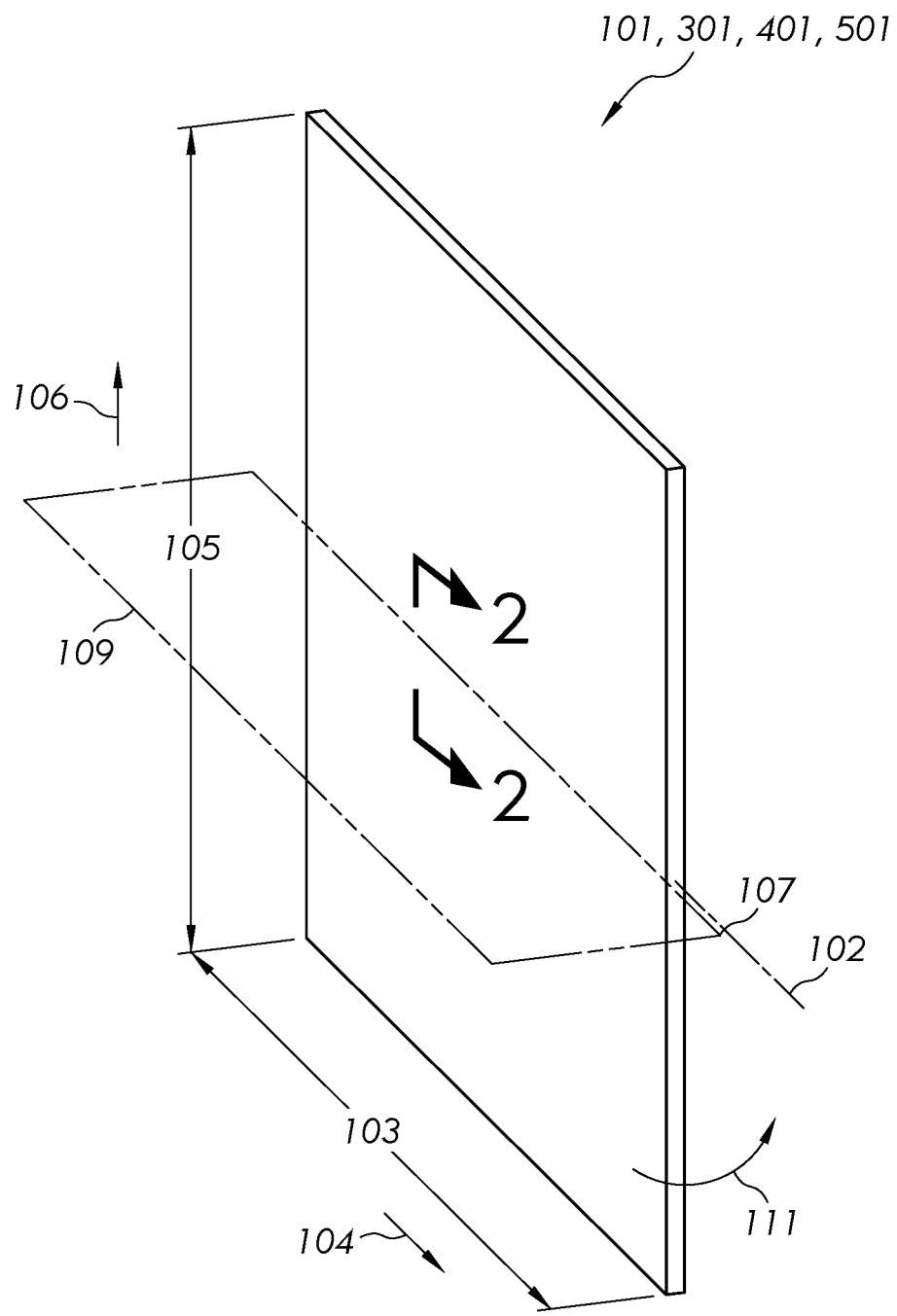
FIG. 1 is a schematic view of an example foldable apparatus in a flat configuration according to aspects, wherein a schematic view of the folded configuration may appear as shown in FIG. 6.

Throughout the disclosure, the drawings are used to emphasize certain aspects. As such, it should not be assumed that the relative size of different regions, portions, and substrates shown in the drawings are proportional to its actual relative size, unless explicitly indicated otherwise.

DETAILED DESCRIPTION

Aspects will now be described more fully hereinafter with reference to the accompanying drawings in which example aspects are shown. Whenever possible, the same reference numerals are used throughout the drawings to refer to the same or like parts.

FIGS. 1-8 illustrate views of foldable apparatus 101, 301, 401, 501, 701, and 801 comprising a foldable substrate 206 in accordance with aspects of the disclosure. Unless otherwise noted, a discussion of features of aspects of one foldable apparatus can apply equally to corresponding features of any aspects of the disclosure. For example, identical part numbers throughout the disclosure can indicate that, in some aspects, the identified features are identical to one another and that the discussion of the identified feature of one aspect, unless otherwise noted, can apply equally to the identified feature of any of the other aspects of the disclosure.

Figure 2:
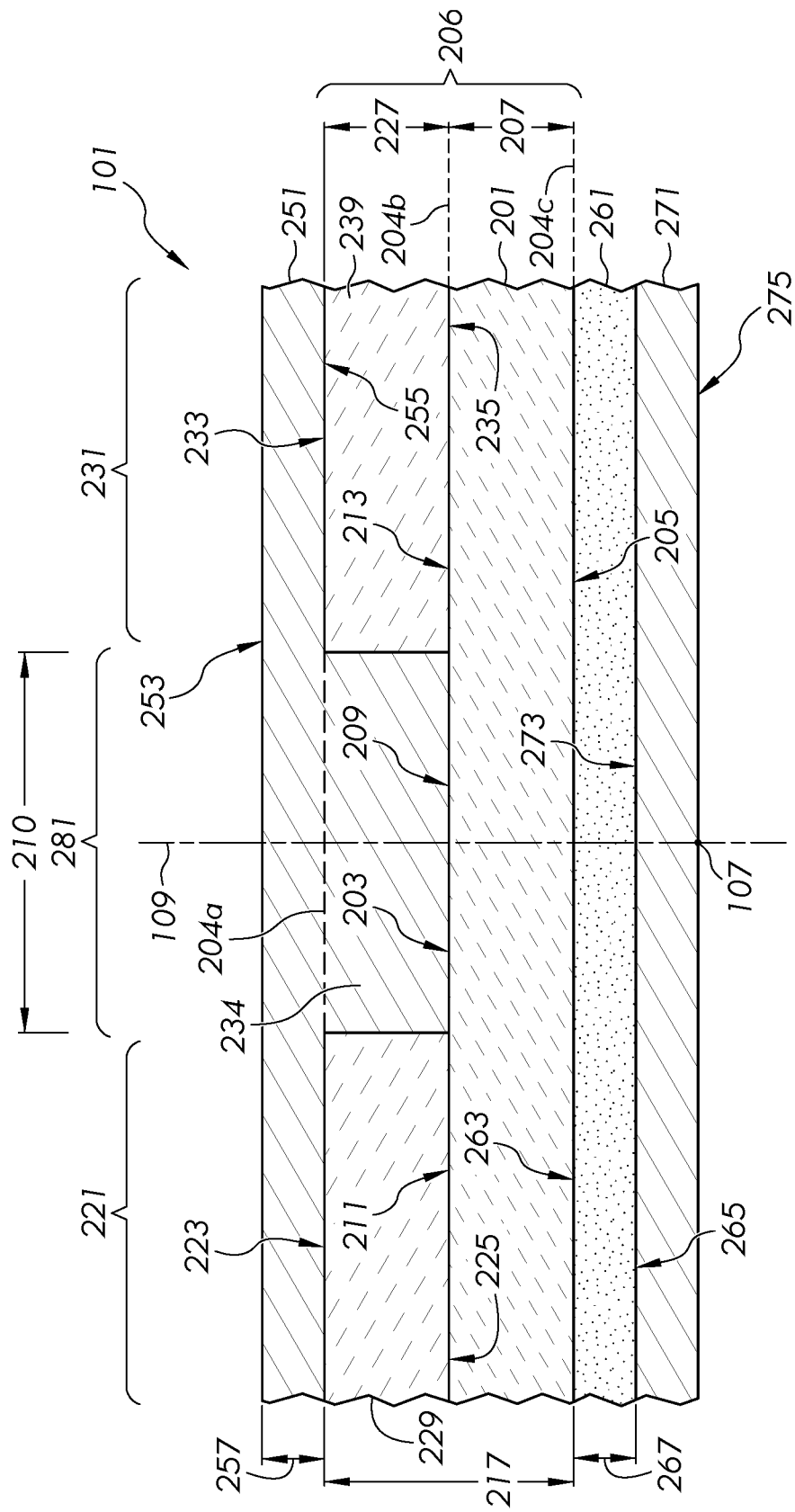
FIGS. 2-5 are cross-sectionals view of the foldable apparatus along line 2-2 of FIG. 1 according to aspects.
Figure 3:
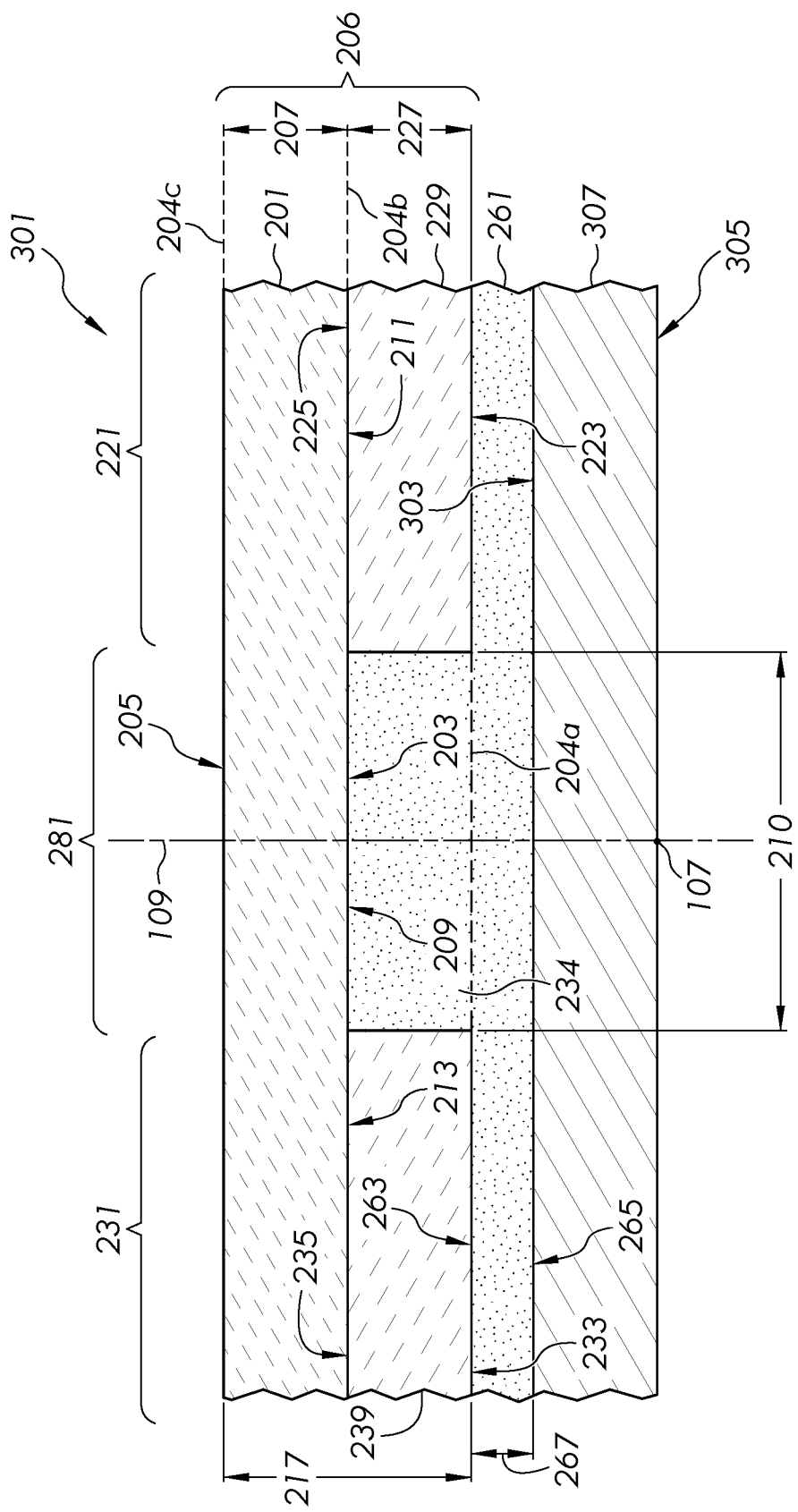
Figure 4:
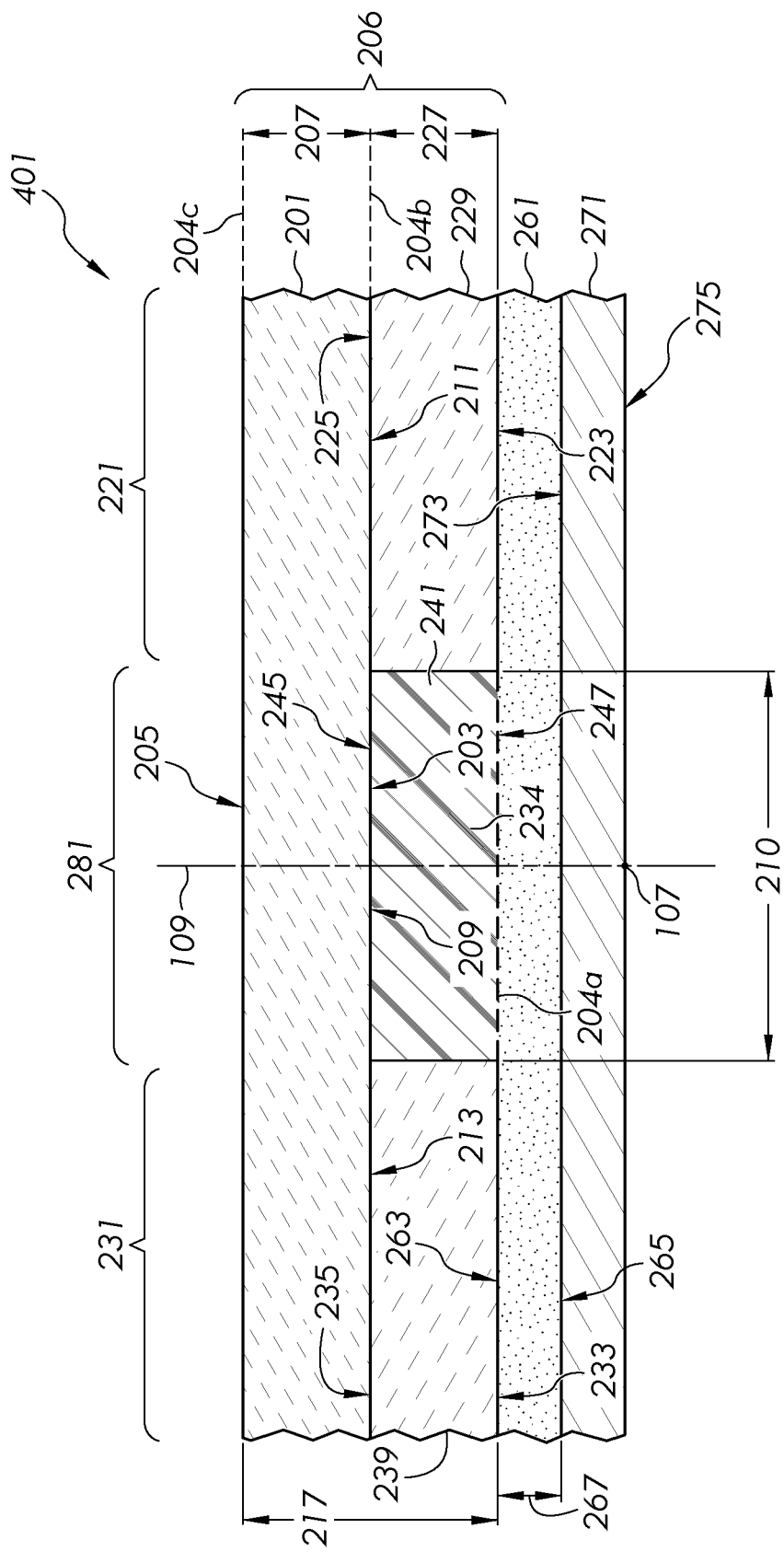
Figure 5:
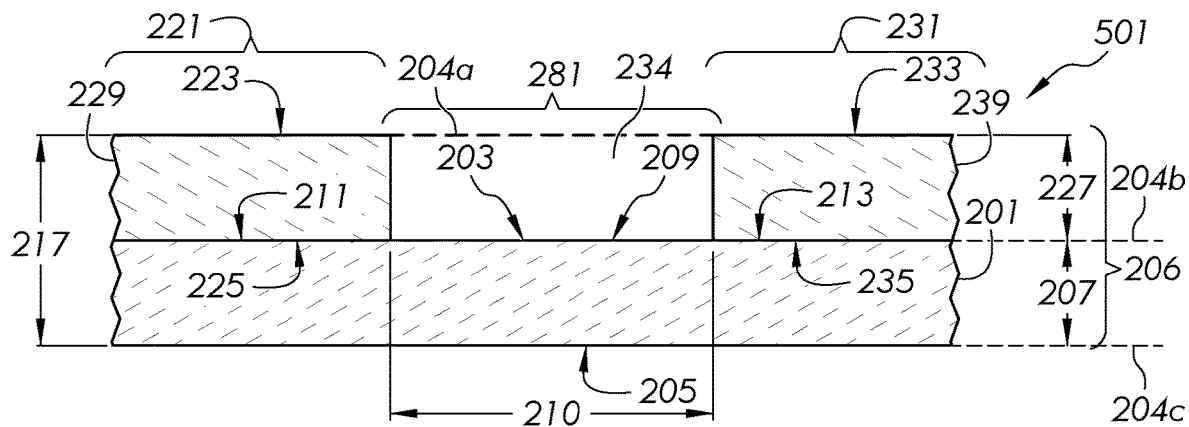
Figure 6:
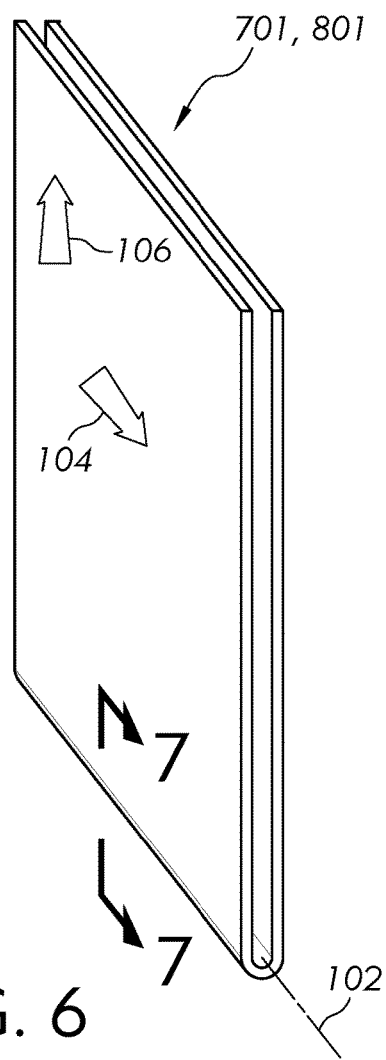
FIG. 6 is a schematic view of example foldable apparatus of aspects of the disclosure in a folded configuration wherein a schematic view of the flat configuration may appear as shown in FIG. 1.
Figure 8:
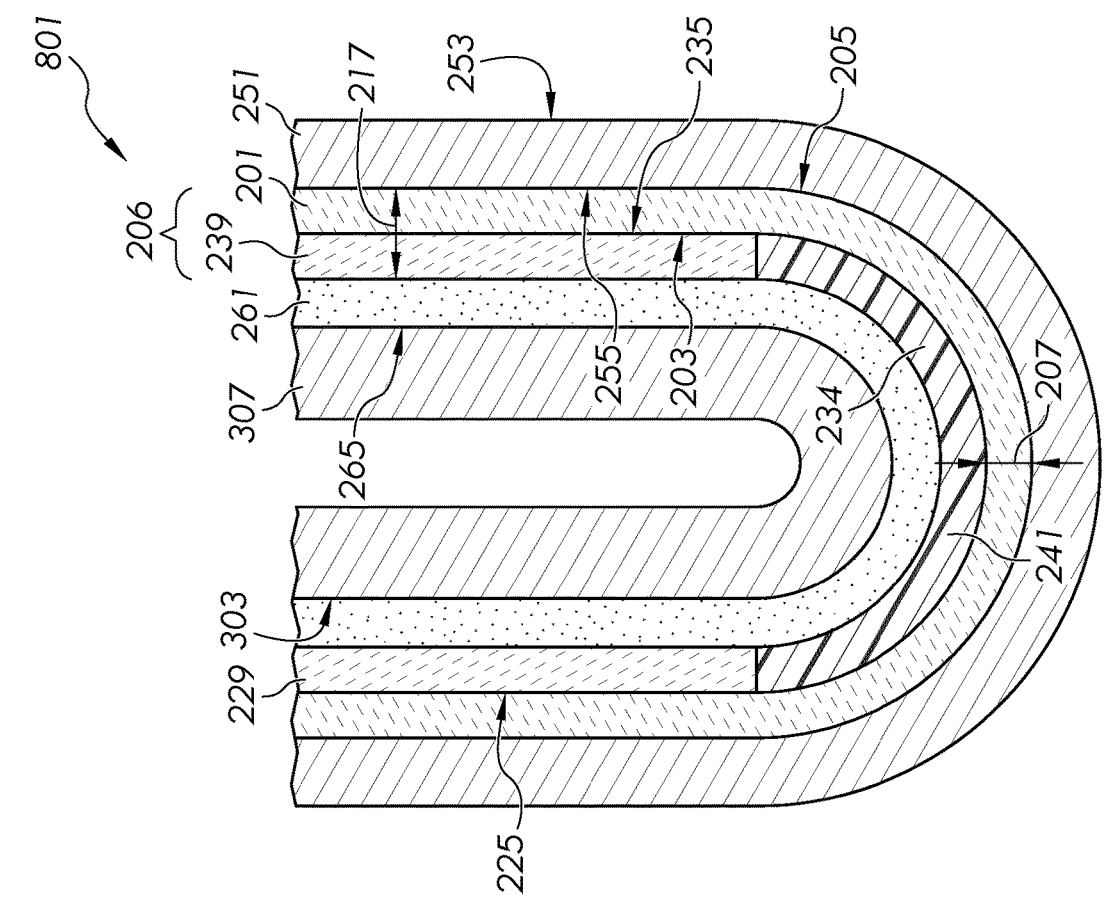
FIG. 8 is a cross-sectional view of the foldable apparatus along line 7-7 of FIG. 6 according to aspects.
Figure 7:
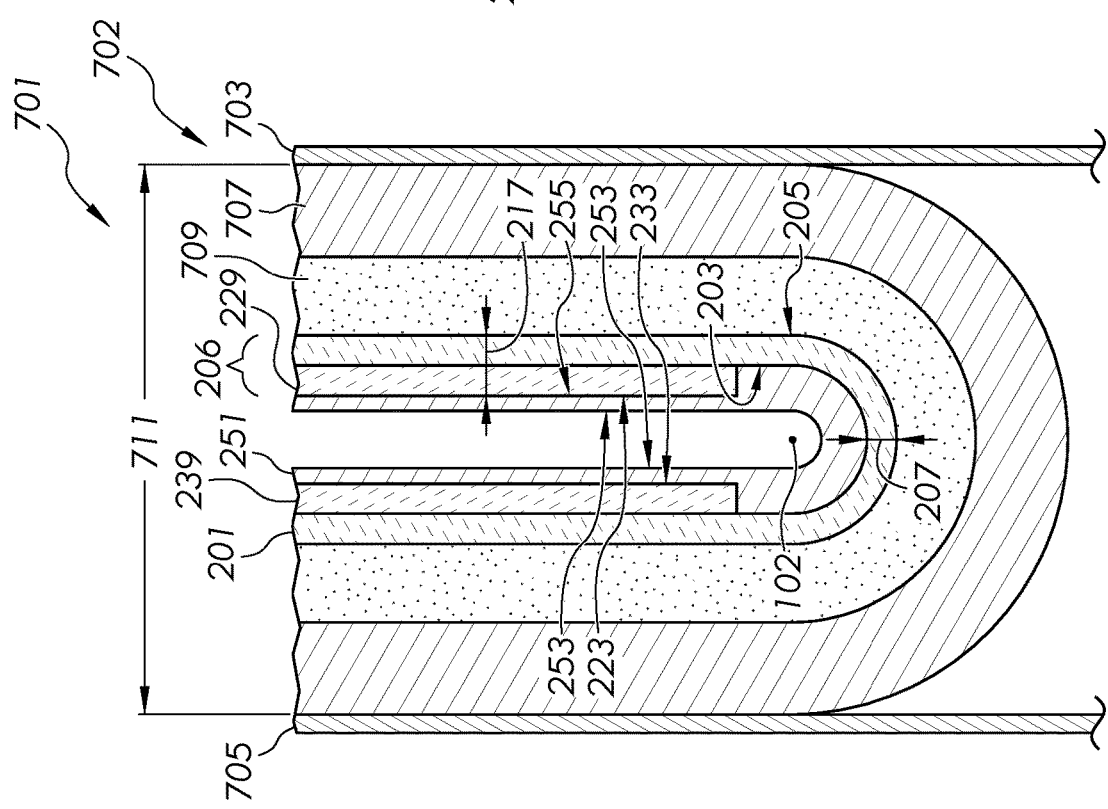
FIG. 7 is a cross-sectional view of testing apparatus to determine the effective minimum bend radius of an example modified foldable apparatus.

FIGS. 2-5 schematically illustrate example aspects of foldable apparatus 101, 301, 401, and 501 comprising the foldable substrate 206 in accordance with aspects of the disclosure in an unfolded (e.g., flat) configuration while FIGS. 7-8 illustrate example aspects of a folded foldable apparatus 701, 801 comprising the foldable substrate 206 in accordance with aspects of the disclosure in a folded configuration. The foldable substrate 206 comprises a substrate layer 201 directly bonded to a first portion 229 and a second portion 239. As shown in FIGS. 2-5, the foldable apparatus 101, 301, 401, and 501 comprise a first region 221, the second region 231, and a central region 281 positioned between the first region 221 and the second region 231. In aspects, as shown in FIGS. 2 and 4, the foldable apparatus 101 or 401 can comprise a release liner 271 although other substrates (e.g., a glass-based substrate and/or a ceramic-based substrate discussed throughout the application) may be used in further aspects rather than the illustrated release liner 271. In aspects, as shown in FIGS. 3 and 8, the foldable apparatus 301 or 801 can comprise a display device 307. In aspects, as shown in FIGS. 1 and 7-8, the foldable apparatus 101, 701, and 801 can comprise a coating 251. In aspects, as shown in FIGS. 2-4 and 8, the foldable apparatus 101, 301, 401, and 801 can comprise an adhesive layer 261. In aspects, as shown in FIGS. 4 and 8, foldable apparatus 401 and 801 can comprise a polymer-based portion 241. In aspects, as shown in FIGS. 2-5 and 7-8, the foldable substrate 206 can comprise a recess 234. It is to be understood that any of the foldable apparatus of the disclosure can comprise a second substrate (e.g., a glass-based substrate and/or a ceramic-based substrate), a release liner 271, a display device 307, a coating 251, an adhesive layer 261, and/or a polymer-based portion 241.

Throughout the disclosure, with reference to FIG. 1, the width 103 of the foldable apparatus 101, 301, 401, 501, 701, and/or 801 is considered the dimension of the foldable apparatus taken between opposed edges of the foldable apparatus in a direction 104 of a fold axis 102 of the foldable apparatus, wherein the direction 104 also comprises the direction of the width 103. Furthermore, throughout the disclosure, the length 105 of the foldable apparatus 101, 301, 401, 501, 701, and/or 801 is considered the dimension of the foldable apparatus 101, 301, 401, 501, 701, and/or 801 taken between opposed edges of the foldable apparatus 101, 301, 401, 501, 701, and/or 801 in a direction 106 perpendicular to the fold axis 102 of the foldable apparatus 101, 301, 401, 501, 701, and/or 801. In aspects, as shown in FIGS. 1-4, the foldable apparatus of any aspects of the disclosure can comprise a fold plane 109 that includes the fold axis 102 and a direction of a substrate thickness 217 when the foldable apparatus is in the flat configuration (e.g., see FIG. 1). The fold plane 109 may comprise a central axis 107 of the foldable apparatus. In aspects, the foldable apparatus can be folded in a direction 111 (e.g., see FIG. 1) about the fold axis 102 extending in the direction 104 of the width 103 to form a folded configuration (e.g., see FIGS. 6-8). As shown, the foldable apparatus may include a single fold axis to allow the foldable apparatus to comprise a bifold wherein, for example, the foldable apparatus may be folded in half. In further aspects, the foldable apparatus may include two or more fold axes with each fold axis including a corresponding central region similar or identical to the central region 281 discussed herein. For example, providing two fold axes can allow the foldable apparatus to comprise a trifold wherein, for example, the foldable apparatus may be folded with the first region 221, the second region 231, and a third portion similar or identical to the first portion or second portion with the central region 281 and another central portion similar to or identical to the central region positioned between the first region and the second region and between the second region and the third region, respectively.

Foldable apparatus 101, 301, 401, 501, 701, and 801 comprising the foldable substrate 206 can comprise the substrate layer 201, the first portion 229, and the second portion 239. In aspects, the substrate layer 201, the first portion 229, and/or the second portion 239 can comprise a glass-based substrate and/or a ceramic-based substrate having a pencil hardness of 8H or more, for example, 9H or more.

In aspects, the substrate layer 201, the first portion 229, and the second portion 239 can comprise a glass-based substrate. As used herein, "glass-based" includes both glasses and glass-ceramics, wherein glass-ceramics have one or more crystalline phases and an amorphous, residual glass phase. A glass-based material (e.g., glass-based substrate) may comprise an amorphous material (e.g., glass) and optionally one or more crystalline materials (e.g., ceramic). Amorphous materials and glass-based materials may be strengthened. As used herein, the term "strengthened" may refer to a material that has been chemically strengthened, for example, through ion exchange of larger ions for smaller ions in the surface of the substrate, as discussed below. However, other strengthening methods, for example, thermal tempering, or utilizing a mismatch of the coefficient of thermal expansion between portions of the substrate to create compressive stress and central tension regions, may be utilized to form strengthened substrates. Exemplary glass-based materials, which may be free of lithia or not, comprise soda lime glass, alkali aluminosilicate glass, alkali-containing borosilicate glass, alkali-containing aluminoborosilicate glass, alkali-containing phosphosilicate glass, and alkali-containing aluminophosphosilicate glass. In one or more aspects, a glass-based material may comprise, in mole percent (mol %): $SiO_2$ in a range from about 40 mol % to about 80%, $Al_2O_3$ in a range from about 5 mol % to about 30 mol %, $B_2O_3$ in a range from 0 mol % to about 10 mol %, $ZrO_2$ in a range from 0 mol % to about 5 mol %, $P_2O_5$ in a range from 0 mol % to about 15 mol %, $TiO_2$ in a range from 0 mol % to about 2 mol %, $R_2O$ in a range from 0 mol % to about 20 mol %, and RO in a range from 0 mol % to about 15 mol %. As used herein, $R_2O$ can refer to an alkali metal oxide, for example, $Li_2O$, $Na_2O$, $K_2O$, $Rb_2O$, and $Cs_2O$. As used herein, RO can refer to MgO, CaO, SrO, BaO, and ZnO. In aspects, a glass-based substrate may optionally further comprise in a range from 0 mol % to about 2 mol % of each of $Na_2SO_4$, NaCl, NaF, NaBr, $K_2SO_4$, KCl, KF, KBr, $As_2O_3$, $Sb_2O_3$, $SnO_2$, $Fe_2O_3$, MnO, $MnO_2$, $MnO_3$, $Mn_2O_3$, $Mn_3O_4$, $Mn_2O_7$. "Glass-ceramics" include materials produced through controlled crystallization of glass. In aspects, glass-ceramics have about 1% to about 99% crystallinity. Examples of suitable glass-ceramics may include $Li_2O$—$Al_2O_3$—$SiO_2$ system (i.e., LAS-System) glass-ceramics, MgO—$Al_2O_3$—$SiO_2$ system (i.e., MAS-System) glass-ceramics, $ZnO×Al_2O_3×nSiO_2$ (i.e., ZAS system), and/or glass-ceramics that include a predominant crystal phase including β-quartz solid solution, β-spodumene, cordierite, petalite, and/or lithium disilicate. The glass-ceramic substrates may be strengthened using the chemical strengthening processes. In one or more aspects, MAS-System glass-ceramic substrates may be strengthened in $Li_2SO_4$ molten salt, whereby an exchange of $2Li^+$ for $Mg^{2+}$ can occur.

In aspects, the substrate layer 201, the first portion 229, and the second portion 239 can comprise a ceramic-based substrate. As used herein, "ceramic-based" includes both ceramics and glass-ceramics, wherein glass-ceramics have one or more crystalline phases and an amorphous, residual glass phase. Ceramic-based materials may be strengthened (e.g., chemically strengthened). In aspects, a ceramic-based material can be formed by heating a glass-based material to form ceramic (e.g., crystalline) portions. In further aspects, ceramic-based materials may comprise one or more nucleating agents that can facilitate the formation of crystalline phase(s). In aspects, the ceramic-based materials can comprise one or more oxide, nitride, oxynitride, carbide, boride, and/or silicide. Example aspects of ceramic oxides include zirconia ($ZrO_2$), zircon zirconia ($ZrSiO_4$), an alkali metal oxide (e.g., sodium oxide ($Na_2O$)), an alkali earth metal oxide (e.g., magnesium oxide (MgO)), titania ($TiO_2$), hafnium oxide ($Hf_2O$), yttrium oxide ($Y_2O_3$), iron oxide, beryllium oxide, vanadium oxide ($VO_2$), fused quartz, mullite (a mineral comprising a combination of aluminum oxide and silicon dioxide), and spinel ($MgAl_2O_4$). Example aspects of ceramic nitrides include silicon nitride ($Si_3N_4$), aluminum nitride (AlN), gallium nitride (GaN), beryllium nitride ($Be_3N_2$), boron nitride (BN), tungsten nitride (WN), vanadium nitride, alkali earth metal nitrides (e.g., magnesium nitride ($Mg_3N_2$)), nickel nitride, and tantalum nitride. Example aspects of oxynitride ceramics include silicon oxynitride, aluminum oxynitride, and a SiAlON (a combination of alumina and silicon nitride and can have a chemical formula, for example, $Si_{12-m-n}Al_{m+n}O_nN_{16-n}$, $Si_{6-n}Al_nO_nN_{8-n}$, or $Si_{2-n}Al_nO_{1+n}N_{2-n}$, where m, n, and the resulting subscripts are all non-negative integers). Example aspects of carbides and carbon-containing ceramics include silicon carbide (SiC), tungsten carbide (WC), an iron carbide, boron carbide ($B_4C$), alkali metal carbides (e.g., lithium carbide ($Li_4C_3$)), alkali earth metal carbides (e.g., magnesium carbide ($Mg_2C_3$)), and graphite. Example aspects of borides include chromium boride ($CrB_2$), molybdenum boride ($Mo_2B_5$), tungsten boride ($W_2B_5$), iron boride, titanium boride, zirconium boride ($ZrB_2$), hafnium boride ($HfB_2$), vanadium boride ($VB_2$), Niobium boride ($NbB_2$), and lanthanum boride ($LaB_6$). Example aspects of silicides include molybdenum disilicide ($MoSi_2$), tungsten disilicide ($WSi_2$), titanium disilicide ($TiSi_2$), nickel silicide (NiSi), alkali earth silicide (e.g., sodium silicide (NaSi)), alkali metal silicide (e.g., magnesium silicide ($Mg_2Si$)), hafnium disilicide ($HfSi_2$), and platinum silicide (PtSi).

Throughout the disclosure, a tensile strength, ultimate elongation (e.g., strain at failure), and yield point is determined using ASTM D638 using a tensile testing machine, for example, an Instron 3400 or Instron 6800, at 23° C. and 50% relative humidity with a type I dogbone shaped sample. Throughout the disclosure, an elastic modulus (e.g., Young's modulus) and/or a Poisson's ratio is measured using ISO 527-1:2019. In aspects, the substrate layer 201, the first portion 229, and the second portion 239 can comprise an elastic modulus of about 1 GigaPascal (GPa) or more, about 3 GPa or more, about 5 GPa or more, about 10 GPa or more, about 100 GPa or less, about 80 GPa or less, about 60 GPa or less, or about 20 GPa or less. In aspects, the substrate layer 201, the first portion 229, and the second portion 239 can comprise an elastic modulus in a range from about 1 GPa to about 100 GPa, from about 1 GPa to about 80 GPa, from about 3 GPa to about 80 GPa, from about 3 GPa to about 60 GPa, from about 5 GPa to about 60 GPa, from about 5 GPa to about 20 GPa, from about 10 GPa to about 20 GPa, or any range or subrange therebetween. In further aspects, the substrate layer 201, the first portion 229, and the second portion 239 can comprise a glass-based portion or a ceramic-based portion comprising an elastic modulus in a range from about 10 GPa to about 100 GPa, from about 40 GPa to about 100 GPa, from about 60 GPa to about 100 GPa, from about 60 GPa to about 80 GPa, from about 80 GPa to about 100 GPa, or any range or subrange therebetween.

In aspects, the substrate layer 201, the first portion 229, and the second portion 239 can be optically transparent. As used herein, "optically transparent" or "optically clear" means an average transmittance of 70% or more in the wavelength range of 400 nm to 700 nm through a 1.0 mm thick piece of a material. In aspects, an "optically transparent material" or an "optically clear material" may have an average transmittance of 75% or more, 80% or more, 85% or more, or 90% or more, 92% or more, 94% or more, 96% or more in the wavelength range of 400 nm to 700 nm through a 1.0 mm thick piece of the material. The average transmittance in the wavelength range of 400 nm to 700 nm is calculated by measuring the transmittance of whole number wavelengths from about 400 nm to about 700 nm and averaging the measurements.

As shown in FIGS. 2-5 and 7-8, the foldable apparatus 101, 301, 401, 501, 701, and 801 can comprise the foldable substrate 206 comprising the substrate layer 201. The substrate layer 201 can comprise a first major surface 203 and a second major surface 205 opposite the first major surface 203. As shown in FIGS. 2-5, the first major surface 203 can extend along a second plane 204b. As shown in FIGS. 2-5, the first major surface 203 of the substrate layer 201 can comprise a first surface area 211 in the first region 221, a second surface area 213 in the second region 231, and a first central surface area 209 in the central region 281 positioned between the first surface area 211 and the second surface area 213. The second major surface 205 can extend along a third plane 204c. In aspects, as shown, the third plane 204c can be parallel to the second plane 204b. As used herein, a layer thickness 207 can be defined between the first major surface 203 and the second major surface 205 as a distance between the second plane 204b and the third plane 204c. In aspects, the layer thickness 207 may be substantially uniform between the first major surface 203 and the second major surface 205 across its corresponding length (i.e., in the direction 106 of the length 105 of the foldable apparatus) and/or its corresponding width (i.e., in the direction 104 of the width 103 of the foldable apparatus). In aspects, the layer thickness 207 can be about 10 micrometers (μm) or more, about 25 μm or more, about 40 μm or more, about 60 μm or more, about 80 μm or more, about 2 millimeters (mm) or less, about 1 mm or less, about 800 μm or less, about 500 μm or less, about 200 μm or less, about 160 μm or less, about 125 μm or less, about 100 μm or less, about 80 μm or less, or about 60 μm or less. In aspects, the layer thickness 207 can be in a range from about 10 μm to about 2 mm, from about 25 μm to about 2 mm, from about 40 μm to about 2 mm, from about 60 μm to about 2 mm, from about 80 μm to about 2 mm, from about 100 μm to about 2 mm, from about 100 μm to about 1 mm, from about 100 μm to about 800 μm, from about 100 μm to about 500 μm, from about 100 μm to about 200 μm, from about 100 μm to about 160 μm, from about 100 μm to about 125 μm, or any range or subrange therebetween. In aspects, the layer thickness 207 can be in a range from about 10 μm to about 1 mm, from about 10 μm to about 800 μm, from about 10 μm to about 500 μm, from about 10 μm to about 200 μm, from about 10 μm to about 160 μm, from about 10 μm to about 125 μm, from about 10 μm to about 100 μm, from about 25 μm to about 100 μm, from about 25 μm to about 80 μm, from about 40 μm to about 80 μm, from about 40 μm to about 60 μm, or any range or subrange therebetween.

As shown in FIGS. 2-5, the first portion 229 can comprise a first outer surface area 223 and a first inner surface area 225 opposite the first outer surface area 223. In aspects, as shown, the first outer surface area 223 can extend along a first plane 204a when the foldable apparatus 101, 301, 401, and/or 501 is in a flat configuration. In aspects, the first inner surface area 225 can extend along the second plane 204b when the foldable apparatus 101, 301, 401, and/or 501 is in a flat configuration. In aspects, as shown, the first inner surface area 225 of the first portion 229 can face the first major surface 203 of the substrate layer 201, for example, by facing the first surface area 211. In further aspects, the first inner surface area 225 of the first portion 229 can contact the first major surface of the substrate layer 201, for example, by contacting the first surface area 211. In further aspects, the first portion 229 can be bonded (e.g., directly bonded) to the substrate layer 201 by the first inner surface area 225 being bonded to the first surface area 211. As used herein, a first thickness 227 of the first portion 229 can be defined between the first outer surface area 223 and the first inner surface area 225 as a distance between the first plane 204a and the second plane 204b. In further aspects, the first thickness 227 may be substantially uniform between the first outer surface area 223 and the first inner surface area 225 across its corresponding length (i.e., in the direction 106 of the length 105 of the foldable apparatus) and/or its corresponding width (i.e., in the direction 104 of the width 103 of the foldable apparatus). In aspects, the first thickness 227 can be about 10 micrometers (μm) or more, about 20 μm or more, about 30 μm or more, about 40 μm or more, about 60 μm or more, about 80 μm or more, about 100 μm or more, about 125 μm or more, about 2 mm or less, about 1 mm or less, about 500 μm or less, about 300 μm or less, about 200 μm or less, about 175 μm or less, about 150 μm or less, about 125 μm or less, about 100 μm or less, about 60 μm or less, or about 50 μm or less. In aspects, the first thickness 227 can be in a range from about 10 μm to about 2 mm, from about 20 μm to about 2 mm, from about 40 μm to about 2 mm, from about 60 μm to about 2 mm, from about 80 μm to about 2 mm, from about 100 μm to about 2 mm, from about 100 μm to about 1 mm, from about 100 μm to about 500 μm, from about 100 μm to about 300 μm, from about 125 μm to about 300 μm, from about 125 μm to about 200 μm, from about 125 μm to about 160 μm, from about 125 μm to about 150 μm, or any range or subrange therebetween. In aspects, the first thickness 227 can be in a range from about 10 μm to about 1 mm, from about 20 μm to about 1 mm, from about 20 μm to about 500 μm, from about 20 μm to about 300 μm, from about 20 μm to about 200 μm, from about 20 μm to about 160 μm, from about 20 μm to about 150 μm, from about 40 μm to about 150 μm, from about 40 μm to about 125 μm, from about 60 μm to about 125 μm, from about 80 μm to about 125 μm, from about 100 μm to about 125 μm, or any range or subrange therebetween. In aspects, the first thickness 227 can be in a range from about 10 μm to about 200 μm, from about 10 μm to about 160 μm, from about 10 μm to about 150 μm, from about 20 μm to about 150 μm, from about 20 μm to about 125 μm, from about 20 μm to about 100 μm, from about 20 μm to about 60 μm, from about 20 μm to about 50 μm, from about 40 μm to about 50 μm, or any range or subrange therebetween.

As shown in FIGS. 2-5, the foldable substrate 206 can comprise the second portion 239. As shown, the second portion 239 can comprise a second outer surface area 233 and a second inner surface area 235 opposite the second outer surface area 233. In aspects, as shown, the second outer surface area 233 can extend along the first plane 204a when the foldable apparatus 101, 301, 401, and/or 501 is in a flat configuration. In aspects, the second inner surface area 235 can extend along the second plane 204b when the foldable apparatus 101, 301, 401, and/or 501 is in a flat configuration. In aspects, as shown, the second inner surface area 235 of the second portion 239 can face the first major surface 203 of the substrate layer 201, for example, by facing the second surface area 213. In further aspects, the second inner surface area 235 of the second portion 239 can contact the first major surface of the substrate layer 201, for example, by contacting the second surface area 213. In further aspects, the second portion 239 can be bonded (e.g., directly bonded) to the substrate layer 201 by the second inner surface area 235 being bonded to the second surface area 213. As used herein, a second thickness of the second portion 239 can be defined between the second outer surface area 233 and the second inner surface area 235 as a distance between the first plane 204a and the second plane 204b. In aspects, the second thickness can be within one or more of the ranges discussed above with reference to the first thickness 227. In further aspects, the second thickness may be substantially uniform between the second outer surface area 233 and the second inner surface area 235 across its corresponding length (i.e., in the direction 106 of the length 105 of the foldable apparatus) and/or its corresponding width (i.e., in the direction 104 of the width 103 of the foldable apparatus). In further aspects, although not shown, the first thickness 227 can be greater than or less than the second thickness. In further aspects, as shown, the second thickness can be substantially equal to the first thickness 227. In even further aspects, as shown, the first outer surface area 223 and the second outer surface area 233 can extend along a common plane (e.g., first plane 204a). In even further aspects, as shown, the first inner surface area 225 and the second inner surface area 235 can extend along a common plane (e.g., second plane 204b).

As used herein, a substrate thickness 217 of the foldable substrate 206 can be defined between the second major surface 205 of the substrate layer 201 and the first outer surface area 223 of the first portion 229 as a distance between the first plane 204a and the third plane 204c. In aspects, the substrate thickness 217 can be substantially uniform between the first outer surface area 223 and the second major surface 205 across the length (i.e., in the direction 106 of the length 105 of the foldable apparatus) and/or the width (i.e., in the direction 104 of the width 103 of the foldable apparatus) of the first outer surface area 223. In aspects, the substrate thickness 217 can be substantially uniform between the second outer surface area 233 and the second major surface 205 across the length (i.e., in the direction 106 of the length 105 of the foldable apparatus) and/or the width (i.e., in the direction 104 of the width 103 of the foldable apparatus) of the second outer surface area 233.

In aspects, the substrate thickness 217 can be about 30 μm or more, about 40 μm or more, about 50 μm or more, about 60 μm or more, about 80 μm or more, about 100 μm or more, about 120 μm or more, about 140 μm or more, about 175 μm or more, about 2 mm or less, about 1 mm or less, about 800 μm or less, about 500 μm or less, about 450 μm or less, about 400 μm or less, about 350 μm or less, about 300 μm or less, about 250 μm or less, about 225 μm or less, about 200 μm or less, about 175 μm or less, or about 150 μm or less. In aspects, the substrate thickness 217 can be in a range from about 30 μm to about 2 mm, from about 30 μm to about 1 μm, from about 30 μm to about 800 μm, from about 30 μm to about 500 μm, from about 40 μm to about 500 μm, from about 40 μm to about 400 μm, from about 50 μm to about 400 μm, from about 50 μm to about 350 μm, from about 60 μm to about 300 μm, from about 80 μm to about 300 μm, from about from 80 μm to about 250 μm, from about 100 μm to about 250 μm, from about 100 μm to about 225 μm, from about 120 μm to about 225 μm, from about 120 μm to about 200 μm, from about 140 μm to about 200 μm, from about 140 μm to about 175 μm, from about 140 μm to about 150 μm, or any range or subrange therebetween. In aspects, the substrate thickness 217 can be in a range from about 30 μm to about 400 μm, from about 30 μm to about 350 μm, from about 40 μm to about 350 μm, from about 50 μm to about 350 μm, from about 50 μm to about 300 μm, from about 60 μm to about 300 μm, from about 80 μm to about 300 μm, from about 80 μm to about 250 μm, from about 80 μm to about 225 μm, from about 100 μm to about 225 μm, from about 100 μm to about 200 μm, from about 120 μm to about 200 μm, from about 120 μm to about 175 μm, from about 120 μm to about 150 μm, or any range or subrange therebetween. In aspects, the substrate thickness 217 can be in a range from about 30 μm to about 300 μm, from about 30 μm to about 250 μm, from about 30 μm to about 225 μm, from about 30 μm to about 200 μm, from about 30 μm to about 175 μm, from about 30 μm to about 150 μm, from about 40 μm to about 150 μm, from about 50 μm to about 150 μm, from about 60 μm to about 150 μm, from about 80 μm to about 150 μm, from about 100 μm to about 150 μm, from about 120 μm to about 150 μm, from about 140 μm to about 150 μm, or any range or subrange therebetween.

As shown in FIGS. 2-5, an inner edge of the first portion 229 can be spaced apart from an inner edge of the second portion 239 to define a recess 234 between the inner edges, the first plane 204a, and the first central surface area 209 of the substrate layer 201. As shown, a depth of the recess 234 measured as the distance between first plane 204a and the first central surface area 209 recess can be substantially equal to the first thickness 227 of the first portion 229. In aspects, the depth of the recess (e.g., first thickness 227) as a percentage of the substrate thickness 217 can be about 8% or more, about 10% or more, about 20% or more, about 25% or more, about 33% or more, about 40% or more, about 45% or more, about 88% or less, about 80% or less, about 75% or less, about 66% or less, about 60% or less, or about 55% or less. In aspects, the depth of the recess (e.g., first thickness 227) as a percentage of the substrate thickness 217 can be in a range from about 8% to about 88%, from about 10% to about 88%, from about 10% to about 80%, from about 20% to about 80%, from about 20% to about 75%, from about 25% to about 75%, from about 25% to about 66%, from about 33% to about 66%, from about 33% to about 60%, from about 40% to about 60%, from about 40% to about 55%, from about 45% to about 55%, or any range or subrange therebetween.

In aspects, the depth of the recess (e.g., first thickness 227) can be greater than the layer thickness 207. In further aspects, the depth of the recess (e.g., first thickness 227) as a percentage of the layer thickness 207 can be about 101% or more, about 125% or more, about 150% or more, about 200% or more, about 250% or more, about 750% or less, about 600% or less, about 500% or less, about 400% or less, or about 300% or less. In aspects, the depth of the recess (e.g., first thickness 227) as a percentage of the layer thickness 207 can be in a range from about 101% to about 750%, from about 101% to about 600%, from about 125% to about 600%, from about 125% to about 500%, from about 150% to about 500%, from about 150% to about 400%, from about 200% to about 400%, from about 200% to about 300%, from about 250% to about 300%, or any range or subrange therebetween. In aspects, the depth of the recess (e.g., first thickness 227) can be less than the layer thickness 207. In further aspects, the depth of the recess (e.g., first thickness 227) as a percentage of the layer thickness 207 can be about 16% or more about 20% or more about 25% or more about 33% or more about 40% or more, about 99% or less, about 90% or less, about 75% or less, about 66% or less, or about 55% or less. In aspects, the depth of the recess (e.g., first thickness 227) as a percentage of the layer thickness 207 can be in a range from about 16% to about 99%, from about 20% to about 99%, from about 20% to about 90%, from about 25% to about 90%, from about 25% to about 75%, from about 33% to about 75%, from about 33% to about 66%, from about 40% to about 66%, from about 40% to about 55%, or any range or subrange therebetween. In aspects, the depth of the recess (e.g., first thickness 227) can be substantially equal to the layer thickness 207.

In aspects, a width of the recess can be measured as a minimum distance 210 between the inner edge of the first portion 229 and the inner edge of the second portion 239. In aspects, the minimum distance can be about 1 mm or more, about 3 mm or more, about 5 mm or more, about 8 mm or more, about 10 mm or more, about 15 mm or more, about 20 mm or more, about 100 mm or less, about 60 mm or less, about 50 mm or less, about 40 mm or less, about 35 mm or less, about 30 mm or less, or about 25 mm or less. In aspects, the minimum distance 210 can be in a range from about 1 mm to about 100 mm, from about 3 mm to about 100 mm, from about 3 mm to about 60 mm, from about 5 mm to about 60 mm, from about 5 mm to about 50 mm, from about 8 mm to about 50 mm, from about 8 mm to about 40 mm, from about 10 mm to about 40 mm, from about 10 mm to about 35 mm, from about 15 mm to about 35 mm, from about 15 mm to about 30 mm, from about 20 mm to about 30 mm, from about 20 mm to about 25 mm, or any range of subrange therebetween.

The first portion 229 can comprise a first coefficient of thermal expansion, the second portion 239 can comprise a second coefficient of thermal expansion, and the substrate layer 201 can comprise a layer coefficient of thermal expansion. Throughout the disclosure, a coefficient of thermal expansion of a foldable substrate or a layer of a foldable substrate refers to a rate of linear expansion based on temperature and is measured in accordance with ASTM E228-17 at 25° C. In aspects, the first coefficient of thermal expansion, the second coefficient of thermal expansion, and/or the layer coefficient of thermal expansion can be about $5\times10^{-7\circ}$ C.$^{-1}$ or more, about $10\times10^{-7\circ}$ C.$^{-1}$ or more, about $20\times10^{-7\circ}$ C.$^{-1}$ or more, about $30\times10^{-7\circ}$ C.$^{-1}$ or more, about $40\times10^{-7\circ}$ C.$^{-1}$ or more, about $50\times10^{-7\circ}$ C.$^{-1}$ or more, about $60\times10^{-7\circ}$ C.$^{-1}$ or more, about $500\times10^{-7\circ}$ C.$^{-1}$ or less, about $300\times10^{-7\circ}$ C.$^{-1}$ or less, about $200\times10^{-7\circ}$ C.$^{-1}$ or less, about $150\times10^{-7\circ}$ C.$^{-1}$ or less, about $100\times10^{-7\circ}$ C.$^{-1}$ or less, about $90\times10^{-7\circ}$ C.$^{-1}$ or less, about $80\times10^{-7\circ}$ C.$^{-1}$ or less, or about $70\times10^{-7\circ}$ C.$^{-1}$ or less. In aspects, the first coefficient of thermal expansion, the second coefficient of thermal expansion, and/or the layer coefficient of thermal expansion can be in a range from about $5\times10^{-7\circ}$ C.$^{-1}$ to about $500\times10^{-7\circ}$ C.$^{-1}$, from about $5\times10^{-7\circ}$ C.$^{-1}$ to about $300\times10^{-7\circ}$ C.$^{-1}$, from about $10\times10^{-7\circ}$ C.$^{-1}$ to about $300\times10^{-7\circ}$ C.$^{-1}$, from about $10\times10^{-7\circ}$ C.$^{-1}$ to about $200\times10^{-7\circ}$ C.$^{-1}$, from about $20\times10^{-7\circ}$ C.$^{-1}$ to about $200\times10^{-7\circ}$ C.$^{-1}$, from about $20\times10^{-7\circ}$ C.$^{-1}$ to about $100\times10^{-7\circ}$ C.$^{-1}$, from about $30\times10^{-7\circ}$ C.$^{-1}$ to about $100\times10^{-7\circ}$ C.$^{-1}$, from about $30\times10^{-7\circ}$ C.$^{-1}$ to about $90\times10^{-7\circ}$ C.$^{-1}$, from about $40\times10^{-7\circ}$ C.$^{-1}$ to about $90\times10^{-7\circ}$ C.$^{-1}$, from about $40\times10^{-7\circ}$ C.$^{-1}$ to about $80\times10^{-7\circ}$ C.$^{-1}$, from about $50\times10^{-7\circ}$ C.$^{-1}$ to about $80\times10^{-7\circ}$ C.$^{-1}$, from about $50\times10^{-7\circ}$ C.$^{-1}$ to about $70\times10^{-7\circ}$ C.$^{-1}$, from about $60\times10^{-7\circ}$ C.$^{-1}$ to about $70\times10^{-7\circ}$ C.$^{-1}$, or any range or subrange therebetween. In aspects, the first coefficient of thermal expansion can be substantially equal to the second coefficient of thermal expansion. In aspects, the layer coefficient of thermal expansion can be greater than the first coefficient of thermal expansion and/or the second coefficient of thermal expansion. In further aspects, the layer coefficient of thermal expansion can be more than the first coefficient of thermal expansion and/or the second coefficient of thermal expansion by about $2\times10^{-7\circ}$ C.$^{-1}$ or more, about $5\times10^{-7\circ}$ C.$^{-1}$ or more, about $10\times10^{-7\circ}$ C.$^{-1}$ or more, about $100\times10^{-7\circ}$ C.$^{-1}$ or less, about $75\times10^{-7\circ}$ C.$^{-1}$ or less, or about $50\times10^{-7\circ}$ C.$^{-1}$ or less, or about $30\times10^{-7\circ}$ C.$^{-1}$ or less. In further aspects, an amount that the core coefficient of thermal expansion can be more than the first coefficient of thermal expansion and/or the second coefficient of thermal expansion can be in a range from about $2\times10^{-7\circ}$ C.$^{-1}$ to about $100\times10^{-7\circ}$ C.$^{-1}$, from about $2\times10^{-7\circ}$ C.$^{-1}$ to about $75\times10^{-7\circ}$ C.$^{-1}$, from about $5\times10^{-7\circ}$ C.$^{-1}$ to about $75\times10^{-7\circ}$ C.$^{-1}$, from about $5\times10^{-7\circ}$ C.$^{-1}$ to about $50\times10^{-7\circ}$ C.$^{-1}$, from about $10\times10^{-7\circ}$ C.$^{-1}$ to about $50\times10^{-7\circ}$ C.$^{-1}$, from about $10\times10^{-7\circ}$ C.$^{-1}$ to about $30\times10^{-7\circ}$ C.$^{-1}$, or any range or subrange therebetween. As discussed elsewhere herein, controlling a difference between a coefficient of thermal expansion of the substrate layer relative to the first portion and/or second portion can reduce strain between layers and/or portions of the foldable apparatus and/or the foldable substrates that can facilitate a greater fold-induced strain before the foldable apparatus and/or foldable substrates reach a critical buckling strain (e.g., onset of mechanical instabilities) as well as reduce the incidence of optical distortions.

The first portion 229 can comprise a first density, the second portion 239 can comprise a second density, and the substrate layer 201 can comprise a substrate density. Throughout the disclosure, density is measured in accordance with ASTM C693-93 (2019) at 25° C. In aspects, the first density, second density, and/or substrate density can be about 2 grams per centimeter cubed (g/cm$^3$) or more, about 2.2 g/cm$^3$ or more, about 2.3 g/cm$^3$ or more, about 2.4 g/cm$^3$ or more, about 2.42 g/cm$^3$ or more, about 2.45 g/cm$^3$ or more, about 2.47 g/cm$^3$ or more, about 3 g/cm$^3$ or less, about 2.8 g/cm$^3$ or less, about 2.7 g/cm$^3$ or less, about 2.65 g/cm$^3$ or less, about 2.6 g/cm$^3$ or less, or about 2.58 g/cm$^3$ or less, about 2.55 g/cm$^3$ or less, about 2.52 g/cm$^3$ or less, or about 2.5 g/cm$^3$ or less. In aspects, the first density, second density, and/or substrate density can be in a range from about 2 g/cm$^3$ to about 3 g/cm$^3$, from about 2 g/cm$^3$ to about 2.8 g/cm$^3$, from about 2.2 g/cm$^3$ to about 2.8 g/cm$^3$, from about 2.2 g/cm$^3$ to about 2.7 g/cm$^3$, from about 2.3 g/cm$^3$ to about 2.7 g/cm$^3$, from about 2.4 g/cm$^3$ to about 2.7 g/cm$^3$, from about 2.42 g/cm$^3$ to about 2.7 g/cm$^3$, from about 2.42 g/cm$^3$ to about 2.68 g/cm$^3$, from about 2.45 g/cm$^3$ to about 2.68 g/cm$^3$, from about 2.45 g/cm$^3$ to about 2.65 g/cm$^3$, from about 2.48 g/cm$^3$ to about 2.65 g/cm$^3$, from about 2.48 g/cm$^3$ to about 2.52 g/cm$^3$, from about 2.48 g/cm$^3$ to about 2.5 g/cm$^3$, or any range or subrange therebetween. In aspects, the first density can be substantially equal to the second density. In aspects, the layer density can be greater than the first density and/or the second density. In further aspects, the layer density can be greater than the first density and/or the second density by about 0.005 g/cm³ or more, about 0.01 g/cm³ or more, about 0.015 g/cm³ or more, about 0.02 g/cm³ or more, about 0.025 g/cm³ or more, about 0.055 g/cm³ or less, about 0.05 g/cm³ or less, about 0.045 g/cm³ or less, about 0.04 g/cm³ or less, about 0.35 g/cm³ or less, or about 0.3 g/cm³ or less. In further aspects, an amount that the layer density can be more than the first density and/or the second density can be in a range from about 0.005 g/cm³ to about 0.055 g/cm³, from about 0.005 g/cm³ to about 0.05 g/cm³, from about 0.01 g/cm³ to about 0.05 g/cm³, from about 0.01 g/cm³ to about 0.045 g/cm³, from about 0.015 g/cm³ to about 0.045 g/cm³, from about 0.015 g/cm³ to about 0.04 g/cm³, from about 0.02 g/cm³ to about 0.04 g/cm³, from about 0.02 g/cm³ to about 0.035 g/cm³, from about 0.025 g/cm³ to about 0.035 g/cm³, from about 0.025 g/cm³ to about 0.03 g/cm³, or any range or subrange therebetween. As discussed elsewhere herein, controlling a difference between a density of the substrate layer relative to the first portion and/or second portion can reduce strain between layers and/or portions of the foldable apparatus and/or the foldable substrates that can facilitate a greater fold-induced strain before the foldable apparatus and/or foldable substrates reach a critical buckling strain (e.g., onset of mechanical instabilities) as well as reduce the incidence of optical distortions.

In aspects, although not shown, the foldable substrate 206 can comprise a first transition portion. The first transition portion can attach the first region 221 to the central region 281 comprising the layer thickness 207. A thickness of the first transition portion can be defined between the third plane 204c and the first central surface area 209. In aspects, although not shown, the thickness of the first transition portion can continuously increase from the first central surface area 209 (e.g., the layer thickness 207) to the first region 221 (e.g., substrate thickness 217). In aspects, although not shown, the thickness of the first transition portion can increase at a constant rate from the first central surface area 209 to the first region 221. In aspects, although not shown, the thickness of the first transition portion may increase more slowly where the first central surface area 209 meets the first transition portion than in the middle of the first transition portion. In aspects, although not shown, the thickness of the first transition portion may increase more slowly where the first portion 229 meets the first transition portion than in the middle of the first transition portion. In aspects, as shown in FIGS. 2-5, the central portion can resemble the central region 281 that may not comprise a first transition portion. In aspects, although not shown, the first transition portion can comprise a portion extending from the first portion where a thickness of the first transition portion continuously changes and a portion extending from the second plane can change abruptly.

In aspects, although not shown, the central region 281 can comprise a second transition portion. The second transition portion 855 can attach the second region 231 to the central region 281 comprising the layer thickness 207 (e.g., region comprising the first central surface area 209). A thickness of the second transition portion can be defined between the third plane 204c and the first central surface area 209. In aspects, although not shown, the thickness of the second transition portion can continuously increase from the first central surface area 209 (e.g., the layer thickness 207) to the second portion 239 (e.g., first thickness 227). In aspects, although not shown, the thickness of the second transition portion can increase at a constant rate from the first central surface area 209 to the second region 231. In aspects, although not shown, the thickness of the second transition portion may increase more slowly where the first central surface area 209 meets the second transition portion than in the middle of the second transition portion. In aspects, although not shown, the thickness of the second transition portion may increase more slowly where the second portion 239 meets the second transition portion than in the middle of the second transition portion. In aspects, as shown in FIGS. 2-5, the central region 281 may not comprise a second transition portion. In aspects, although not shown, the second transition portion can comprise a portion extending from the second portion where a thickness of the second transition portion continuously changes and a portion extending from the second plane 804b can change abruptly.

In aspects, a width of the first transition portion can be defined between a portion of the central region 281 comprising the layer thickness 207 and the first region 221 comprising the first portion 229 in the direction 106 of the length 105 of the foldable apparatus. A width of the second transition portion can be defined between a portion of the central region 281 comprising the layer thickness 207 and the second region 231 comprising the second portion 239 in the direction 106 of the length 105 of the foldable apparatus 101. In aspects, the width of the first transition portion and/or the width of the second transition portion can be sufficiently large (e.g., 1 mm or more) to avoid optical distortions that may otherwise occur at a step transition or small transition width (e.g., less than 1 mm) between the first and central thickness. In aspects, to enhance puncture resistance of the foldable substrate while also avoiding optical distortions, the width of the first transition portion and/or the width of the second transition portion can be about 1 mm or more, about 2 mm or more, about 3 mm or more, about 5 mm or less, about 4 mm or less, or about 3 mm or less. In aspects, the width of the first transition portion and/or the width of the second transition portion can be in a range from about 1 mm to about 5 mm, from about 1 mm to about 4 mm, from about 1 mm to about 3 mm, from about 2 mm to about 5 mm, from about 2 mm to about 4 mm, from about 2 mm to about 3 mm, from about 3 mm to about 5 mm, from about 3 mm to about 4 mm, or any range or subrange therebetween.

As used herein, if a first layer and/or component is described as "disposed over" a second layer and/or component, other layers may or may not be present between the first layer and/or component and the second layer and/or component. Furthermore, as used herein, "disposed over" does not refer to a relative position with reference to gravity. For example, a first layer and/or component can be considered "disposed over" a second layer and/or component, for example, when the first layer and/or component is positioned underneath, above, or to one side of a second layer and/or component. As used herein, a first layer and/or component described as "bonded to" a second layer and/or component means that the layers and/or components are bonded to each other, either by direct contact and/or bonding between the two layers and/or components or via an adhesive layer. As used herein, a first layer and/or component described as "contacting" or "in contact with" a second layer and/or components refers to direct contact and includes the situations where the layers and/or components are bonded to each other.

As shown in FIGS. 2-4 and 8, the foldable apparatus 101, 301, 401, and/or 801 can comprise an adhesive layer 261. As shown, the adhesive layer 261 can comprise a first contact surface 263 and a second contact surface 265 that can be opposite the first contact surface 263. In aspects, as shown in FIGS. 2-4, the second contact surface 265 of the adhesive layer 261 can comprise a planar surface. In aspects, as shown in FIGS. 2 and 4, the first contact surface 263 of the adhesive layer 261 can comprise a planar surface. An adhesive thickness 267 of the adhesive layer 261 can be defined as a minimum distance between the first contact surface 263 and the second contact surface 265. In aspects, the adhesive thickness 267 of the adhesive layer 261 can be about 1 µm or more, about 5 µm or more, about 10 µm or more, about 100 µm or less, about 60 µm or less, about 30 µm or less, or about 20 µm or less. In aspects, the adhesive thickness 267 of the adhesive layer 261 can be in a range from about 1 µm to about 100 µm, from about 5 µm to about 100 µm, from about 5 µm to about 60 µm, from about 5 µm to about 30 µm, from about 10 µm to about 30 µm, from about 10 µm to about 20 µm, or any range or subrange therebetween.

In aspects, as shown in FIGS. 2 and 4, the second contact surface 265 of the adhesive layer 261 can face the first major surface 273 of a release liner 271 (described below). In further aspects, as shown, the second contact surface 265 of the adhesive layer 261 can contact the first major surface 273 the release liner 271. In aspects, as shown in FIGS. 3 and 8, the second contact surface 265 of the adhesive layer 261 can face the first major surface 303 of the display device 307. In further aspects, as shown, the second contact surface 265 of the adhesive layer 261 can contact the first major surface 303 of the display device 307.

In aspects, as shown in FIG. 2, the first contact surface 263 of the adhesive layer 261 can face the second major surface 205 of the substrate layer 201. In further aspects, as shown, the first contact surface 263 of the adhesive layer 261 can contact the second major surface 205 of the substrate layer 201. In aspects, as shown in FIGS. 3-4, the first contact surface 263 of the adhesive layer 261 can face the first outer surface area 223 of the first portion 229 and/or the second outer surface area 233 of the second portion 239. In further aspects, as shown, the first contact surface 263 of the adhesive layer 261 can contact the first outer surface area 223 of the first portion 229 and/or the second outer surface area 233 of the second portion 239. In aspects, as shown in FIGS. 3-4, the first contact surface 263 of the adhesive layer 261 can face the first central surface area 209 of the central region 281. In further aspects, as shown in FIG. 3, the first contact surface 263 of the adhesive layer 261 can contact the first central surface area 209 of the central region 281. In further aspects, as shown in FIGS. 4, the adhesive layer 261 can extend into the recess 234. In aspects, the adhesive layer 261 may entirely fill the recess 234 although the adhesive layer 261 may partially fill the recess 234 in further aspects. In aspects, although not shown, the recess 234 may not be totally filled, for example, to leave room for electronic devices and/or mechanical devices. In aspects, although not shown, another adhesive layer, for example similar to the adhesive layer 261, can be disposed over and/or contact the second major surface 205 of the substrate layer 201.

In aspects, the adhesive layer 261 can comprise one or more of a polyolefin, a polyamide, a halide-containing polymer (e.g., polyvinylchloride or a fluorine-containing polymer), an elastomer, a urethane, phenolic resin, parylene, polyethylene terephthalate (PET), and polyether ether ketone (PEEK). Example aspects of polyolefins include low molecular weight polyethylene (LDPE), high molecular weight polyethylene (HDPE), ultrahigh molecular weight polyethylene (UHMWPE), and polypropylene (PP). Example aspects of fluorine-containing polymers include polytetrafluoroethylene (PTFE), polyvinylfluoride (PVF), polyvinylidene fluoride (PVDF), perfluoropolyether (PFPE), perfluorosulfonic acid (PFSA), a perfluoroalkoxy (PFA), fluorinated ethylene propylene (FEP) polymers, and ethylene tetrafluoro ethylene (ETFE) polymers. Example aspects of elastomers include rubbers (e.g., polybutadiene, polyisoprene, chloroprene rubber, butyl rubber, nitrile rubber) and block copolymers (e.g., styrene-butadiene, high-impact polystyrene, poly(dichlorophosphazene). In further aspects, the adhesive layer 261 can comprise an optically clear adhesive. In even further aspects, the optically clear adhesive can comprise one or more optically transparent polymers: an acrylic (e.g., polymethylmethacrylate (PMMA)), an epoxy, silicone, and/or a polyurethane. Examples of epoxies include bisphenol-based epoxy resins, novolac-based epoxies, cycloaliphatic-based epoxies, and glycidylamine-based epoxies. In even further aspects, the optically clear adhesive can comprise, but is not limited to, acrylic adhesives, for example, 3M 8212 adhesive, or an optically transparent liquid adhesive, for example, a LOC-TITE optically transparent liquid adhesive. Exemplary aspects of optically clear adhesives comprise transparent acrylics, epoxies, silicones, and polyurethanes. For example, the optically transparent liquid adhesive could comprise one or more of LOCTITE AD 8650, LOCTITE AA 3922, LOCTITE EA E-05MR, LOCTITE UK U-09LV, which are all available from Henkel.

In aspects, the adhesive layer 261 can comprise an elastic modulus of about 0.001 MegaPascals (MPa) or more, about 0.01 MPa or more, about 0.1 MPa or more, about 1 MPa or less, about 0.5 MPa or less, about 0.1 MPa or less, or about 0.05 MPa or less. In aspects, the adhesive layer 261 can comprise an elastic modulus in a range from about 0.001 MPa to about 1 MPa, from about 0.01 MPa to about 1 MPa, from about 0.01 MPa to about 0.5 MPa, from about 0.05 MPa to about 0.5 MPa, from about 0.1 MPa to about 0.5 MPa, from about 0.001 MPa to about 0.5 MPa, from about 0.001 MPa to about 0.01 MPa, or any range or subrange therebetween. In aspects, the adhesive layer can comprise an elastic modulus within one or more of the ranges discussed below for the elastic modulus of the polymer-based portion 241.

As shown in FIGS. 4 and 8, the polymer-based portion 241 of the foldable apparatus 401 and/or 801 can be positioned between the inner edge of the first portion 229 and the inner edge of the second portion 239. In aspects, as shown, the polymer-based portion 241 can be at least partially positioned in the recess 234. In further aspects, as shown, the polymer-based portion 241 can partially or entirely fill the recess 234. In aspects, although not shown, the second recess may not be totally filled, for example, to leave room for electronic devices and/or mechanical devices. As shown in FIG. 4, the polymer-based portion 241 can comprise a fourth contact surface 247 opposite a third contact surface 245. In aspects, as shown, the fourth contact surface 247 can comprise a planar surface. In further aspects, the fourth contact surface 247 may be substantially coplanar (e.g., extend along a common plane, first plane 204a) with the first outer surface area 223 and the second outer surface area 233. In aspects, the third contact surface 245 can comprise a planar surface. In aspects, in addition to the fourth contact surface 247 being substantially coplanar with the first outer surface area 223 and the second outer surface area 233, the third contact surface 245 can be substantially coplanar (e.g., extend along a common plane, second plane 204b) with the first central surface area 209 (e.g., first major surface 203). In aspects, as shown in FIG. 4, the first contact surface 263 of the adhesive layer 261 can face the fourth contact surface 247 of the polymer-based portion 241. In further aspects, as shown, the first contact surface 263 of the adhesive layer 261 can contact the fourth contact surface 247 of the polymer-based portion 241.

In aspects, the polymer-based portion 241 comprises a polymer (e.g., optically transparent polymer). In further aspects, the polymer-based portion 241 can comprise one or more of an optically transparent: an acrylic (e.g., polymethylmethacrylate (PMMA)), an epoxy, a silicone, and/or a polyurethane. Examples of epoxies include bisphenol-based epoxy resins, novolac-based epoxies, cycloaliphatic-based epoxies, and glycidylamine-based epoxies. In further aspects, the polymer-based portion 241 can comprise one or more of a polyolefin, a polyamide, a halide-containing polymer (e.g., polyvinylchloride or a fluorine-containing polymer), an elastomer, a urethane, phenolic resin, parylene, polyethylene terephthalate (PET), and polyether ether ketone (PEEK). Example aspects of polyolefins include low molecular weight polyethylene (LDPE), high molecular weight polyethylene (HDPE), ultrahigh molecular weight polyethylene (UHMWPE), and polypropylene (PP). Example aspects of fluorine-containing polymers include polytetrafluoroethylene (PTFE), polyvinylfluoride (PVF), polyvinylidene fluoride (PVDF), perfluoropolyether (PFPE), perfluorosulfonic acid (PFSA), a perfluoroalkoxy (PFA), fluorinated ethylene propylene (FEP) polymers, and ethylene tetrafluoro ethylene (ETFE) polymers. Example aspects of elastomers include rubbers (e.g., polybutadiene, polyisoprene, chloroprene rubber, butyl rubber, nitrile rubber) and block copolymers (e.g., styrene-butadiene, high-impact polystyrene, poly(dichlorophosphazene), for example, comprising one or more of polystyrene, polydichlorophosphazene, and poly(5-ethylidene-2-norbornene). In aspects, the polymer-based portion can comprise a sol-gel material. Example aspects of polyurethanes comprise thermoset polyurethanes, for example, Dispurez 102 available from Incorez and thermoplastic polyurethanes, for example, KrystalFlex PE505 available from Huntsman. In even further aspects, the second portion can comprise an ethylene acid copolymer. An exemplary aspect of an ethylene acid copolymer includes SURLYN available from Dow (e.g., Surlyn PC-2000, Surlyn 8940, Surlyn 8150). An additional exemplary aspect for the second portion comprises Eleglass w802-GL044 available from Axalta with from 1 wt % to 2 wt % cross-linker. In aspects, the polymer-based portion 241 can further comprise nanoparticles, for example, carbon black, carbon nanotubes, silica nanoparticles, or nanoparticles comprising a polymer. In aspects, the polymer-based portion can further comprise fibers to form a polymer-fiber composite.

In aspects, the polymer-based portion 241 can comprise a coefficient of thermal expansion (CTE). As used herein, a coefficient of thermal expansion is measured in accordance with ASTM E289-17 using a Picoscale Michelson Interferometer between −20° C. and 40° C. In aspects, the polymer-based portion 241 can comprise particles of one or more of copper oxide, beta-quartz, a tungstate, a vanadate, a pyrophosphate, and/or a nickel-titanium alloy. In aspects, the polymer-based portion 241 can comprise a CTE of about −20×10$^{-7}$ 1/° C. or more, about −10×10$^{-7}$ 1/° C. or more, about −5×10$^{-7}$ 1/° C. or more, about −2×10$^{-7}$ 1/° C. or more, about 10×10$^{-7}$ 1/° C. or less, about 5×10$^{-7}$ 1/° C. or less, about 2×10$^{-7}$ 1/° C. or less, about 1×10$^{-7}$ 1/° C. or less, or 0 1/° C. or less. In aspects, the polymer-based portion 241 can comprise a CTE in a range from about −20×10$^{-7}$ 1/° C. to about 10×10$^{-7}$ 1/° C., from about −20×10$^{-7}$ 1/° C. to about 5×10$^{-7}$ 1/° C., from about −10×10$^{-7}$ 1/° C. to about −5×10$^{-7}$ 1/° C., from about −10×10$^{-7}$ 1/° C. to about 2×10$^{-7}$ 1/° C., from about −10×10$^{-7}$ 1/° C. to 0 1/° C., from about −5×10$^{-7}$ 1/° C. to 0 1/° C., from about −2×10$^{-7}$ 1/° C. to about 0 1/° C., or any range or subrange therebetween. By providing a polymer-based portion comprising a low (e.g., negative) coefficient of thermal expansion, warp caused by volume changes during curing of the polymer-based portion can be mitigated.

In aspects, the polymer-based portion 241 can comprise an elastic modulus of about 0.01 MegaPascals (MPa) or more, about 1 MPa or more, about 10 MPa or more, about 20 MPa or more, about 100 MPa or more, about 200 MPa or more, about 1,000 MPa or more, about 5,000 MPa or less, about 3,000 MPa or less, about 1,000 MPa or less, about 500 MPa or less, or about 200 MPa or less. In aspects, the polymer-based portion 241 can comprise an elastic modulus in a range from about 0.001 MPa to about 5,000 MPa, from about 0.01 MPa to about 3,000 MPa, from about 0.01 MPa to about 1,000 MPa, from about 0.01 MPa to about 500 MPa, from about 0.01 MPa to about 200 MPa, from about 1 MPa to about 5,000 MPa, from about 1 MPa to about 1,000 MPa, from about 1 MPa to about 1,000 MPa, from about 1 MPa to about 200 MPa, from about 10 MPa to about 5,000 MPa, from about 10 MPa to about 1,000 MPa, from about 10 MPa to about 200 MPa, from about 20 MPa to about 3,000 MPa, from about 20 MPa to about 1,000 MPa, from about 20 MPa to about 200 MPa, from about 100 MPa to about 3,000 MPa, from about 100 MPa to about 1,000 MPa, from about 100 MPa to about 200 MPa, from about 200 MPa to about 5,000 MPa, from about 200 MPa to about 3,000 MPa, from about 200 MPa to about 1,000 MPa, or any range or subrange therebetween. In aspects, the elastic modulus of the polymer-based portion 241 can be in a range from about 1 GPa to about 20 GPa, from about 1 GPa to about 18 GPa, from about 1 GPa to about 10 GPa, from about 1 GPa to about 5 GPa, from about 1 GPa to about 3 GPa, or any range or subrange therebetween. By providing a polymer-based portion 241 with an elastic modulus in a range from about 0.01 MPa to about 3,000 MPa (e.g., in a range from about 20 MPa to about 3 GPa), folding of the foldable apparatus without failure can be facilitated. In aspects, the adhesive layer 261 comprises an elastic modulus greater than the elastic modulus of the polymer-based portion 241, which arrangement provides improved performance in puncture resistance. In aspects, the elastic modulus of the polymer-based portion 241 can be less than the elastic modulus of the foldable substrate 206 (e.g., first portion 229, second portion 239, substrate layer 201). In aspects, the adhesive layer 261 may comprise an elastic modulus within the ranges listed above in this paragraph. In further aspects, the adhesive layer 261 may comprise substantially the same elastic modulus as the elastic modulus of the polymer-based portion 241. In further aspects, the elastic modulus of the adhesive layer 261 can be in a range from about 1 GPa to about 20 GPa, from about 1 GPa to about 18 GPa, from about 1 GPa to about 10 GPa, from about 1 GPa to about 5 GPa, from about 1 GPa to about 3 GPa, or any range or subrange therebetween. In aspects, the elastic modulus of the polymer-based portion 241 can be less than the elastic modulus of the first portion 229. In aspects, the elastic modulus of the polymer-based portion 241 can be less than the elastic modulus of the second portion 239.

In aspects, as shown in FIGS. 2-5 and 7-8, a coating 251 can be disposed over the foldable substrate 206. In further aspects, as shown in FIGS. 2 and 7, the coating 251 can be disposed over the first portion 229, the second portion 239, and the central region 281. In further aspects, as shown in FIGS. 2 and 7, the coating 251 can be disposed over the first major surface 203 of the substrate layer 201. In further aspects, as shown in FIGS. 3-4 and 8, the coating can be disposed over the second major surface 205 of the substrate layer 201. In aspects, the coating 251 can comprise a third major surface 253 and a fourth major surface 255 opposite the third major surface 253. In further aspects, as shown in FIGS. 3-4 and 8, the coating 251 (e.g., fourth major surface 255) can contact the foldable substrate 206 (e.g., second major surface 205 of the substrate layer 201). In further aspects, as shown in FIGS. 2 and 7, the coating 251 (e.g., fourth major surface 255) can contact the foldable substrate 206 (e.g., first outer surface area 223 of the first portion 229, second outer surface area 233 of the second portion 239, and the first central surface area 209 of the first major surface 203 of the substrate layer 201). In even further aspects, at least a part of the coating 251 can be positioned in the recess 234. In even further aspects, the coating 251 can partially or entirely fill the recess 234. In further aspects, the coating 251 can comprise a coating thickness 257 defined between the third major surface 253 and the fourth major surface 255. In further aspects, the coating thickness 257 can be about 0.1 µm or more, about 1 µm or more, about 5 µm or more, about 10 µm or more, about 15 µm or more, about 20 µm or more, about 25 µm or more, about 40 µm or more, about 50 µm or more, about 60 µm or more, about 70 µm or more, about 80 µm or more, about 90 µm or more, about 200 µm or less, about 100 µm or less, or about 50 µm or less, about 30 µm or less, about 25 µm or less, about 20 µm or less, about 20 µm or less, about 15 µm or less, or about 10 µm or less. In aspects, the coating thickness 257 can be in a range from about 0.1 µm to about 200 µm, from about 1 µm to about 200 µm, from about 10 µm to about 200 µm, from about 50 µm to about 200 µm, from about 0.1 µm to about 100 µm, from about 1 µm to about 100 µm, from about 10 µm to about 100 µm, from about 20 µm to about 100 µm, from about 30 µm to about 100 µm, from about 40 µm to about 100 µm, from about 50 µm to about 100 µm, from about 60 µm to about 100 µm, from about 70 µm to about 100 µm, from about 80 µm to about 100 µm, from about 90 µm to about 100 µm, from about 0.1 µm to about 50 µm, from about 1 µm to about 50 µm, from about 10 µm to about 50 µm, or any range or subrange therebetween. In further aspects, the coating thickness 257 can be in a range from about 0.1 µm to about 50 µm, from about 0.1 µm to about 30 µm, from about 0.1 µm to about 25 µm, from about 0.1 µm to about 20 µm, from about 0.1 µm to about 15 µm, from about 0.1 µm to about 10 µm, from about 1 µm to about 30 µm, from about 1 µm to about 25 µm, from about 1 µm to about 20 µm, from about 1 µm to about 15 µm, from about 1 µm to about 10 µm, from about 5 µm to about 30 µm, from about 5 µm to about 25 µm, from about 5 µm to about 20 µm, from about 5 µm to about 15 µm, from about 5 µm to about 10 µm, from about 10 µm to about 30 µm, from about 10 µm to about 25 µm, from about 10 µm to about 20 µm, from about 10 µm to about 15 µm, from about 15 µm to about 30 µm, from about 15 µm to about 25 µm, from about 15 µm to about 20 µm, from about 20 µm to about 30 µm, from about 20 µm to about 25 µm, or any range or subrange therebetween.

In aspects, the polymer-based portion and/or the adhesive layer can comprise a strain at yield. Providing a recess opposite a second recess can reduce the strain encountered by the polymer-based portion or other material (e.g., adhesive layer) in the recess (e.g., from 0% to 50% reduction). Consequently, requirements for the strain at yield of the polymer-based portion can be relaxed. In aspects, the strain at yield of the polymer-based portion and/or adhesive layer can be about 3% or more, about 4% or more, about 5% or more, about 6% or more, about 7% or more, about 500% or less, about 100% or less, about 50% or less, about 20% or less, about 15% or less, about 10% or less, about 9% or less, or about 8% or less. In aspects, the strain at yield of the polymer-based portion and/or adhesive layer can be in a range from about 1% to about 500%, from about 1% to about 100%, from about 2% to about 100%, from about 2% to about 50%, from about 3% to about 50%, from about 3% to about 20%, from about 4% to about 20%, from about 4% to about 15%, from about 5% to about 15%, from about 5% to about 10%, from about 5% to about 9%, from about 6% to about 9%, from about 6% to about 8%, from about 7% to about 8% or any range or subrange therebetween.

In aspects, the coating 251 can comprise a polymeric hard coating. In further aspects, the polymeric hard coating can comprise one or more of an ethylene-acid copolymer, a polyurethane-based polymer, an acrylate resin, and a mercapto-ester resin. Example aspects of ethylene-acid copolymers include ethylene-acrylic acid copolymers, ethylene-methacrylic acid copolymers, and ethylene-acrylic-methacrylic acid terpolymers (e.g., Nucrel, manufactured by DuPont), ionomers of ethylene acid copolymers (e.g., Surlyn, manufactured by DuPont), and ethylene-acrylic acid copolymer amine dispersions (e.g., Aquacer, manufactured by BYK). Example aspects of polyurethane-based polymers include aqueous modified polyurethane dispersions (e.g., Eleglas®, manufactured by Axalta). Example aspects of acrylate resins which can be UV curable include acrylate resins (e.g., Uvekol® resin, manufactured by Allinex), cyanoacrylate adhesives (e.g., Permabond® UV620, manufactured by Krayden), and UV radical acrylic resins (e.g., Ultrabond windshield repair resin, for example, Ultrabond (45CPS)). Example aspects of mercapto-ester resins include mercapto-ester triallyl isocyanurates (e.g., Norland optical adhesive NOA 61). In further aspects, the polymeric hard coating can comprise ethylene-acrylic acid copolymers and ethylene-methacrylic acid copolymers, which may be ionomerized to form ionomer resins through neutralization of the carboxylic acid residue with typically alkali metal ions, for example, sodium and potassium, and also zinc. Such ethylene-acrylic acid and ethylene-methacrylic acid ionomers may be dispersed within water and coated onto the substrate to form an ionomer coating. Alternatively, such acid copolymers may be neutralized with ammonia which, after coating and drying liberates the ammonia to reform the acid copolymer as the coating. By providing a coating comprising a polymeric coating, the foldable apparatus can comprise low energy fracture.

In aspects, the coating can comprise a polymeric hard coating comprising an optically transparent polymeric hard-coat layer. Suitable materials for an optically transparent polymeric hard-coat layer include, but are not limited to: a cured acrylate resin material, an inorganic-organic hybrid polymeric material, an aliphatic or aromatic hexafunctional urethane acrylate, a siloxane-based hybrid material, and a nanocomposite material, for example, an epoxy and urethane material with nanosilicate. In aspects, an optically transparent polymeric hard-coat layer may consist essentially of one or more of these materials. In aspects, an optically transparent polymeric hard-coat layer may consist of one or more of these materials. As used herein, "inorganic-organic hybrid polymeric material" means a polymeric material comprising monomers with inorganic and organic components. An inorganic-organic hybrid polymer is obtained by a polymerization reaction between monomers having an inorganic group and an organic group. An inorganic-organic hybrid polymer is not a nanocomposite material comprising separate inorganic and organic constituents or phases, for example, inorganic particulates dispersed within an organic matrix. More specifically, suitable materials for an optically transparent polymeric (OTP) hard-coat layer include, but are not limited to, a polyimide, a polyethylene terephthalate (PET), a polycarbonate (PC), a poly methyl methacrylate (PMMA), organic polymer materials, inorganic-organic hybrid polymeric materials, and aliphatic or aromatic hexafunctional urethane acrylates. In aspects, an OTP hard-coat layer may consist essentially of an organic polymer material, an inorganic-organic hybrid polymeric material, or aliphatic or aromatic hexafunctional urethane acrylate. In aspects, an OTP hard-coat layer may consist of a polyimide, an organic polymer material, an inorganic-organic hybrid polymeric material, or aliphatic or aromatic hexafunctional urethane acrylate. In aspects, an OTP hard-coat layer may include a nanocomposite material. In aspects, an OTP hard-coat layer may include a nano-silicate at least one of epoxy and urethane materials. Suitable compositions for such an OTP hard-coat layer are described in U.S. Pat. Pub. No. 2015/0110990, which is hereby incorporated by reference in its entirety by reference thereto. As used herein, "organic polymer material" means a polymeric material comprising monomers with only organic components. In aspects, an OTP hard-coat layer may comprise an organic polymer material manufactured by Gunze Limited and having a hardness of 9H, for example Gunze's "Highly Durable Transparent Film." As used herein, "inorganic-organic hybrid polymeric material" means a polymeric material comprising monomers with inorganic and organic components. An inorganic-organic hybrid polymer is obtained by a polymerization reaction between monomers having an inorganic group and an organic group. An inorganic-organic hybrid polymer is not a nanocomposite material comprising separate inorganic and organic constituents or phases, for example, inorganic particulates dispersed within an organic matrix. In aspects, the inorganic-organic hybrid polymeric material may include polymerized monomers comprising an inorganic silicon-based group, for example, a silsesquioxane polymer. A silsesquioxane polymer may be, for example, an alky-silsesquioxane, an aryl-silsesquioxane, or an aryl alkyl-silsesquioxane having the following chemical structure: $(RSiO_{1.5})_n$, where R is an organic group for example, but not limited to, methyl or phenyl. In aspects, an OTP hard-coat layer may comprise a silsesquioxane polymer combined with an organic matrix, for example, SILPLUS manufactured by Nippon Steel Chemical Co., Ltd. In aspects, an OTP hard-coat layer may comprise 90 wt % to 95 wt % aromatic hexafunctional urethane acrylate (e.g., PU662NT (Aromatic hexafunctional urethane acrylate) manufactured by Miwon Specialty Chemical Co.) and 10 wt % to 5 wt % photo-initiator (e.g., Darocur 1173 manufactured by Ciba Specialty Chemicals Corporation) with a hardness of 8H or more. In aspects, an OTP hard-coat layer composed of an aliphatic or aromatic hexafunctional urethane acrylate may be formed as a stand-alone layer by spin-coating the layer on a polyethylene terephthalate (PET) substrate, curing the urethane acrylate, and removing the urethane acrylate layer from the PET substrate. An OTP hard-coat layer may have a coating thickness (e.g., coating thickness 257) in a range of 1 µm to 150 µm, including subranges. For example, the coating thickness (e.g., coating thickness 257) can be in a range from 10 µm to 140 µm, from 20 µm to 130 µm, 30 µm to 120 µm, from 40 µm to 110 µm, from 50 µm to 100 µm, from 60 µm to 90 µm, 70 µm, 80 µm, 2 µm to 140 µm, from 4 µm to 130 µm, 6 µm to 120 µm, from 8 µm to 110 µm, from 10 µm to 100 µm, from 10 µm to 90 µm, 10 µm, 80 µm, 10 µm, 70 µm, 10 µm, 60 µm, 10 µm, 50 µm, or within a range having any two of these values as endpoints. In aspects, an OTP hard-coat layer may be a single monolithic layer. In aspects, an OTP hard-coat layer may be an inorganic-organic hybrid polymeric material layer or an organic polymer material layer having a thickness in the range of 80 µm to 120 µm, including subranges. For example, an OTP hard-coat layer comprising an inorganic-organic hybrid polymeric material or an organic polymer material may have a thickness of from 80 µm to 110 µm, 90 µm to 100 µm, or within a range having any two of these values as endpoints. In aspects, an OTP hard-coat layer may be an aliphatic or aromatic hexafunctional urethane acrylate material layer having a thickness in the range of 10 µm to 60 µm, including subranges. For example, an OTP hard-coat layer comprising an aliphatic or aromatic hexafunctional urethane acrylate material may have a thickness of 10 µm to 55 µm, 10µ m to 50 µm, 10µ m to 40 µm, 10 µm to 45 µm, 10µ m to 40 µm, 10µ m to 35 µm, 10 µm to 30 µm, 10 µm to 25 µm, 10 µm to 20 µm, or within a range having any two of these values as endpoints.

In aspects, the coating 251, if provided, may also comprise one or more of an easy-to-clean coating, a low-friction coating, an oleophobic coating, a diamond-like coating, a scratch-resistant coating, or an abrasion-resistant coating. A scratch-resistant coating may comprise an oxynitride, for example, aluminum oxynitride or silicon oxynitride with a thickness of about 500 micrometers or more. In such aspects, the abrasion-resistant layer may comprise the same material as the scratch-resistant layer. In aspects, a low friction coating may comprise a highly fluorinated silane coupling agent, for example, an alkyl fluorosilane with oxymethyl groups pendant on the silicon atom. In such aspects, an easy-to-clean coating may comprise the same material as the low friction coating. In other aspects, the easy-to-clean coating may comprise a protonatable group, for example an amine, or an alkyl aminosilane with oxymethyl groups pendant on the silicon atom. In such aspects, the oleophobic coating may comprise the same material as the easy-to-clean coating. In aspects, a diamond-like coating comprises carbon and may be created by applying a high voltage potential in the presence of a hydrocarbon plasma.

Providing a recess opposite a second recess can reduce a bend-induced strain of a material positioned in the recess and/or second recess compared to a single recess with a surface recessed by the sum of the first distance and the second distance. Providing a reduced bend-induced strain of a material positioned in the recess and/or the second recess can enable the use of a wider range of materials because of the reduced strain requirements for the material. For example, stiffer and/or more rigid materials (e.g., coating 251) can be positioned in the recess, which can improve impact resistance, puncture resistance, abrasion resistance, and/or scratch resistance of the foldable apparatus. Additionally, controlling properties of a first material (e.g., coating 251) positioned in a recess and a second material positioned in a second recess can control the position of a neutral axis of the foldable apparatus and/or foldable substrates, which can reduce (e.g., mitigate, eliminate) the incidence of mechanical instabilities, apparatus fatigue, and/or apparatus failure.

In aspects, as shown in FIGS. 2 and 4, the foldable apparatus 101 and 401 can comprise the release liner 271 although other substrates (e.g., glass-based substrate and/or ceramic-based substrate discussed throughout the application) may be used in further aspects rather than the illustrated release liner 271. In further aspects, as shown, the release liner 271, or another substrate, can be disposed over the adhesive layer 261. In even further aspects, as shown, the release liner 271, or another substrate, can directly contact the second contact surface 265 of the adhesive layer 261. The release liner 271, or another substrate, can comprise a first major surface 273 and a second major surface 275 opposite the first major surface 273. As shown, the release liner 271, or another substrate, can be disposed on the adhesive layer 261 by attaching the second contact surface 265 of the adhesive layer 261 to the first major surface 273 of the release liner 271, or another substrate. In aspects, as shown, the first major surface 273 of the release liner 271, or another substrate, can comprise a planar surface. In aspects, as shown, the second major surface 275 of the release liner 271, or another substrate, can comprise a planar surface. A substrate comprising the release liner 271 can comprise a paper and/or a polymer. Exemplary aspects of paper comprise kraft paper, machine-finished paper, poly-coated paper (e.g., polymer-coated, glassine paper, siliconized paper), or clay-coated paper. Exemplary aspects of polymers comprise polyesters (e.g., polyethylene terephthalate (PET)) and polyolefins (e.g., low-density polyethylene (LDPE), high-density polyethylene (HDPE), polypropylene (PP)).

In aspects, as shown in FIGS. 3, and 8, the foldable apparatus 301 and 801 can comprise the display device 307. In further aspects, as shown, the display device 307 can be disposed over the adhesive layer 261. In further aspects, as shown, the display device 307 can contact the second contact surface 265 of the adhesive layer 261. In aspects, producing a foldable apparatus resembling the foldable apparatus 301, or 801 may be achieved by removing the release liner 271 of the foldable apparatus 101 or 401 of FIGS. 2 and 4 and attaching the display device 307 to the second contact surface 265 of the adhesive layer 261. Alternatively, the foldable apparatus 301 may be produced without the extra step of removing a release liner 271 before attaching the display device 307 to the second contact surface 265 of the adhesive layer 261, for example, when a release liner 271 is not applied to the second contact surface 265 of the adhesive layer 261. The display device 307 can comprise a first major surface 303 and a second major surface 305 opposite the first major surface 303. As shown, the display device 307 can be disposed on the adhesive layer 261 by attaching the second contact surface 265 of the adhesive layer 261 to the second major surface 305 of the display device 307. In aspects, as shown, the first major surface 303 of the display device 307 can comprise a planar surface. In aspects, as shown, the first major surface 303 of the display device 307 can comprise a planar surface. The display device 307 can comprise a liquid crystal display (LCD), an electrophoretic display (EPD), an organic light-emitting diode (OLED) display, or a plasma display panel (PDP). In aspects, the display device 307 can be part of a portable electronic device, for example, a consumer electronic product, a smartphone, a tablet, a wearable device, or a laptop.

Aspects of the disclosure can comprise a consumer electronic product. The consumer electronic product can comprise a front surface, a back surface, and side surfaces. The consumer electronic product can further comprise electrical components at least partially within the housing. The electrical components can comprise a controller, a memory, and a display. The display can be at or adjacent to the front surface of the housing. The consumer electronic product can comprise a cover substrate disposed over the display. In aspects, at least one of a portion of the housing or the cover substrate comprises the foldable apparatus discussed throughout the disclosure.

Figure 9:
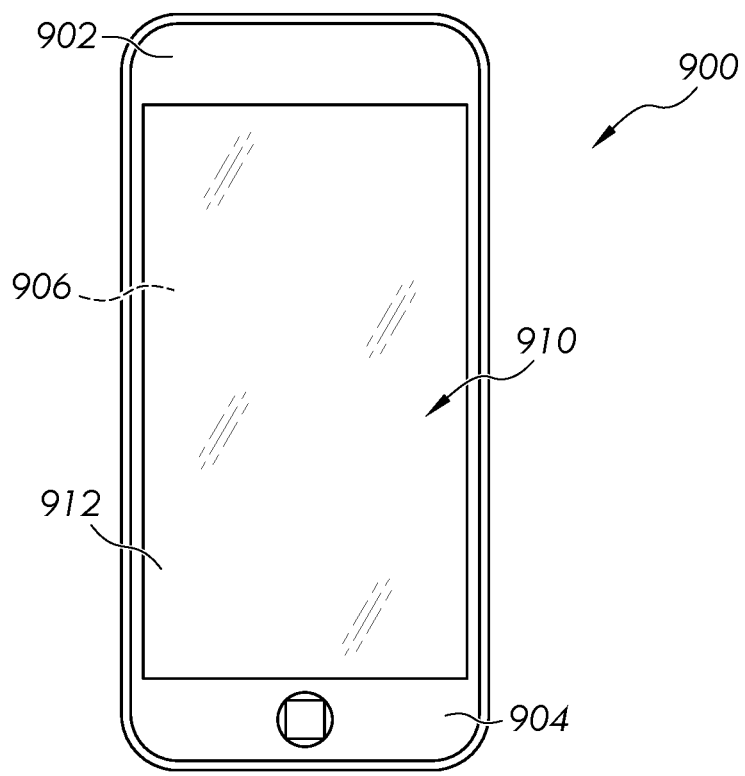
FIG. 9 is a schematic plan view of an example consumer electronic device according to aspects.
Figure 10:
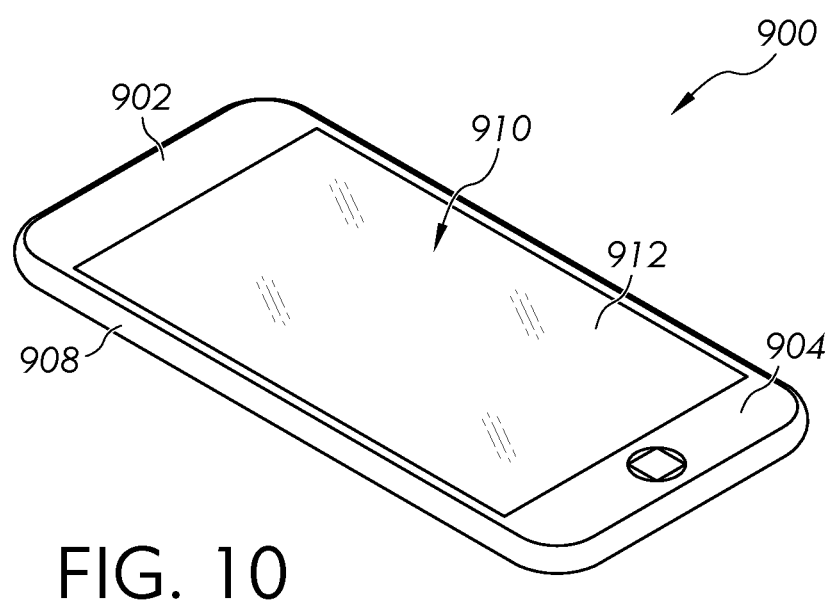
FIG. 10 is a schematic perspective view of the example consumer electronic device of FIG. 9.

The foldable apparatus disclosed herein may be incorporated into another article, for example, an article with a display (or display articles) (e.g., consumer electronics, including mobile phones, tablets, computers, navigation systems, wearable devices (e.g., watches) and the like), architectural articles, transportation articles (e.g., automotive, trains, aircraft, sea craft, etc.), appliance articles, or any article that may benefit from some transparency, scratch-resistance, abrasion resistance or a combination thereof. An exemplary article incorporating any of the foldable apparatus disclosed herein is shown in FIGS. 9-10. Specifically, FIGS. 9-10 show a consumer electronic device 900 including a housing 902 having front 904, back 906, and side surfaces 908. The consumer electronic product can comprise electrical components (not shown) that are at least partially inside or entirely within the housing and include at least a controller, a memory, and a display 910 at or adjacent to the front surface of the housing. The consumer electronic device comprises a cover substrate 912 at or over the front surface of the housing such that it is over the display. In aspects, at least one of the cover substrate 912 or a portion of housing 902 may include any of the foldable apparatus disclosed herein, for example, the foldable substrate.

In aspects, the foldable substrate 206 can comprise the substrate layer 201 comprising a glass-based substrate and/or a ceramic-based substrate, the first portion 229 comprising a glass-based substrate and/or a ceramic-based substrate, and/or the second portion 239 comprising a glass-based substrate and/or a ceramic-based substrate. In further aspects, the foldable substrate 206 can comprise one or more compressive stress regions. In aspects, a compressive stress region may be created by chemically strengthening. Chemically strengthening may comprise an ion exchange process, where ions in a surface layer are replaced by—or exchanged with—larger ions having the same valence or oxidation state. Methods of chemically strengthening will be discussed later. Without wishing to be bound by theory, chemically strengthening the substrate layer 201, the first portion 229, and/or the second portion 239 can enable good impact resistance and/or puncture resistance (e.g., resists failure for a pen drop height of about 15 centimeters (cm) or more, about 20 cm or more, about 50 cm or more). However, in aspects, puncture resistance can be improved by chemically strengthening the substrate layer 201 without chemically strengthening the first portion 229 and/or the second portion 239. Without wishing to be bound by theory, chemically strengthening the substrate layer 201, the first portion 229, and/or the second portion 239 can enable small (e.g., smaller than about 10 mm or less) bend radii because the compressive stress from the chemical strengthening can counteract the bend-induced tensile stress on the outermost surface of the substrate. A compressive stress region may extend into a portion of the first portion and/or the second portion for a depth called the depth of compression. As used herein, depth of compression means the depth at which the stress in the chemically strengthened substrates and/or portions described herein changes from compressive stress to tensile stress. Depth of compression may be measured by a surface stress meter or a scattered light polariscope (SCALP, wherein values reported herein were made using SCALP-5 made by Glasstress Co., Estonia) depending on the ion exchange treatment and the thickness of the article being measured. Where the stress in the substrate and/or portion is generated by exchanging potassium ions into the substrate, a surface stress meter, for example, the FSM-6000 (Orihara Industrial Co., Ltd. (Japan)), is used to measure depth of compression. Unless specified otherwise, compressive stress (including surface CS) is measured by surface stress meter (FSM) using commercially available instruments, for example the FSM-6000, manufactured by Orihara. Surface stress measurements rely upon the accurate measurement of the stress optical coefficient (SOC), which is related to the birefringence of the glass. Unless specified otherwise, SOC is measured according to Procedure C (Glass Disc Method) described in ASTM standard C770-16, entitled "Standard Test Method for Measurement of Glass Stress-Optical Coefficient," the contents of which are incorporated herein by reference in their entirety. Where the stress is generated by exchanging sodium ions into the substrate, and the article being measured is thicker than about 400 μm, SCALP is used to measure the depth of compression and central tension (CT). Where the stress in the substrate and/or portion is generated by exchanging both potassium and sodium ions into the substrate and/or portion, and the article being measured is thicker than about 400 μm, the depth of compression and CT are measured by SCALP. Without wishing to be bound by theory, the exchange depth of sodium may indicate the depth of compression while the exchange depth of potassium ions may indicate a change in the magnitude of the compressive stress (but not the change in stress from compressive to tensile). The refracted near-field (RNF; the RNF method is described in U.S. Pat. No. 8,854,623, entitled "Systems and methods for measuring a profile characteristic of a glass sample", which is incorporated herein by reference in its entirety) method also may be used to derive a graphical representation of the stress profile. When the RNF method is utilized to derive a graphical representation of the stress profile, the maximum central tension value provided by SCALP is utilized in the RNF method. The graphical representation of the stress profile derived by RNF is force balanced and calibrated to the maximum central tension value provided by a SCALP measurement. As used herein, "depth of layer" (DOL) means the depth that the ions have exchanged into the substrate and/or portion (e.g., sodium, potassium). Through the disclosure, when the maximum central tension cannot be measured directly by SCALP (as when the article being measured is thinner than about 400 μm) the maximum central tension can be approximated by a product of a maximum compressive stress and a depth of compression divided by the difference between the thickness of the substrate and twice the depth of compression, wherein the compressive stress and depth of compression are measured by FSM.

In aspects, the substrate layer 201 comprising the glass-based portion and/or ceramic-based portion may comprise a first compressive stress region extending from the first major surface 203 to a first depth of compression. In further aspects, the first compressive stress region can extend from the first central surface area 209. In aspects, the substrate layer 201 comprising the glass-based portion and/or ceramic-based portion may comprise a second compressive stress region extending from the second major surface 205 to a second depth of compression. In aspects, the first depth of compression and/or the second depth of compression as a percentage of the layer thickness 207 can be about 1% or more, about 5% or more, about 10% or more, about 30% or less, about 25% or less, or about 20% or less. In aspects, the first depth of compression and/or the second depth of compression as a percentage of the layer thickness 207 can be in a range from about 1% to about 30%, from about 5% to about 30%, from about 5% to about 25%, from about 5% to about 20%, from about 10% to about 30%, from about 10% to about 25%, from about 10% to about 20%, or any range or subrange therebetween. In further aspects, the first depth of compression and/or the second depth of compression as a percentage of the layer thickness 207 can be about 10% or less, for example, from about 1% to about 10%, from about 1% to about 8%, from about 3% to about 8%, from about 5% to about 8%, or any range or subrange therebetween.

In aspects, the first compressive stress region can comprise a first maximum compressive stress. In aspects, the second compressive stress region can comprise a second maximum compressive stress. In further aspects, the first maximum compressive stress and/or the second maximum compressive stress can be about 100 MegaPascals (MPa) or more, about 300 MPa or more, about 500 MPa or more, about 600 MPa or more, about 700 MPa or more, about 1,500 MPa or less, about 1,200 MPa or less, about 1,000 MPa or less, or about 800 MPa or less. In further aspects, the first maximum compressive stress and/or the second maximum compressive stress can be in a range from about 100 MPa to about 1,500 MPa, from about 100 MPa to about 1,200 MPa, from about 300 MPa to about 1,200 MPa, from about 300 MPa to about 1,000 MPa, from about 500 MPa to about 1,000 MPa, from about 600 MPa to about 1,000 MPa, from about 600 MPa to about 1,000 MPa, from about 700 MPa to about 1,000 MPa, from about 700 MPa to about 800 MPa, or any range or subrange therebetween. By providing a first maximum compressive stress and/or a second maximum compressive stress in a range from about 100 MPa to about 1,500 MPa, good impact and/or puncture resistance can be enabled.

In aspects, the substrate layer 201 can comprise a first depth of layer of one or more alkali metal ions associated with the first compressive stress region and the first depth of compression. In aspects, the substrate layer 201 can comprise a second depth of layer of one or more alkali metal ions associated with the second compressive stress region and the second depth of compression. As used herein, the one or more alkali metal ions of a depth of layer of one or more alkali metal ions can include sodium, potassium, rubidium, cesium, and/or francium. In aspects, the one or more alkali ions of the first depth of layer of the one or more alkali ions and/or the second depth of layer of the one or more alkali ions comprises potassium. In aspects, the first depth of layer and/or the second depth of layer as a percentage of the layer thickness 207 can be about 1% or more, about 5% or more, about 10% or more, about 40% or less, about 35% or less, about 30% or less, about 25% or less, or about 20% or less. In aspects, the first depth of layer and/or the second depth of layer as a percentage of the layer thickness 207 can be in a range from about 1% to about 40%, from about 1% to about 35%, from about 1% to about 30%, from about 1% to about 25%, from about 1% to about 20%, from about 5% to about 30%, from about 5% to about 25%, from about 5% to about 20%, from about 10% to about 30%, from about 10% to about 25%, from about 10% to about 20%, or any range or subrange therebetween. In further aspects, the first depth of layer of the one or more alkali metal ions and/or the second depth of layer of the one or more alkali metal ions as a percentage of the layer thickness 207 can be about 10% or less, for example, from about 1% to about 10%, from about 1% to about 8%, from about 3% to about 8%, from about 5% to about 8%, or any range or subrange therebetween. In aspects, the first depth of layer of the one or more alkali metal ions and/or the second depth of layer of the one or more alkali metal ions can be about 1 µm or more, about 10 µm or more, about 30 µm or more, about 50 µm or more, about 200 µm or less, about 150 µm or less, about 100 µm or less, or about 60 µm or less. In aspects, the first depth of layer of the one or more alkali metal ions and/or the second depth of layer of the one or more alkali metal ions can be in a range from about 1 µm to about 200 µm, from about 1 µm to about 150 µm, from about 10 µm to about 150 µm, from about 10 µm to about 100 µm, from about 30 µm to about 100 µm, from about 30 µm to about 60 µm, from about 50 µm to about 60 µm, or any range or subrange therebetween.

In aspects, the substrate layer 201 may comprise a first tensile stress region. In aspects, the first tensile stress region can be positioned between the first compressive stress region and the second compressive stress region. In aspects, the first tensile stress region can comprise a first maximum tensile stress. In further aspects, the first maximum tensile stress can be about 10 MPa or more, about 20 MPa or more, about 30 MPa or more, about 100 MPa or less, about 80 MPa or less, or about 60 MPa or less. In further aspects, the first maximum tensile stress can be in a range from about 10 MPa to about 100 MPa, from about 10 MPa to about 80 MPa, from about 10 MPa to about 60 MPa, from about 20 MPa to about 100 MPa, from about 20 MPa to about 80 MPa, from about 20 MPa to about 60 MPa, from about 30 MPa to about 100 MPa, from about 30 MPa to about 80 MPa, from about 30 MPa to about 60 MPa, or any range or subrange therebetween. Providing a first maximum tensile stress in a range from about 10 MPa to about 100 MPa can enable good impact and/or puncture resistance while providing low energy fractures, as discussed below.

In aspects, the first portion 229 comprising the glass-based portion and/or ceramic-based portion may comprise a third compressive stress region at the first outer surface area 223 that can extend to a third depth of compression from the first outer surface area 223. In aspects, the first portion 229 comprising a first glass-based and/or ceramic-based portion may comprise a fourth compressive stress region at the first inner surface area 225 that can extend to a fourth depth of compression from the second inner surface area 235. In aspects, the third depth of compression and/or the fourth depth of compression as a percentage of the first thickness 227 can be about 1% or more, about 5% or more, about 10% or more, about 30% or less, about 25% or less, or about 20% or less. In aspects, the third depth of compression and/or the fourth depth of compression as a percentage of the first thickness 227 can be in a range from about 1% to about 30%, from about 5% to about 30%, from about 5% to about 25%, from about 5% to about 20%, from about 10% to about 30%, from about 10% to about 25%, from about 10% to about 20%, or any range or subrange therebetween. In further aspects, the third depth of compression and/or the fourth depth of compression as a percentage of the first thickness 227 can be about 10% or less, for example, from about 1% to about 10%, from about 1% to about 8%, from about 3% to about 8%, from about 5% to about 8%, or any range or subrange therebetween. In further aspects, the third depth of compression can be substantially equal to the fourth depth of compression.

In aspects, the third depth of compression and/or the fourth depth of compression can be about 1 µm or more, about 10 µm or more, about 30 µm or more, about 50 µm or more, about 200 µm or less, about 150 µm or less, about 100 µm or less, or about 60 µm or less. In aspects, the third depth of compression and/or the fourth depth of compression can be in a range from about 1 µm to about 200 µm, from about 1 µm to about 150 µm, from about 10 µm to about 150 µm, from about 10 µm to about 100 µm, from about 30 µm to about 100 µm, from about 30 µm to about 60 µm, from about 50 µm to about 60 µm, or any range or subrange therebetween. By providing a first portion comprising a first glass-based and/or ceramic-based portion comprising a first depth of compression and/or a second depth of compression in a range from about 1% to about 30% of the first thickness, good impact and/or puncture resistance can be enabled.

In aspects, the third compressive stress region can comprise a third maximum compressive stress. In aspects, the fourth compressive stress region can comprise a fourth maximum compressive stress. In further aspects, the third maximum compressive stress and/or the fourth maximum compressive stress can be about 100 MegaPascals (MPa) or more, about 300 MPa or more, about 500 MPa or more, about 600 MPa or more, about 700 MPa or more, about 1,500 MPa or less, about 1,200 MPa or less, about 1,000 MPa or less, or about 800 MPa or less. In further aspects, the third maximum compressive stress and/or the fourth maximum compressive stress can be in a range from about 100 MPa to about 1,500 MPa, from about 100 MPa to about 1,200 MPa, from about 300 MPa to about 1,200 MPa, from about 300 MPa to about 1,000 MPa, from about 500 MPa to about 1,000 MPa, from about 600 MPa to about 1,000 MPa, from about 600 MPa to about 1,000 MPa, from about 700 MPa to about 1,000 MPa, from about 700 MPa to about 800 MPa, or any range or subrange therebetween. By providing a third maximum compressive stress and/or a fourth maximum compressive stress in a range from about 100 MPa to about 1,500 MPa, good impact and/or puncture resistance can be enabled.

In aspects, the first portion 229 can comprise a third depth of layer of one or more alkali metal ions associated with the third compressive stress region and the third depth of compression. In aspects, the first portion 229 can comprise a fourth depth of layer of one or more alkali metal ions associated with the fourth compressive stress region and the fourth depth of compression. In aspects, the one or more alkali ions of the third depth of layer of the one or more alkali ions and/or the fourth depth of layer of the one or more alkali ions comprises potassium. In aspects, the third depth of layer and/or the fourth depth of layer as a percentage of the first thickness 227 can be about 1% or more, about 5% or more, about 10% or more, about 40% or less, about 35% or less, about 30% or less, about 25% or less, or about 20% or less. In aspects, the third depth of layer and/or the fourth depth of layer as a percentage of the first thickness 227 can be in a range from about 1% to about 40%, from about 1% to about 35%, from about 1% to about 30%, from about 1% to about 25%, from about 1% to about 20%, from about 5% to about 30%, from about 5% to about 25%, from about 5% to about 20%, from about 10% to about 30%, from about 10% to about 25%, from about 10% to about 20%, or any range or subrange therebetween. In further aspects, the third depth of layer of the one or more alkali metal ions and/or the fourth depth of layer of the one or more alkali metal ions as a percentage of the first thickness 227 can be about 10% or less, for example, from about 1% to about 10%, from about 1% to about 8%, from about 3% to about 8%, from about 5% to about 8%, or any range or subrange therebetween. In aspects, the third depth of layer of the one or more alkali metal ions and/or the fourth depth of layer of the one or more alkali metal ions can be about 1 µm or more, about 10 µm or more, about 30 µm or more, about 50 µm or more, about 200 µm or less, about 150 µm or less, about 100 µm or less, or about 60 µm or less. In aspects, the third depth of layer of the one or more alkali metal ions and/or the fourth depth of layer of the one or more alkali metal ions can be in a range from about 1 µm to about 200 µm, from about 1 µm to about 150 µm, from about 10 µm to about 150 µm, from about 10 µm to about 100 µm, from about 30 µm to about 100 µm, from about 30 µm to about 60 µm, from about 50 µm to about 60 µm, or any range or subrange therebetween.

In aspects, the first portion 229 may comprise a second tensile stress region. In aspects, the second tensile stress region can be positioned between the third compressive stress region and the fourth compressive stress region. In aspects, the second tensile stress region can comprise a second maximum tensile stress. In further aspects, the second maximum tensile stress can be about 10 MPa or more, about 20 MPa or more, about 30 MPa or more, about 100 MPa or less, about 80 MPa or less, or about 60 MPa or less. In further aspects, the second maximum tensile stress can be in a range from about 10 MPa to about 100 MPa, from about 10 MPa to about 80 MPa, from about 10 MPa to about 60 MPa, from about 20 MPa to about 100 MPa, from about 20 MPa to about 80 MPa, from about 20 MPa to about 60 MPa, from about 30 MPa to about 100 MPa, from about 30 MPa to about 80 MPa, from about 30 MPa to about 60 MPa, or any range or subrange therebetween. Providing a second maximum tensile stress in a range from about 10 MPa to about 100 MPa can enable good impact and/or puncture resistance while providing low energy fractures, as discussed below.

In aspects, the first portion 229 may comprise a first unstressed region at the first outer surface area 223. In aspects, the first portion 229 may comprise a second unstressed region at the first inner surface area 225. Providing a first portion comprising a first unstressed region and/or a second unstressed region can enable good impact and/or puncture resistance, as demonstrated by examples discussed below. In aspects, the third depth of layer and/or the fourth depth of layer as a percentage of the first thickness 227 can be 0% or more, about 1% or more, about 2% or more, about 5% or less, about 3% or less, or about 1% or less. In aspects, the third depth of layer and/or the fourth depth of layer as a percentage of the first thickness 227 can be in a range from 0% to about 5%, from 0% to about 2%, from 0% to about 1%, from about 1% to about 5%, from about 2% to about 5%, or any range or subrange therebetween. Providing a first portion comprising a third depth of layer and/or a fourth depth of layer of from 0% to about 5% can enable good impact and/or puncture resistance, as demonstrated by examples discussed below. In aspects, the first portion 229 can comprise the third compressive stress region extending from the first outer surface area 223 while the first inner surface area 225 can comprise the second unstressed region.

In aspects, the second portion 239 comprising a second glass-based and/or ceramic-based portion may comprise a fifth compressive stress region at the second outer surface area 233 that can extend to a fifth depth of compression from the second outer surface area 233. In aspects, the second portion 239 comprising a second glass-based and/or ceramic-based portion may comprise a sixth compressive stress region at the second inner surface area 235 that can extend to a sixth depth of compression from the second inner surface area 235. In aspects, the fifth depth of compression and/or the sixth depth of compression as a percentage of the first thickness 227 can be about 1% or more, about 5% or more, about 10% or more, about 30% or less, about 25% or less, or about 20% or less. In aspects, the fifth depth of compression and/or the sixth depth of compression as a percentage of the first thickness 227 can be in a range from about 1% to about 30%, from about 5% to about 30%, from about 5% to about 25%, from about 5% to about 20%, from about 10% to about 30%, from about 10% to about 25%, from about 10% to about 20%, or any range or subrange therebetween. In further aspects, the fifth depth of compression can be substantially equal to the sixth depth of compression. In aspects, the fifth depth of compression and/or the sixth depth of compression can be about 1 µm or more, about 10 µm or more, about 30 µm or more, about 50 µm or more, about 200 µm or less, about 150 µm or less, about 100 µm or less, or about 60 µm or less. In aspects, the fifth depth of compression and/or the sixth depth of compression can be in a range from about 1 µm to about 200 µm, from about 1 µm to about 150 µm, from about 10 µm to about 150 µm, from about 10 µm to about 100 µm, from about 30 µm to about 100 µm, from about 30 µm to about 60 µm, from about 50 µm to about 60 µm, or any range or subrange therebetween. By providing a second portion comprising a glass-based and/or ceramic-based portion comprising a fifth depth of compression and/or a sixth depth of compression in a range from about 1% to about 30% of the substrate thickness, good impact and/or puncture resistance can be enabled.

In aspects, the fifth compressive stress region can comprise a fifth maximum compressive stress. In aspects, the sixth compressive stress region can comprise a sixth maximum compressive stress. In further aspects, the fifth maximum compressive stress and/or the sixth maximum compressive stress can be about 100 MegaPascals (MPa) or more, about 300 MPa or more, about 500 MPa or more, about 600 MPa or more, about 700 MPa or more, about 1,500 MPa or less, about 1,200 MPa or less, about 1,000 MPa or less, or about 800 MPa or less. In further aspects, the fifth maximum compressive stress and/or the sixth maximum compressive stress can be in a range from about 100 MPa to about 1,500 MPa, from about 100 MPa to about 1,200 MPa, from about 300 MPa to about 1,200 MPa, from about 300 MPa to about 1,000 MPa, from about 500 MPa to about 1,000 MPa, from about 600 MPa to about 1,000 MPa, from about 600 MPa to about 1,000 MPa, from about 700 MPa to about 1,000 MPa, from about 700 MPa to about 800 MPa, or any range or subrange therebetween. By providing a fifth maximum compressive stress and/or a sixth maximum compressive stress in a range from about 100 MPa to about 1,500 MPa, good impact and/or puncture resistance can be enabled.

In aspects, the second portion 239 can comprise a fifth depth of layer of one or more alkali metal ions associated with the fifth compressive stress region and the fifth depth of compression. In aspects, the second portion 239 can comprise a sixth depth of layer of one or more alkali metal ions associated with the sixth compressive stress region and the sixth depth of compression. In aspects, the one or more alkali ions of the fifth depth of layer of the one or more alkali ions and/or the sixth depth of layer of the one or more alkali ions comprises potassium. In aspects, the fifth depth of layer and/or the sixth depth of layer as a percentage of the first thickness 227 can be about 1% or more, about 5% or more, about 10% or more, about 40% or less, about 35% or less, about 30% or less, about 25% or less, or about 20% or less. In aspects, the fifth depth of layer and/or the sixth depth of layer as a percentage of the first thickness 227 can be in a range from about 1% to about 40%, from about 1% to about 35%, from about 1% to about 30%, from about 1% to about 25%, from about 1% to about 20%, from about 5% to about 30%, from about 5% to about 25%, from about 5% to about 20%, from about 10% to about 30%, from about 10% to about 25%, from about 10% to about 20%, or any range or subrange therebetween. In further aspects, the fifth depth of layer of the one or more alkali metal ions and/or the sixth depth of layer of the one or more alkali metal ions as a percentage of the first thickness 227 can be about 10% or less, for example, from about 1% to about 10%, from about 1% to about 8%, from about 3% to about 8%, from about 5% to about 8%, or any range or subrange therebetween. In aspects, the fifth depth of layer of the one or more alkali metal ions and/or the sixth depth of layer of the one or more alkali metal ions can be about 1 μm or more, about 10 μm or more, about 30 μm or more, about 50 μm or more, about 200 μm or less, about 150 μm or less, about 100 μm or less, or about 60 μm or less. In aspects, the fifth depth of layer of the one or more alkali metal ions and/or the sixth depth of layer of the one or more alkali metal ions can be in a range from about 1 μm to about 200 μm, from about 1 μm to about 150 μm, from about 10 μm to about 150 μm, from about 10 μm to about 100 μm, from about 30 μm to about 100 μm, from about 30 μm to about 60 μm, from about 50 μm to about 60 μm, or any range or subrange therebetween.

In aspects, the second portion 239 may comprise a third tensile stress region. In aspects, the third tensile stress region can be positioned between the fifth compressive stress region and the sixth compressive stress region. In aspects, the third tensile stress region can comprise a third maximum tensile stress. In further aspects, the third maximum tensile stress can be about 10 MPa or more, about 20 MPa or more, about 30 MPa or more, about 100 MPa or less, about 80 MPa or less, or about 60 MPa or less. In further aspects, the third maximum tensile stress can be in a range from about 10 MPa to about 100 MPa, from about 10 MPa to about 80 MPa, from about 10 MPa to about 60 MPa, from about 20 MPa to about 100 MPa, from about 20 MPa to about 80 MPa, from about 20 MPa to about 60 MPa, from about 30 MPa to about 100 MPa, from about 30 MPa to about 80 MPa, from about 30 MPa to about 60 MPa, or any range or subrange therebetween. Providing a third maximum tensile stress in a range from about 10 MPa to about 100 MPa can enable good impact and/or puncture resistance while providing low energy fractures, as discussed below.

In aspects, the second portion 239 may comprise a third unstressed region at the second outer surface area 233. In aspects, the second portion 239 may comprise a fourth unstressed region at the second inner surface area 235. Providing a second portion comprising a third unstressed region and/or a fourth unstressed region can enable good impact and/or puncture resistance, as demonstrated by examples discussed below. In aspects, the fifth depth of layer and/or the sixth depth of layer as a percentage of the first thickness 227 can be 0% or more, about 1% or more, about 2% or more, about 5% or less, about 3% or less, or about 1% or less. In aspects, the fifth depth of layer and/or the sixth depth of layer as a percentage of the first thickness 227 can be in a range from 0% to about 5%, from 0% to about 2%, from 0% to about 1%, from about 1% to about 5%, from about 2% to about 5%, or any range or subrange therebetween. Providing a second portion comprising a fifth depth of layer and/or a sixth depth of layer of from 0% to about 5% can enable good impact and/or puncture resistance, as demonstrated by examples discussed below. In aspects, the second portion 239 can comprise the fifth compressive stress region extending from the second outer surface area 33 while the second inner surface area 235 can comprise the fourth unstressed region.

In aspects, the third depth of compression can be substantially equal to the fifth depth of compression. In aspects, the fourth depth of compression can be substantially equal to the sixth depth of compression. In aspects, the third maximum compressive stress can be substantially equal to the fifth maximum compressive stress. In aspects, the fourth maximum compressive stress can be substantially equal to the sixth maximum compressive stress. In aspects, the third depth of layer of one or more alkali metal ions can be substantially equal to the fifth depth of layer of one or more alkali metal ions. In aspects, the fourth depth of layer of one or more alkali metal ions can be substantially equal to the sixth depth of layer of one or more alkali metal ions.

In aspects, the second maximum tensile stress can be substantially equal to the third maximum tensile stress. In aspects, the second maximum tensile stress and the third maximum tensile stress can be less than the first maximum tensile stress. Providing a second maximum tensile stress and a third maximum tensile stress less than a first maximum tensile stress in at least a central portion of the substrate layer can enable low energy fracture while simultaneously enabling lower minimum bend radii. In aspects, an absolute difference between the first maximum tensile stress and the second maximum tensile stress and/or the third maximum tensile stress can be 0 MPa or more, about 1 MPa or more, about 5 MPa or more, about 50 MPa or less, about 20 MPa or less, about 10 MPa or less, or about 8 MPa or less. In aspects, an absolute difference between the first maximum tensile stress and the second maximum tensile stress and/or the third maximum tensile stress can be in a range from 0 MPa to about 50 MPa, from about 1 MPa to about 50 MPa, from about 1 MPa to about 20 MPa, from about 5 MPa to about 20 MPa, from about 5 MPa to about 10 MPa, from about 5 MPa to about 8 MPa, or any range or subrange therebetween.

In aspects, the first depth of compression can be substantially equal to the first central depth of compression. In even further aspects, the third depth of compression can be substantially equal to the first central depth of compression. In aspects, the second depth of compression can be substantially equal to the second central depth of compression. In further aspects, the fourth depth of compression can be substantially equal to the second central depth of compression. As discussed above, the layer thickness can be less than the substrate thickness, which can enable the first maximum tensile stress to be greater than the second maximum tensile stress and the third maximum tensile stress even though the depth of compression(s) for the first portion, the second portion, and the substrate layer may be substantially the same.

Figure 23:
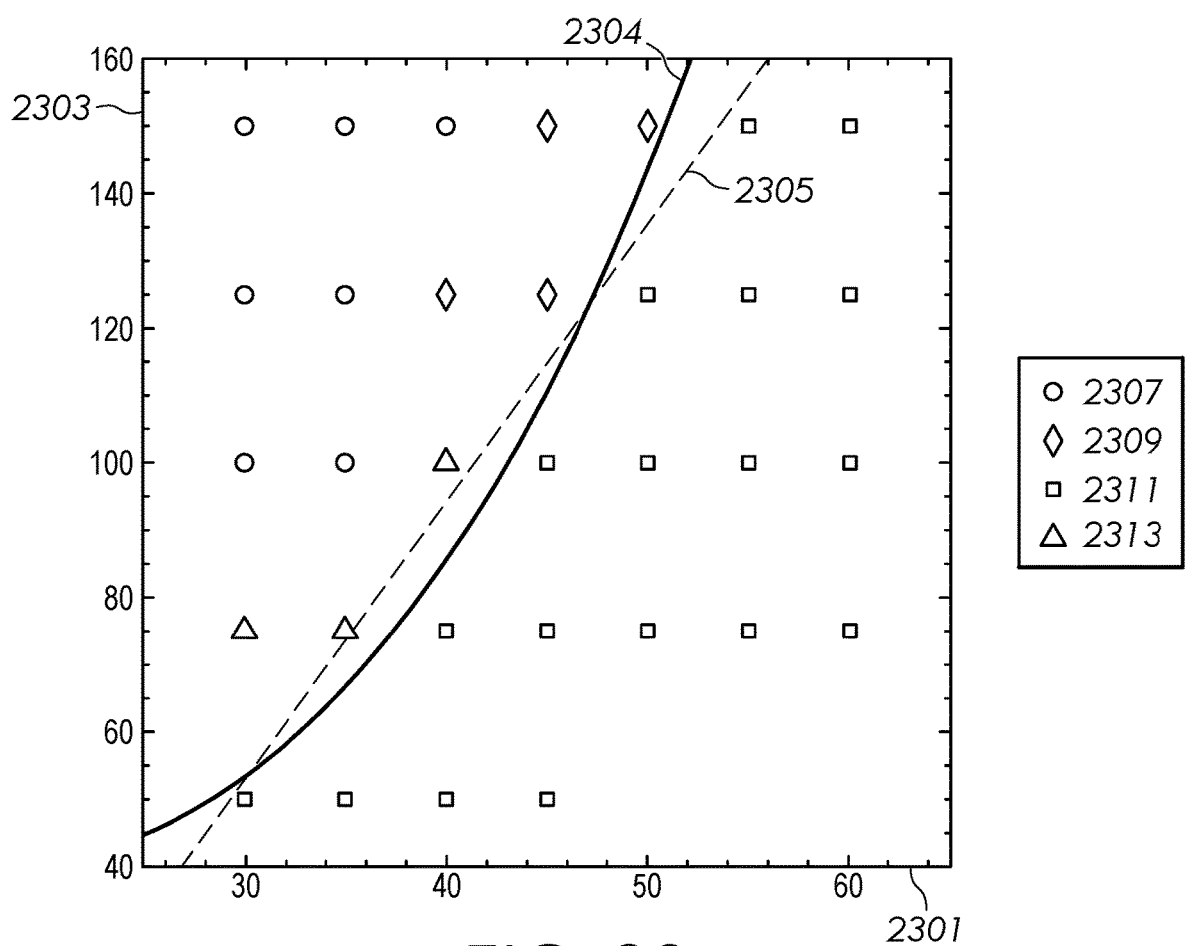
FIG. 23 shows types of mechanical instabilities observed for foldable apparatus as a function of the substrate thickness and the central thickness.

Foldable substrates (e.g., foldable substrate 206) can be subject to a variety of types of mechanical instabilities. Throughout the disclosure, mechanical instabilities include localized mechanical instabilities as well as systemic mechanical instabilities. As used herein, a localized mechanical instability manifests as a deviation (e.g., a plurality of deviations) from a plane of a surface (e.g., first central surface area) without distorting the surface as a whole, for example, buckling and/or wrinkling. As used herein, a systemic mechanical instability manifests as a distortion of an entire surface from a plane, for example, warpage. As shown in FIG. 23, the horizontal axis 2301 (e.g., x-axis) comprises the layer thickness (e.g., layer thickness 207), and the vertical axis 2303 (e.g., y-axis) comprises the substrate thickness 217. The shapes plotted in FIG. 23 correspond to the type (or types) of mechanical instability observed for the combination of central thickness and substrate thickness at that location. Diamonds 2309 correspond to buckling. Circles 2307 correspond to buckling and wrinkling. Triangles 2313 correspond to warpage and wrinkling. Squares 2311 correspond to warpage. Curves 2304 and 2305 separate combinations of layer thickness and substrate thickness where only broad instabilities (e.g., warpage) occur as opposed to combinations where localized instabilities occur. Curve 2305 is a line indicating that localized instabilities may be observed when the substrate thickness is greater than about 4 times the layer thickness minus 71 micrometers. More specifically, curve 2305 indicates that localized instabilities may be observed when the substrate thickness is greater than about 4.1 times the layer thickness minus 71.37 micrometers. Curves 2304 and 2305 indicate that some instabilities (e.g., localized mechanical instabilities) encountered for thinner foldable substrates (e.g., above curve 2304 and/or 2305) can be different than those encountered for thicker foldable substrates (e.g., below curve 2304 and/or 2305).

An onset of mechanical instability (e.g., localized mechanical instability) may occur when a critical strain (e.g., critical buckling strain) of a portion (e.g., central portion) of the foldable substrate is exceeded. For example, a critical buckling strain of the substrate layer in the central region comprising a width of the central region 281 of 20 mm can be approximated by 106 times the layer thickness squared minus 23 times the layer thickness plus 0.0006. For example, without wishing to be bound by theory, a critical buckling strain of a substrate layer in the central region comprising a layer thickness of 30 μm can be approximated by $3 \times 10^{-7}$ divided by a square of the width of the central region.

In aspects, one or more portions (discussed below) may be characterized by a surface roughness of one or more of its corresponding surfaces. As used herein, "surface roughness" means the Ra surface roughness, which is an arithmetical mean of the absolute deviations of a surface profile from an average position in a direction normal to the surface of the test area. As used herein, a "peak-to-valley" refers to the greatest vertical difference between any adjacent pair of a peak and a valley over the test area. Unless otherwise indicated, all Ra surface roughness values and peak-to-valley measurements are the measured average roughness (Ra) for an 80 μm by 80 μm test area using atomic force microscopy (AFM).

In aspects, the first inner surface area 225 of the first portion 229 can comprise a first surface roughness and/or a first peak-to-valley measurement. In aspects, the second inner surface area 235 of the second portion 239 can comprise a second surface roughness and/or a second peak-to-valley measurement. In aspects, a region of the first major surface 203 of the substrate layer 201 contacting the first inner surface area 225 can comprise a third surface roughness and/or a third peak-to-valley measurement. In aspects, a region of the first major surface 203 of the substrate layer 201 contacting the second inner surface area 235 can comprise a fourth surface roughness and/or a first peak-to-valley measurement.

In aspects, the first surface roughness, second surface roughness, third surface roughness and/or fourth surface roughness can correspond to an Ra surface roughness of about 0.01 nanometers (nm) or more, about 0.05 nm or more, about 0.1 nm or more, about 0.2 nm or more, about 2 nm or less, about 1 nm or less, about 0.8 nm or less, about 0.5 nm or less, about 0.3 nm or less. In aspects, the first surface roughness, second surface roughness, third surface roughness and/or fourth surface roughness can correspond to an Ra surface roughness in a range from about 0.01 nm to about 2 nm, from about 0.01 nm to about 1 nm, from about 0.05 nm to about 1 nm, from about 0.05 nm to about 0.8 nm, from about 0.1 nm to about 0.8 nm, from about 0.1 nm to about 0.5 nm, from about 0.2 nm to about 0.5 nm, from about 0.2 nm to about 0.3 nm or any range or subrange therebetween. In aspects, the first surface roughness, second surface roughness, third surface roughness and/or fourth surface roughness can correspond to an Ra surface roughness can be less than about 0.3 nm, for example, in a range from about 0.01 nm to about 0.3 nm, from about 0.01 nm to about 0.2 nm, from about 0.05 nm to about 0.2 nm, from about 0.05 nm to about 0.1 nm, or any range or subrange therebetween. Providing a low first surface roughness (e.g., within one or more of the ranges above in this paragraph) for the surfaces of the first portion, second portion, and/or substrate layer contacting (e.g., bonded to) one another, can facilitate a high bond strength and reduce the incidence of optical distortions.

In aspects, the first peak-to-valley measurement, the second peak-to-valley measurement, the third peak-to-valley measurement, and/or the fourth peak-to-valley measurement can be about 0.1 nm or more, about 0.5 nm or more, about 0.8 nm or more, about 1 nm or more, about 2 nm or more, about 15 nm or less, about 10 nm or less, about 8 nm or less, about 5 nm or less, or about 3 nm or less. In aspects, the second peak-to-valley measurement, the third peak-to-valley measurement, and/or the fourth peak-to-valley measurement can be in a range from about 0.1 nm to about 15 nm, from about 0.1 nm to about 10 nm, from about 0.5 nm to about 10 nm, from about 0.5 nm to about 8 nm, from about 0.8 nm to about 8 nm, from about 0.8 nm to about 5 nm, from about 1 nm to about 5 nm, from about 2 nm to about 5 nm, from about 2 nm to about 3 nm, or any range or subrange therebetween. Providing a low first peak-to-valley measurement (e.g., within one or more of the ranges above in this paragraph) for the surfaces of the first portion, second portion, and/or substrate layer contacting (e.g., bonded to) one another, can facilitate a high bond strength and reduce the incidence of optical distortions.

As used herein, "bond strength" refers to the energy bonded surface area required to separate to materials using a crack propagation method (also known as the "wedge test"). In the wedge test, a razor blade comprising a thickness of 100 μm and an angle of 30° at the edge is inserted at the interface between the two materials by 100 μm. The distance that a crack (e.g., separation of the surfaces) propagates along the interface is used to calculate the bond strength along with the elastic modulus of the materials and the thickness of the materials (e.g., the thickness of the substrate layer and the thickness of the blade). The bond strength B can be calculated as $B = 3/8 * E * t_b^2 * t_s^3 / L^4$, where E is the elastic modulus of the substrate layer, $t_b$ is the thickness of the blade, and $t_s$ is the thickness of the substrate layer, and L is the length of the crack. In aspects, the foldable substrate 206 can comprise a bond strength of about 0.5 Joules per meter squared ($J/m^2$) or more, about 0.8 $J/m^2$ or more, about 1 $J/m^2$ or more, 1.5 $J/m^2$ or more, 2 $J/m^2$ or more, 3 $J/m^2$ or more, 5 $J/m^2$ or more, about 6 $J/m^2$ or more, about 8 $J/m^2$ or more, about 10 $J/m^2$ or more, about 50 $J/m^2$ or less, about 30 $J/m^2$ or less, about 20 $J/m^2$ or less, about 15 $J/m^2$ or less, about 10 $J/m^2$ or less, about 5 $J/m^2$ or less, or about 2 $J/m^2$ or less. In aspects, the foldable substrate 206 can comprise a bond strength in a range from about 4 $J/m^2$ to about 50 $J/m^2$, from about 4 $J/m^2$ to about 30 $J/m^2$, from about 5 $J/m^2$ to about 30 $J/m^2$, from about 6 $J/m^2$ to about 30 $J/m^2$, from about 6 $J/m^2$ to about 20 $J/m^2$, from about 8 $J/m^2$ to about 20 $J/m^2$, from about 8 $J/m^2$ to about 15 $J/m^2$, from about 10 $J/m^2$ to about 15 $J/m^2$, or any range or subrange therebetween. In aspects, the foldable substrate 206 can comprise a bond strength in a range from about 1 $J/m^2$ to about 50 J/m², from about 1 J/m² to about 30 J/m², from about 1 J/m² to about 20 J/m², from about 2 J/m² to about 20 J/m², from about 2 J/m² to about 15 J/m², from about 3 J/m² to about 15 J/m², from about 5 J/m², to about 15 J/m², from about 5 J/m² to about 10 J/m², or any range or subrange therebetween. In aspects, the foldable substrate 206 can comprise a bond strength in a range from about 0.5 J/m² to about 15 J/m², from about 0.5 J/m² to about 10 J/m², from about 0.8 J/m² to about 10 J/m², from about 1 J/m² to about 10 J/m², from about 1 J/m² to about 5 J/m², from about 1.5 J/m² to about 5 J/m², from about 2 J/m² to about 5 J/m², from about 3 J/m² to about 5 J/m², or any range or subrange therebetween. In aspects, the foldable substrate 206 can comprise a bond strength in a range from about 0.5 J/m² to about 5 J/m², from about 0.5 J/m² to about 2 J/m², from about 0.8 J/m² to about 2 J/m², from about 1 J/m² to about 2 J/m², from about 1.5 J/m² to about 2 J/m², or any range or subrange therebetween. In further aspects, the bond strength can be measured between the first portion 229 and the substrate layer 201 (e.g., between the first inner surface area 225 and the first surface area 211 of the first major surface 203 in the first region 221). In further aspects, the bond strength can be measured between the second portion 239 and the substrate layer 201 (e.g., between the second inner surface area 235 and the second surface area 213 of the first major surface 203 in the second region 231).

In aspects, the polymer-based portion 241 can be optically clear. The polymer-based portion 241 can comprise a first index of refraction. The first refractive index may be a function of a wavelength of light passing through the optically clear adhesive. For light of a first wavelength, a refractive index of a material is defined as the ratio between the speed of light in a vacuum and the speed of light in the corresponding material. Without wishing to be bound by theory, a refractive index of the optically clear adhesive can be determined using a ratio of a sine of a first angle to a sine of a second angle, where light of the first wavelength is incident from air on a surface of the optically clear adhesive at the first angle and refracts at the surface of the optically clear adhesive to propagate light within the optically clear adhesive at a second angle. The first angle and the second angle are both measured relative to a direction normal to a surface of the optically clear adhesive. As used herein, the refractive index is measured in accordance with ASTM E1967-19, where the first wavelength comprises 589 nm. In aspects, the first refractive index of the polymer-based portion 241 may be about 1 or more, about 1.3 or more, about 1.4 or more, about 1.45 or more, about 1.49 or more, about 3 or less, about 2 or less, or about 1.7 or less, about 1.6 or less, or about 1.55 or less. In aspects, the first refractive index of the polymer-based portion 241 can be in a range from about 1 to about 3, from about 1 to about 2 from about 1 to about 1.7, from about 1.3 to about 1.7, from about 1.4 to about 1.7, from about 1.4 to about 1.6, from about 1.45 to about 1.55, from about 1.49 to about 1.55, or any range or subrange therebetween.

In aspects, the substrate layer 201 of the foldable substrate 206 can comprise a second index of refraction. In aspects, the second refractive index of the substrate layer 201 may be about 1 or more, about 1.3 or more, about 1.4 or more, about 1.45 or more, about 1.49 or more, about 3 or less, about 2 or less, or about 1.7 or less, about 1.6 or less, or about 1.55 or less. In aspects, the second refractive index of the substrate layer 201 can be in a range from about 1 to about 3, from about 1 to about 2 from about 1 to about 1.7, from about 1.3 to about 1.7, from about 1.4 to about 1.7, from about 1.4 to about 1.6, from about 1.45 to about 1.55, from about 1.49 to about 1.55, or any range or subrange therebetween. In aspects, a differential equal to the absolute value of the difference between the second index of refraction of the substrate layer 201 and the first index of refraction of the polymer-based portion 241 can be about 0.1 or less, about 0.07 or less, about 0.05 or less, about 0.001 or more, about 0.01 or more, or about 0.02 or more. In aspects, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In aspects, the second index of refraction of the substrate layer 201 may be greater than the first index of refraction of the polymer-based portion 241. In aspects, the second index of refraction of the substrate layer 201 may be less than the first index of refraction of the polymer-based portion 241.

In aspects, the adhesive layer 261 can comprise a third index of refraction. In aspects, the third index of refraction of the adhesive layer 261 can be within one or more of the ranges discussed above with regards to the first index of refraction of the polymer-based portion 241. In aspects, a differential equal to the absolute value of the difference between the third index of refraction of the adhesive layer 261 and the first index of refraction of the polymer-based portion 241 can be about 0.1 or less, about 0.07 or less, about 0.05 or less, about 0.001 or more, about 0.01 or more, or about 0.02 or more. In aspects, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In aspects, the third index of refraction of the adhesive layer 261 may be greater than the first index of refraction of the polymer-based portion 241. In aspects, the third index of refraction of the adhesive layer 261 may be less than the first index of refraction of the polymer-based portion 241.

In aspects, a differential equal to the absolute value of the difference between the third index of refraction of the adhesive layer 261 and the second index of refraction of the substrate layer 201 can be about 0.1 or less, about 0.07 or less, about 0.05 or less, about 0.001 or more, about 0.01 or more, or about 0.02 or more. In aspects, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In aspects, the third index of refraction of the adhesive layer 261 may be greater than the second index of refraction of the substrate layer 201. In aspects, the third index of refraction of the adhesive layer 261 may be less than the second index of refraction of the substrate layer 201.

In aspects, the coating 251 can comprise a fourth index of refraction. In aspects, the fourth index of refraction of the coating 251 can be within one or more of the ranges discussed above with regards to the first index of refraction of the polymer-based portion 241. In aspects, a differential equal to the absolute value of the difference between the fourth index of refraction of the coating 251 and the first index of refraction of the polymer-based portion 241 can be about 0.1 or less, about 0.07 or less, about 0.05 or less, about 0.001 or more, about 0.01 or more, or about 0.02 or more.

In aspects, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In aspects, the fourth index of refraction of the coating 251 may be greater than the first index of refraction of the polymer-based portion 241. In aspects, the fourth index of refraction of the coating 251 may be less than the first index of refraction of the polymer-based portion 241.

In aspects, a differential equal to the absolute value of the difference between the fourth index of refraction of the coating 251 and the second index of refraction of the substrate layer 201 can be about 0.1 or less, about 0.07 or less, about 0.05 or less, about 0.001 or more, about 0.01 or more, or about 0.02 or more. In aspects, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In aspects, the fourth index of refraction of the coating 251 may be greater than the second index of refraction of the substrate layer 201. In aspects, the fourth index of refraction of the coating 251 may be less than the second index of refraction of the substrate layer 201.

In aspects, a differential equal to the absolute value of the difference between the fourth index of refraction of the coating 251 and the third index of refraction of the adhesive layer 261 can be about 0.1 or less, about 0.07 or less, about 0.05 or less, about 0.001 or more, about 0.01 or more, or about 0.02 or more. In aspects, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In aspects, the fourth index of refraction of the coating 251 may be greater than the third index of refraction of the adhesive layer 261. In aspects, the fourth index of refraction of the coating 251 may be less than the third index of refraction of the adhesive layer 261.

In aspects, the first portion 229 can comprise a fifth index of refraction, and the second portion 239 can comprise a sixth index of refraction. In further aspects, the fifth index of refraction and/or the sixth index of refraction can be within one or more of the ranges discussed above for the second refractive index of the substrate layer 201. In further aspects, the fifth index of refraction can be substantially equal to the sixth index of refraction. In further aspects, the fifth index of refraction and/or the sixth index of refraction can be substantially equal to the second index of refraction of the substrate layer 201. In further aspects, the fifth index of refraction and/or the sixth index of refraction can be greater than or less than the second index of refraction of the substrate layer 201.

FIG. 7-8 schematically illustrate example aspects of a foldable apparatus 701 and 801 in accordance with aspects of the disclosure in a folded configuration. As shown in FIG. 7, the foldable apparatus 701 is folded such that the first major surface 203 of the substrate layer 201 is on the inside of the folded foldable apparatus 701. In the folded configuration shown in FIG. 8, a user would view the display device 307 in place of a PET sheet 707 (see FIG. 7). As shown in FIG. 8, the folded foldable apparatus 801 is folded such that the second major surface 205 of the substrate layer 201 is on the outside of the folded foldable apparatus 801. In FIG. 8, a user would view the display device 307 through the foldable substrate 206 and, thus, would be positioned on the side of the second major surface 205 of the substrate layer 201. In aspects, as shown in FIGS. 7-8, a foldable apparatus can comprise a coating 251 disposed over the foldable substrate 206. In further aspects, a user would view the display device 307 through the coating 251. In aspects, although not shown, the polymer-based portion 241 and/or the adhesive layer 261 can be disposed over an additional substrate (e.g., glass-based substrate and/or ceramic-based substrate in place of release liner 271 or PET sheet 707), and the additional substrate can be disposed over a display device 307.

As used herein, "foldable" includes complete folding, partial folding, bending, flexing, or multiple capabilities. As used herein, the terms "fail," "failure" and the like refer to breakage, destruction, delamination, or crack propagation. A foldable apparatus achieves an effective bend radius of "X," or has an effective bend radius of "X," or comprises an effective bend radius of "X" if it resists failure when the foldable apparatus is held at "X" radius for 24 hours at about 85° C. and about 85% relative humidity. Likewise, a foldable apparatus achieves a parallel plate distance of "X," or has a parallel plate distance of "X," or comprises a parallel plate distance of "X" if it resists failure when the foldable apparatus is held at a parallel plate distance of "X" for 24 hours at about 85° C. and about 85% relative humidity.

As used herein, the "effective minimum bend radius" and "parallel plate distance" of a foldable apparatus is measured with the following test configuration and process using a parallel plate apparatus 702 (see FIG. 7) that comprises a pair of parallel rigid stainless-steel plates 703, 705 comprising a first rigid stainless-steel plate 703 and a second rigid stainless-steel plate 705. When measuring the "effective minimum bend radius" or the "parallel plate distance", the test adhesive layer 709 comprises a thickness of 50 μm (e.g., instead of adhesive layer 261 in FIGS. 2-4). When measuring the "effective minimum bend radius" or the "parallel plate distance", the test is conducted with a 100 μm thick sheet 707 of polyethylene terephthalate (PET) rather than the release liner 271 of FIGS. 2 and 4 or the display device 307 shown in FIG. 3. Thus, during the test to determine the "effective minimum bend radius" or the "parallel plate distance" of a configuration of a foldable apparatus, the foldable apparatus 701 is produced by using the 100 μm thick sheet 707 of polyethylene terephthalate (PET) rather than the release liner 271 of FIGS. 2 and 4 or the display device 307 shown in FIG. 3. When preparing the foldable apparatus 701, the 100 μm thick sheet 707 of PET is attached to the test adhesive layer 709 in an identical manner that the release liner 271 is attached to the second contact surface 265 of the adhesive layer 261 as shown in FIGS. 2 and 4 or the display device 307 is attached to the second contact surface 265 of the adhesive layer 261 as shown in FIG. 3. To test the foldable apparatus 801 of FIG. 8, the test adhesive layer 709 and the PET sheet 707 can likewise be installed as shown in the configuration of FIG. 7 to conduct the test on the foldable apparatus 701. The foldable apparatus 701 is placed between the pair of parallel rigid stainless-steel plates 703, 705 such that the foldable substrate 206 will be on the inside of the bend, similar to the configuration shown in FIG. 7. For determining a "parallel plate distance", the distance between the parallel plates is reduced at a rate of 50 μm/second until the parallel plate distance 711 is equal to the "parallel plate distance" to be tested. Then, the parallel plates are held at the "parallel plate distance" to be tested for 24 hours at about 85° C. and about 85% relative humidity. As used herein, the "minimum parallel plate distance" is the smallest parallel plate distance that the foldable apparatus can withstand without failure under the conditions and configuration described above. For determining the "effective minimum bend radius", the distance between the parallel plates is reduced at a rate of 50 μm/second until the parallel plate distance 711 is equal to twice the "effective minimum bend radius" to be tested. Then, the parallel plates are held at twice the effective minimum bend radius to be tested for 24 hours at about 85° C. and about 85% relative humidity. As used herein, the "effective minimum bend radius" is the smallest effective bend radius that the foldable apparatus can withstand without failure under the conditions and configuration described above.

In aspects, the foldable apparatus 101, 301, 401, 501, 701, and/or 801 and/or foldable apparatus 701 can achieve a parallel plate distance of 100 mm or less, 50 mm or less, 20 mm or less, 10 mm or less, 5 mm or less, 3 mm or less, or 2 mm or less. In further aspects, the foldable apparatus 101, 301, 401, 501, 701, and/or 801 can achieve a parallel plate distance of 50 millimeters (mm), or 20 mm, or 10 mm, of 5 mm, 3 mm, or 2 mm. In aspects, the foldable apparatus 101, 301, 401, 501, 701, and/or 801 can comprise a minimum parallel plate distance of about 40 mm or less, about 20 mm or less, about 10 mm or less, about 5 mm or less, about 3 mm or less, about 2 mm or less, about 1 mm or more, about 2 mm or more, about 3 mm or more, about 5 mm or more, or about 10 mm or more. In aspects, the foldable apparatus 101, 301, 401, 501, 701, and/or 801 can comprise an effective minimum bend radius in a range from about 1 mm to about 40 mm, from about 1 mm to about 20 mm, from about 1 mm to about 10 mm, from about 1 mm to about 5 mm, from about 1 mm to about 3 mm, from about 2 mm to about 3 mm, from about 2 mm to about 40 mm, from about 3 mm to about 40 mm, from about 3 mm to about 40 mm, from about 3 mm to about 20 mm, from about 3 mm to about 10 mm, from about 3 mm to about 5 mm, from about 5 mm to about 10 mm, or any range or subrange therebetween.

Throughout the disclosure, a Static Bend test is conducted using the parallel plate apparatus 702 of FIG. 7 with the foldable apparatus 701, as described above, but the foldable apparatus is held at the effective bend radius to be tested for 10 days at 60° C. and 90% relative humidity. Throughout the disclosure, a Cyclic Bend Test is conducted using the foldable apparatus 701 of FIG. 7 with the parallel plate apparatus 702, as described above, but the parallel plate apparatus with the foldable apparatus positioned therein is cycled from a parallel plate distance of 30 mm and 3 mm 20,000 times with the parallel plates moving at 50 μm/second. In aspects, the foldable apparatus 101, 301, 401, 501, 701, and/or 801 can withstand the Static Bend test for an effective bend radius of 30 mm, 20 mm, 10 mm, 8 mm, 5 mm, 3 mm, 2 mm, 1.5 mm, or 1 mm. In aspects, the foldable apparatus 101, 301, 401, 501, 701, and/or 801 can withstand the Cyclic Bend Test.

In aspects, a width of the recess 234 and/or a width of the central region 281 of the foldable substrate 206 is defined as the minimum distance 210 between the inner edge of the first portion 229 and the inner edge of the second portion 239 in the direction 106 of the length 105. In aspects, the width of the recess 234 and/or the central region 281 of the foldable substrate 206 can be about 2.8 times or more, about 3 times or more, about 4 times or more, about 6 times or less, about 5 times or less, or about 4 times or less than the effective minimum bend radius. In aspects, the width of the recess 234 and/or the central region 281 of the foldable substrate 206 as a multiple of the effective minimum bend radius can be in a range from about 2.8 times to about 6 times, from about 2.8 times to about 5 times, from about 2.8 times to about 4 times, from about 3 times to about 6 times, from about 3 times to about 5 times, from about 3 times to about 4 times, from about 4 times to about 6 times, from about 4 times to about 5 times, or any range or subrange therebetween. Without wishing to be bound by theory, the length of a bent portion in a circular configuration between parallel plates can be about 1.6 times the parallel plate distance 711 (e.g., about 3 times the effective minimum bend radius, about 3.2 times the effective minimum bend radius). In aspects, the width of the recess 234 and/or the central region 281 of the foldable substrate 206 can be about 2.8 mm or more, about 6 mm or more, about 9 mm or more, about 60 mm or less, about 40 mm, or less, or about 24 mm or less. In aspects, the width of the recess 234 and/or the central region 281 of the foldable substrate 206 can be in a range from about 2.8 mm to about 60 mm, from about 2.8 mm to about 40 mm, from about 2.8 mm to about 24 mm, from about 6 mm to about 60 mm, from about 6 mm to about 40 mm, from about 6 mm to about 24 mm, from about 9 mm to about 60 mm, from about 9 mm to about 40 mm, from about 9 mm to about 24 mm, or any range of subrange therebetween. By providing a width within the above-noted ranges for the central portion (e.g., between the first portion and the second portion), folding of the foldable apparatus without failure can be facilitated.

The foldable apparatus 101, 301, 401, 501, 701, and 801 may have an impact resistance defined by the capability of the first region 221 of the foldable apparatus (e.g., a region comprising the first portion 229, the second region 231 comprising the second portion 239, and/or a central region 281 to avoid failure at a pen drop height (e.g., 5 centimeters (cm) or more, 10 centimeters or more, 20 cm or more, 50 cm or more), when measured according to the "Pen Drop Test." As used herein, the "Pen Drop Test" is conducted such that samples of foldable apparatus are tested with the load (i.e., from a pen dropped from a certain height) imparted to an outer surface (e.g., first outer surface area 223, second outer surface area 233, first central surface area 209, second major surface 205 third major surface 253) of the foldable substrate 206 and/or foldable apparatus configured as in the parallel plate test with 100 μm thick sheet 707 of PET attached to the test adhesive layer 709 having a thickness of 50 μm instead of the display device 307 shown in FIG. 3 or the release liner 271 shown in FIGS. 2 and 4. As such, the PET layer in the Pen Drop Test is meant to simulate a foldable electronic display device (e.g., an OLED device). During testing, the foldable apparatus bonded to the PET layer is placed on an aluminum plate (6063 aluminum alloy, as polished to a surface roughness with 400 grit paper) with the PET layer in contact with the aluminum plate. No tape is used on the side of the sample resting on the aluminum plate.

A tube is used for the Pen Drop Test to guide a pen to an outer surface of the foldable apparatus. For the foldable apparatus 101, 301, 401, 501, and 801 in FIGS. 2-5 and 7-8, the pen is guided to the outer surface in the region to be tested (e.g., first outer surface area 223, second outer surface area 233, first central surface area 209, second major surface 205 third major surface 253), and the tube is placed in contact with the outer surface so that the longitudinal axis of the tube is substantially perpendicular to the outer surface with the longitudinal axis of the tube extending in the direction of gravity. The tube has an outside diameter of 1 inch (2.54 cm), an inside diameter of nine-sixteenths of an inch (1.4 cm), and a length of 90 cm. An acrylonitrile butadiene (ABS) shim is employed to hold the pen at a predetermined height for each test. After each drop, the tube is relocated relative to the sample to guide the pen to a different impact location on the sample. The pen employed in Pen Drop Test is a BIC Easy Glide Pen, Fine, having a tungsten carbide ballpoint tip of 0.7 mm (0.68 mm) diameter, and a weight of 5.73 grams (g) including the cap (4.68 g without the cap).

For the Pen Drop Test, the pen is dropped with the cap attached to the top end (i.e., the end opposite the tip) so that the ballpoint can interact with the test sample. In a drop sequence according to the Pen Drop Test, one pen drop is conducted at an initial height of 1 cm, followed by successive drops in 0.5 cm increments up to 20 cm, and then after 20 cm, 2 cm increments until failure of the test sample. After each drop is conducted, the presence of any observable fracture, failure, or other evidence of damage to the sample is recorded along with the particular pen drop height. Using the Pen Drop Test, multiple samples can be tested according to the same drop sequence to generate a population with improved statistical accuracy. For the Pen Drop Test, the pen is to be changed to a new pen after every 5 drops, and for each new sample tested. In addition, all pen drops are conducted at random locations on the sample at or near the center of the sample, with no pen drops near or on the edge of the samples.

For purposes of the Pen Drop Test, "failure" means the formation of a visible mechanical defect in a laminate. The mechanical defect may be a crack or plastic deformation (e.g., surface indentation). The crack may be a surface crack or a through crack. The crack may be formed on an interior or exterior surface of a laminate. The crack may extend through all or a portion of the foldable substrate 206 and/or coating. A visible mechanical defect has a minimum dimension of 0.2 mm or more.

Figure 22:
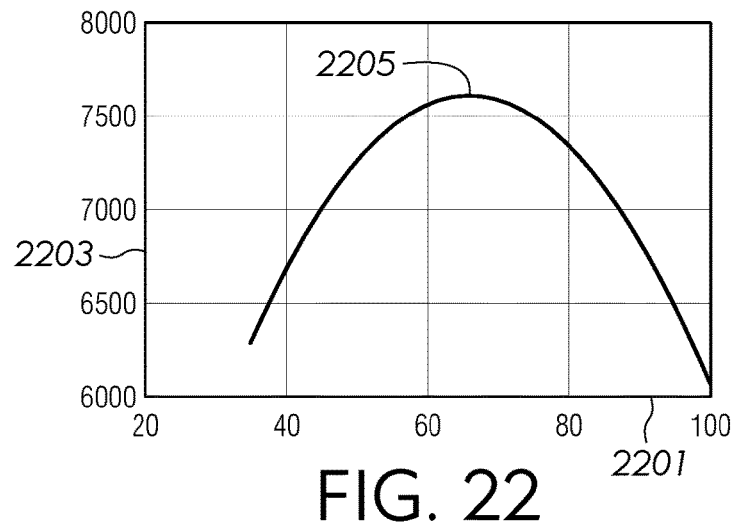
FIG. 22 shows experimental results of the Pen Drop Test of glass-based substrates that shows the maximum principal stress on a major surface of the glass-based substrate as a function of a thickness of a glass-based substrate.

FIG. 22 shows a curve 2205 of the maximum principal stress 2203 in MegaPascals (MPa) on the first major surface of a glass-based substrate as a function of a thickness 2201 in micrometers of the glass-based substrate based on a pen drop height of 2 cm onto the second major surface of a glass-based substrate. As shown in FIG. 22, the maximum principal stress on the first major surface of the glass-based sheet is greatest around 65 μm. This suggests that pen drop performance can be improved by avoiding thicknesses around 65 μm, for example, less than about 50 μm or greater than about 80 μm.

In aspects, the foldable apparatus can resist failure for a pen drop in the first region 221 comprising the first portion 229 or the second region 231 comprising the second portion 239 at a pen drop height of 10 centimeters (cm), 12 cm, 14 cm, 16 cm, 20 cm, 40 cm, or 50 cm. In aspects, a maximum pen drop height that the foldable apparatus can withstand without failure over the first region 221 comprising the first portion 229 or the second region 231 comprising the second portion 239 may be about 10 cm or more, about 12 cm or more, about 14 cm or more, about 16 cm or more, about 80 cm or less, about 60 cm or less, about 50 cm or less, about 40 cm or less, or about 30 cm or less, about 20 cm or less, about 18 cm or less. In aspects, a maximum pen drop height that the foldable apparatus can withstand without failure over the first region comprising the first portion 229 or the second region 231 comprising the second portion 239 can be in a range from about 10 cm to about 80 cm, from about 10 cm to about 60 cm, from about 12 cm to about 60 cm, from about 14 cm to about 60 cm, from about 14 cm to about 50 cm, from about 16 cm to about 50 cm, from about 16 cm to about 40 cm, from about 16 cm to about 30 cm, from about 16 cm to about 20 cm, or any range or subrange therebetween.

In aspects, the foldable apparatus can resist failure for a pen drop in the central region 281 between the first region 221 (e.g., first portion 229) and the second region 231 (e.g., second portion 239) at a pen drop height of 1 cm, 2 cm, 3 cm, 4 cm, 5 cm, 8 cm, or more. In aspects, a maximum pen drop height that the foldable apparatus can withstand without failure over the central region 281 between the first region 221 (e.g., first portion 229) and the second region 231 (e.g., second portion 239) may be about 1 cm or more, about 2 cm or more, about 3 cm or more, about 4 cm or more, about 20 cm or less, about 10 cm or less, about 8 cm or less, or about 6 cm or less. In aspects, a maximum pen drop height that the foldable apparatus can withstand without failure over the central region 281 between the first region 221 (e.g., first portion 229) and the second region 231 (e.g., second portion 239) can be in a range from about 1 cm to about 20 cm, from about 2 cm to about 20 cm, from about 2 cm to about 10 cm, from about 3 cm to about 10 cm, from about 3 cm to about 8 cm, from about 4 cm to about 8 cm, from about 4 cm to about 6 cm, or any range or subrange therebetween. In aspects, a maximum pen drop height that the foldable apparatus can withstand without failure of the central region 281 between the first region 221 (e.g., first portion 229) and the second region 231 (e.g., second portion 239) can be in a range from about 1 cm to about 10 cm, from about 1 cm to about 8 cm, from about 1 cm to about 5 cm, from about 2 cm to about 5 cm, from about 3 cm to about 5 cm, from about 4 cm to about 5 cm, or any range or subrange therebetween.

A minimum force may be used to achieve a predetermined parallel plate distance with the foldable apparatus. The parallel plate apparatus 702 of FIG. 7, described above, is used to measure the "closing force" of a foldable apparatus of aspects of the disclosure. The force to go from a flat configuration (e.g., see FIG. 1) to a bent (e.g., folded) configuration (e.g., see FIGS. 6-8) comprising the predetermined parallel plate distance is measured. In aspects, the force to bend the foldable apparatus from a flat configuration to a parallel plate distance of 10 mm can be about 20 Newtons (N) or less, 15 N or less, about 12 N or less, about 10 N or less, about 0.1 N or more, about 0.5 N or more, about 1 N or more, about 2 N or more, about 5 N or more. In aspects, the force to bend the foldable apparatus from a flat configuration to a parallel plate distance of 10 mm can be in a range from about 0.1 N to about 20 N, from about 0.5 N to about 20 N, from about 0.5 N to about 15 N, from about 1 N to about 15 N, from about 1 N to about 12 N, from about 2 N to about 12 N, from about 2 N to about 10 N, from about 5 N to about 10 N, or any range or subrange therebetween. In aspects, the force to bend the foldable apparatus from a flat configuration to a parallel plate distance of 3 mm can be about 10 N or less, about 8 N or less, about 6 N or less, about 4 N or less, about 3 N or less, about 0.05 N or more about 0.1 N or more, about 0.5 N or more, about 1 N or more, about 2 N or more, about 3 N or more. In aspects, the force to bend the foldable apparatus from a flat configuration to a parallel plate distance of 3 mm can be in a range from about 0.05 N to about 10 N, from about 0.1 N to about 10 N, from about 0.1 N to about 8 N, from about 0.5 N to about 8 N, from about 0.5 N to about 6 N, from about 1 N to about 6 N, from about 1 N to about 4 N, from about 2 N to about 4 N, from about 2 N to about 3 N, or any range or subrange therebetween.

In aspects, the force per width 103 of the foldable apparatus to bend the foldable apparatus from a flat configuration to a parallel plate distance of 10 mm can be about 20 Newtons per millimeter (N/mm) or less, 0.15 N/mm or less, about 0.12 N/mm or less, about 0.10 N/mm or less, about 0.001 N/mm or more, about 0.005 N/mm or more, about 0.01 N/mm or more, about 0.02 N/mm or more, about 0.05 N/mm or more. In aspects, the force per width 103 of the foldable apparatus to bend the foldable apparatus from a flat configuration to a parallel plate distance of 0.10/mm can be in a range from about 0.001 N/mm to about 0.20 N/mm, from about 0.005 N/mm to about 0.20 N/mm, from about 0.005 N/mm to about 0.15 N/mm, from about 0.01 N/mm to about 0.15 N/mm, from about 0.01 N/mm to about 0.12 N/mm, from about 0.02 N/mm to about 0.12 N/mm, from about 0.02 N/mm to about 0.10 N/mm, from about 0.05 N/mm to about 0.10 N/mm, or any range or subrange therebetween. In aspects, the force per width 103 of the foldable apparatus to bend the foldable apparatus from a flat configuration to a parallel plate distance of 3 mm can be about 0.10 N/mm or less, about 0.08 N/mm or less, about 0.06 N/mm or less, about 0.04 N/mm or less, about 0.03 N/mm or less, about 0.0005 N/mm or more about 0.001 N/mm or more, about 0.005 N/mm or more, about 0.01 N/mm or more, about 0.02 N/mm or more, about 0.03 N/mm or more. In aspects, the force per width 103 of the foldable apparatus to bend the foldable apparatus from a flat configuration to a parallel plate distance of 3 mm can be in a range from about 0.0005 N/mm to about 0.10 N/mm, from about 0.001 N/mm to about 0.10 N/mm, from about 0.001 N/mm to about 0.08 N/mm, from about 0.005 N/mm to about 0.08 N/mm, from about 0.005 N/mm to about 0.06 N/mm, from about 0.01 N/mm to about 0.06 N/mm, from about 0.01 N/mm to about 0.04 N/mm, from about 0.02 N/mm to about 0.04 N/mm, from about 0.02 N/mm to about 0.03 N/mm, or any range or subrange therebetween.

Providing a coating can enable low forces to achieve small parallel plate distances. Without wishing to be bound by theory, a coating comprising a modulus less than a modulus of a foldable substrate can result in a neutral axis of the foldable substrate that is shifted away from the coating (e.g., surface facing the user) than if a glass-based substrate and/or a ceramic-based substrate was used. Without wishing to be bound by theory, providing a coating with a thickness of about 200 μm or less can result in a neutral axis of the foldable substrate that is shifted away from the coating (e.g., surface facing the user) than if a thicker substrate was used. Without wishing to be bound by theory, a neutral axis of the foldable substrate portion shifted away from the coating (e.g., surface facing the user) can enable low forces to achieve small parallel plate distances because it reduces the concentration of tensile stress and resulting deformation of a portion of the foldable substrate since the tensile stress is spread over a larger portion of the foldable substrate.

Aspects of methods of making the foldable apparatus and/or foldable substrate in accordance with aspects of the disclosure will be discussed with reference to the flow chart in FIG. 11 and example method steps illustrated in FIGS. 12-21. Example aspects of making the foldable apparatus 101, 301, 401, 501, 701, and/or 801 and/or foldable substrate 206 illustrated in FIGS. 2-5 and 7-8 will now be discussed with reference to FIGS. 12-21 and the flow chart in FIG. 11. In a first step 1101 of methods of the disclosure, methods can start with providing a substrate layer 201. In aspects, the substrate layer 201 may be provided by purchase or otherwise obtaining a substrate or by forming the foldable substrate. As discussed above, the substrate layer 201 can comprise a glass-based substrate and/or a ceramic-based substrate. In further aspects, glass-based substrates and/or ceramic-based substrates can be provided by forming them with a variety of ribbon forming processes, for example, slot draw, down-draw, fusion down-draw, up-draw, press roll, redraw, or float. In further aspects, ceramic-based substrates can be provided by heating a glass-based substrate to crystallize one or more ceramic crystals. The substrate layer 201 may comprise a second major surface 205 (see FIG. 12) that can extend along a plane. The second major surface 205 can be opposite a first major surface 203. In aspects, step 1101 can further comprise providing a first portion 229 and/or a second portion 239, which can comprise glass-based substrates and/or ceramic-based substrates.

Figure 12:
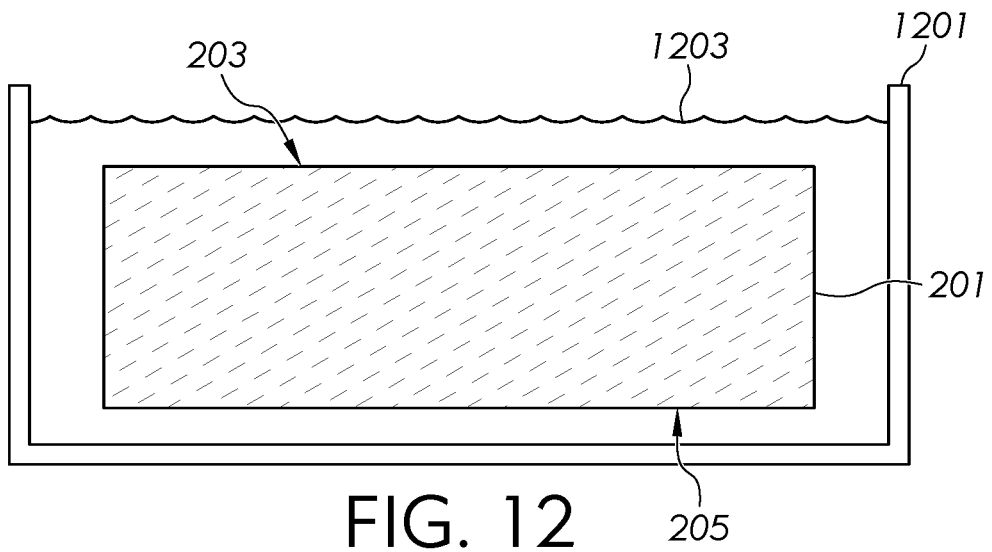

After step 1101, as shown in FIG. 12, methods can proceed to step 1103 comprising chemically strengthening the substrate layer 201. Chemically strengthening a substrate layer 201 (e.g., glass-based substrate, ceramic-based substrate) by ion exchange can occur when a first cation within a depth of a surface of a substrate layer 201 is exchanged with a second cation within a molten salt or salt solution 1203 that has a larger radius than the first cation. For example, a lithium cation within the depth of the surface of the substrate layer 201 can be exchanged with a sodium cation or potassium cation within a salt solution 1203. Consequently, the surface of the substrate layer 201 is placed in compression and thereby chemically strengthened by the ion exchange process since the lithium cation has a smaller radius than the radius of the exchanged sodium cation or potassium cation within the salt solution 1203. Chemically strengthening the substrate layer 201 can comprise contacting at least a portion of the substrate layer 201 comprising lithium cations and/or sodium cations with a salt bath 1201 comprising salt solution 1203 comprising potassium nitrate, potassium phosphate, potassium chloride, potassium sulfate, sodium chloride, sodium sulfate, sodium nitrate, and/or sodium phosphate, whereby lithium cations and/or sodium cations diffuse from the substrate layer 201 to the salt solution 1203 contained in the salt bath 1201. In aspects, the temperature of the salt solution 1203 can be about 300° C. or more, about 360° C. or more, about 400° C. or more, about 500° C. or less, about 460° C. or less, or about 400° C. or less. In aspects, the temperature of the salt solution 1203 can be in a range from about 300° C. to about 500° C., from about 360° C. to about 500° C., from about 400° C. to about 500° C., from about 300° C. to about 460° C., from about 360° C. to about 460° C., from about 400° C. to about 460° C., from about 300° C. to about 400° C., from about 360° C. to about 400° C., or any range or subrange therebetween. In aspects, the substrate layer 201 can be in contact with the salt solution 1203 for about 15 minutes or more, about 1 hour or more, about 3 hours or more, about 48 hours or less, about 24 hours or less, or about 8 hours or less. In aspects, the substrate layer 201 can be in contact with the salt solution 1203 for a time in a range from about 15 minutes to about 48 hours, from about 1 hour to about 48 hours, from about 3 hours to about 48 hours, from about 15 minutes to about 24 hours, from about 1 hour to about 24 hours, from about 3 hours to about 48 hours, from about 3 hours to about 24 hours, from about 3 hours to about 8 hours, or any range or subrange therebetween. Chemically strengthening the substrate layer 201 can comprise chemically strengthening the first major surface 203 (e.g., first central surface area 209, first surface area 211, second surface area 213) and the second major surface 205 of the substrate layer 201. In aspects, chemically strengthening can comprise chemically strengthening the first major surface 203 to a first depth of compression from the first major surface 203 and/or chemically strengthening the second major surface 205 to a second depth of compression from the second major surface 205.

In aspects, the first portion 229 and/or the second portion 239 can be chemically strengthening, for example, at the end of step 1101 or in step 1103 similar to chemically strengthening the substrate layer 201 described above. In further aspects, chemically strengthening the first portion 229 can create a third compressive stress region extending to a third depth of compression from the first outer surface area 223 and/or an associated third depth of layer. In further aspects, chemically strengthening the first portion 229 can create a fourth compressive stress region extending to a fourth depth of compression from the first inner surface area 225 and/or an associated fourth depth of layer. In further aspects, chemically strengthening the second portion 239 can create a fifth compressive stress region extending to a fifth depth of compression from the second outer surface area 233 and/or an associated fifth depth of layer. In further aspects, chemically strengthening the second portion 239 can create a sixth compressive stress region extending to a sixth depth of compression from the second inner surface area 235 and/or an associated sixth depth of layer. In aspects, the compressive stress region(s), depth(s) of compression, and/or depth(s) of layer created in the first portion 229 and/or the second portion 239 can be within one or more of the corresponding ranges discussed above. In aspects, one or more of the first outer surface area 223, the second outer surface area 233, the first inner surface area 225, and/or the second inner surface area 235 can be unstrengthened (e.g., not contacted by the molten salt solution described above). In further aspects, the first portion 229 can be unstrengthened. In further aspects, the second portion 239 can be unstrengthened. In even further aspects, both the first portion 229 and the second portion 239 can be unstrengthened.

Figure 13:
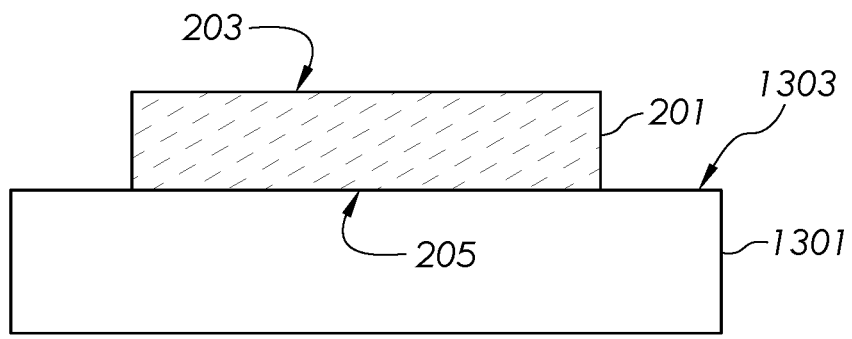

After step 1101 or 1103, as shown in FIG. 13, methods can proceed to step 1115 comprising attaching the substrate layer 201 to a carrier substrate 1301. In aspects, as shown in FIG. 13, the second major surface 205 of the substrate layer 201 can be attached to a carrier major surface 1303 of the carrier substrate 1301. In further aspects, as shown, the second major surface 205 of the substrate layer 201 can directly contact the carrier major surface 1303 of the carrier substrate, for example, relying on electrostatic forces and/or van der Waals forces to attach the substrate layer 201 to the carrier substrate 1301. In further aspects, although not shown, the second major surface 205 of the substrate layer 201 can be attached to the carrier major surface 1303 of the carrier substrate 1301 with an adhesive layer. In aspects, the carrier substrate 1301 can comprise a silicon wafer, a glass-based material, and/or a ceramic-based material. In aspects, as shown in FIG. 13, a thickness of the carrier substrate 1301 can be greater than a layer thickness (e.g., layer thickness 207) of the substrate layer 201. In aspects, as shown in FIG. 13, a width and/or a length of the carrier substrate 1301 can be greater than the corresponding dimension of the substrate layer 201. Providing a carrier substrate attached to the second major surface of the substrate layer can facilitate transportation and handling of the substrate layer during methods according to aspects of the disclosure with reduced contamination of the substrate layer and/or reduced damage to the foldable substrate.

Figure 14:
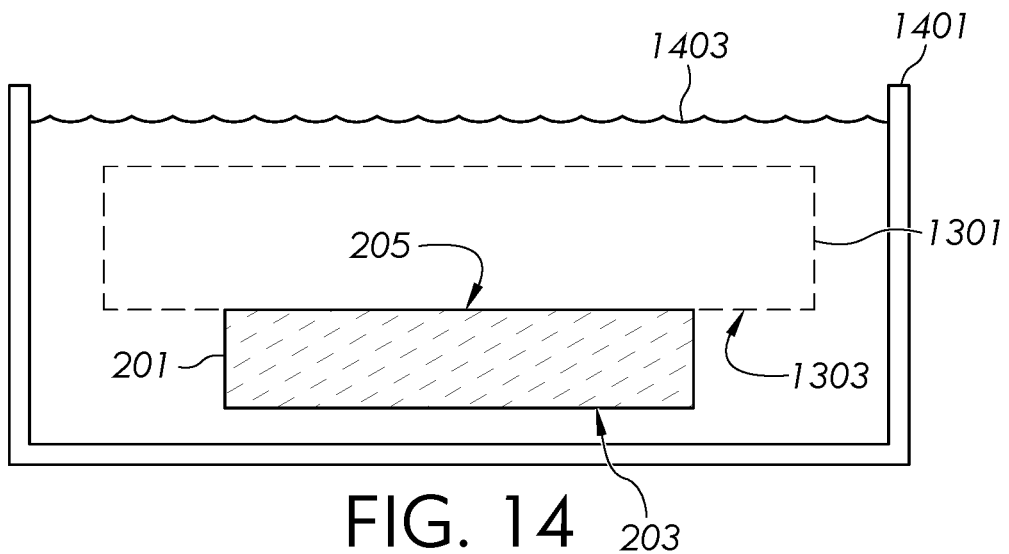

After step 1101, 1103, or 1115, as shown in FIG. 14, methods can proceed to step 1105 comprising contacting at least the first major surface 203 of the substrate layer 201 with a hydroxide-containing solution 1403. In aspects, the hydroxide-containing solution can be a basic solution and/or comprise a base. As used herein, a basic solution refers to solutions having a pH of 9 or more while a base refers to a compound comprising a pKa of 9 or more. Throughout the disclosure, pH is measured in accordance with ASTM E70-19 using a glass electrode. In aspects, the hydroxide-containing solution 1403 can comprise a pH of about 9 or more, about 10 or more, about 10.5 or more, about 15 or less, about 13 or less, about 12 or less, or about 11 or less. In aspects, the hydroxide-containing solution 1403 can comprise a pH in a range from about 9 to about 15, from about 9 to about 13, from about 10 to about 13, from about 10 to about 12, from about 10.5 to about 12, from about 10.5 to about 11, or any range or subrange therebetween. For example, RCA SC-1 solution comprising 30 wt % ammonium hydroxide ($NH_4OH$) can comprise a pH of about 10.6. In aspects, the hydroxide-containing solution can comprise a hydroxide-containing base. Exemplary aspects of a hydroxide-containing base include one or more of sodium hydroxide, potassium hydroxide, tetramethylammonium hydroxide, and/or ammonium hydroxide. In even further aspects, the alkaline solution can be substantially fluoride-free. In further aspects, a concentration of the hydroxide-containing base of about 10 weight % (wt %) or more, about 15 wt % or more, about 20 wt % or more, about 25 wt % or more, about 60 wt % or less, about 50 wt % or less, about 40 wt % or less, or about 30 wt % or less. In even further aspects, the alkaline solution can comprise a concentration of the hydroxide-containing base in a range from about 10 wt % to about 60 wt %, from about 15 wt % to about 60 wt %, from about 15 wt % to about 50 wt %, from about 20 wt % to about 50 wt %, from about 20 wt % to about 40 wt %, from about 25 wt % to about 40 wt %, from about 25 wt % to about 30 wt %, or any range or subrange therebetween. Without wishing to be bound by theory, contacting the first major surface of the substrate layer with the hydroxide-containing solution can facilitate removal of particles deposited (e.g., attached) the first major surface of the substrate layer, for example, by changing a surface chemistry and/or a surface charge of the first major surface. Without wishing to be bound by theory, contacting the first major surface of the substrate layer with the hydroxide-containing solution can facilitate removal of organic materials (e.g., oils) and/or other contaminants on the first major surface of the substrate layer. Without wishing to be bound by theory, contacting the first major surface of the substrate layer with the hydroxide-containing solution can reduce a surface roughness (e.g., Ra surface roughness) and/or a peak-to-valley measurement of the first major surface of the substrate layer. Without wishing to be bound by theory, contacting the first major surface of the substrate layer with the hydroxide-containing solution can increase a density of hydroxyl groups at the first major surface, which can facilitate bonding of other surfaces to the first major surface. In aspects, at the end of step 1105, the first major surface 203 of the substrate layer 201 can comprise a surface roughness and/or a peak-to-valley measurement without one or more of the corresponding ranges discussed above for the surface roughness and/or the peak-to-valley measurement.

In aspects, contacting at least the first major surface 203 of the substrate layer 201 with a hydroxide-containing solution 1403 can comprise a hydroxide-containing solution 1403 comprising a temperature that contacts at least the first major surface 203 for a period of time. In further aspects, the temperature of the hydroxide-containing solution 1403 can be about 25° C. or more, about 40° C. or more, about 50° C. or more, about 55° C. or more, about 80° C. or less, about 70° C. or less, about 65° C. or less, or about 60° C. or less.

In further aspects, the temperature of the hydroxide-containing solution 1403 can be in a range from about 25° C. to about 80° C., from about 40° C. to about 80° C., from about 40° C. to about 70° C., from about 50° C. to about 70° C., from about 50° C. to about 65° C., from about 55° C. to about 65° C., from about 55° C. to about 60° C., for any range or subrange therebetween. In further aspects, the period of time that the hydroxide-containing solution 1403 contacts at least the first major surface 203 can be about 1 minute or more, about 2 minutes or more, about 5 minutes or more, about 8 minutes or more, about 30 minutes or less, about 20 minutes or less, about 15 minutes or less, about 12 minutes or less, or about 10 minutes or less. In further aspects, the period of time that the hydroxide-containing solution 1403 contacts at least the first major surface 203 can be in a range from about 1 minute to about 30 minutes, from about 2 minutes to about 30 minutes, from about 2 minutes to about 20 minutes, from about 5 minutes to about 20 minutes, from about 5 minutes to about 15 minutes, from about 8 minutes to about 15 minutes, from about 8 minutes to about 12 minutes, from about 8 minutes to about 10 minutes, or any range or subrange therebetween. In aspects, step 1105 can comprise agitating the hydroxide-containing solution 1403, for example, using ultrasonication or megasonication during part or all of the period of time.

In aspects, as shown in FIG. 14, the hydroxide-containing solution 1403 can be contained in a bath 1401. In further aspects, as shown, at least the first major surface 203 of the substrate layer 201 can be immersed in the hydroxide-containing solution 1403 in the bath 1401. In even further aspects, as shown with the dashed lines for the carrier substrate 1301, the substrate layer 201 can be attached to the carrier substrate 1301 (e.g., carrier major surface 1303) that can both be immersed in the hydroxide-containing solution 1403, which can prevent the hydroxide-containing solution 1403 from contacting the second major surface 205 of the substrate layer 201 while allowing the hydroxide-containing solution 1403 to contact the first major surface 203 of the substrate layer 201. In even further aspects, as shown, the substrate layer 201 may not be attached to the carrier substrate 1301. In still further aspects, the hydroxide-containing solution 1403 can contact the first major surface 203 of the substrate layer 201 and the second major surface 205 of the substrate layer 201. In even further aspects, although not shown, the second major surface 205 of the substrate layer 201 can be above a liquid level of the hydroxide-containing solution 1403 in the bath 1401 while the first major surface 203 of the substrate layer 201 can be below a liquid level of the hydroxide-containing solution 1403 in the bath 1401. In further aspects, although not shown, the hydroxide-containing solution 1403 can be dispensed on the first major surface 203 of the substrate layer 201 to contact the first major surface of the hydroxide-containing solution 1403.

In aspects, step 1105 can further comprise rinsing at least the first major surface 203 of the substrate layer 201 with deionized water. Rinsing with deionized water can remove residual hydroxide-containing solution and/or particles from at least the first major surface 203 of the substrate layer 201. In aspects, step 1105 can further comprise drying at least the first major surface 203 of the substrate layer 201. In further aspects, rinsing with deionized water can continue for about 10 seconds or more, about 30 seconds or more, about 1 minute or more, about 2 minutes or more, about 4 minutes or more, about 15 minutes or less, about 12 minutes or less, about 10 minutes or less, or about 8 minutes or less. In further aspects, rinsing with deionized water can continue for a period of time that can be in a range from about 10 seconds to about 15 minutes, from about 30 seconds to about 15 minutes, from about 30 seconds to about 12 minutes, from about 1 minute to about 12 minutes, from about 1 minute to about 10 minutes, from about 2 minutes to about 10 minutes, from about 2 minutes to about 8 minutes, from about 4 minutes to about 8 minutes, for any range or subrange therebetween. In aspects, the deionized water can comprise a temperature in a range from about 20° C. to about 35° C., from about 20° C. to about 30° C., from about 25° C. to about 30° C., or any range or subrange therebetween.

In further aspects, the first major surface 203 of the substrate layer 201 can be contacted with an alcohol (e.g., isopropyl alcohol) that can evaporate at ambient temperatures to produce a dry surface. In further aspects, the first major surface 203 of the substrate layer 201 can be dried by passing nitrogen (e.g., dry nitrogen gas) over the first major surface 203 of the substrate layer 201. An exemplary aspect of drying includes the Marangoni dry method. In aspects, drying can comprise waiting a period of time during which passing nitrogen and/or evaporation of an alcohol can occur can be in a range from about 1 minute to about 60 minutes, from about 5 minutes to about 60 minutes, from about 5 minutes to about 45 minutes, from about 10 minutes to about 45 minutes, from about 10 minutes to about 30 minutes, from about 12 minutes to about 30 minutes, from about 12 minutes to about 20 minutes, from about 12 minutes to about 15 minutes, or any range or subrange therebetween.

In aspects, step 1105 can further comprise contacting at least the first inner surface area 225 of the first portion 229 with the hydroxide-containing solution 1403. In aspects, step 1105 can further comprise contacting at least the second inner surface area 235 of the second portion 239 with the hydroxide-containing solution 1403. In aspects, the first inner surface area 225 of the first portion 229 and/or the second inner surface area 235 of the second portion 239 can be contacted for a period of time within one or more of the ranges discussed above for the period of time for contacting the first major surface 203 with the hydroxide-containing solution 1403. In aspects, the first inner surface area 225 of the first portion 229 and/or the second inner surface area 235 of the second portion 239 can comprise a surface roughness and/or a peak-to-valley measurement within one or more of the corresponding ranges discussed above, for example, as a result of the contacting the corresponding surface with the hydroxide-containing solution 1403.

After step 1105, methods can proceed to step 1119 comprising maintaining at least the substrate layer 201 in an environment comprising a predetermined relative humidity at a predetermined temperature for a predetermined period of time. As used herein, maintaining a material "at a first temperature" means that the material is placed in an environment maintained at the first temperature. In aspects, step 1119 can comprise maintaining, the substrate layer 201, the first portion 229, and the second portion 239 in an environment comprising a predetermined relative humidity at a predetermined temperature for a predetermined period of time. In aspects, the predetermined relative humidity can be about 60% or more, about 70% or more, about 75% or more, about 90% or less, about 80% or less, or about 75% or less. In aspects, the predetermined relative humidity can be in a range from about 60% to about 90%, from about 60% to about 80%, from about 70% to about 80%, from about 70% to about 75%, from about 75% to about 80%, or any range or subrange therebetween. In aspects, the predetermined temperature can be about 20° C. or more, about 30° C. or more, about 40° C. or more, about 50° C. or more, about 60°

C. or more, about 80° C. or less, about 70° C. or less, about 60° C. or less, about 40° C. or less, or about 30° C. or less. In aspects, the predetermined temperature can be in a range from about 20° C. to about 80° C., from about 30° C. to about 80° C., from about 30° C. to about 70° C., from about 40° C. to about 70° C., from about 50° C. to about 70° C., from about 50° C. to about 60° C., from about 60° C. to about 70° C., or any range or subrange therebetween. In aspects, the predetermined temperature can be in a range from about 20° C. to about 70° C., from about 20° C. to about 60° C., from about 20° C. to about 40° C., from about 20° C. to about 30° C., from about 30° C. to about 40° C., or any range or subrange therebetween. In aspects, the predetermined period of time can be about 30 minutes or more, about 1 hour or more, about 1.5 hours or more, about 2 hours or more, about 168 hours or less, about 24 hours or less, about 12 hours or less, about 8 hours or less, about 4 hours or less, or about 2 hours or less. In aspects, the predetermined period of time can be in a range from about 30 minutes to about 168 hours, from about 30 minutes to about 24 hours, from about 30 minutes to about 12 hours, from about 1 hour to about 12 hours, from about 1 hour to about 8 hours, from about 1 hour to about 4 hours, from about 1.5 hours to about 4 hours, from about 2 hours to about 4 hours, or any range or subrange therebetween. In aspects, the predetermined period of time can be in a range from about 30 minutes to about 8 hours, from about 30 minutes to about 4 hours, from about 30 minutes to about 2 hours, from about 1 hour to about 2 hours, from about 1.5 hours to about 2 hours, or any range or subrange therebetween. Without wishing to be bound by theory, increasing a concentration of hydroxyl functional groups on the surfaces to be contacted in step 1107 can increase the resulting bond strength. Further, providing a relative humidity from about 60% to about 90% or a subrange therebetween can form multilayers of water on the surfaces without forming droplets.

Figure 15:
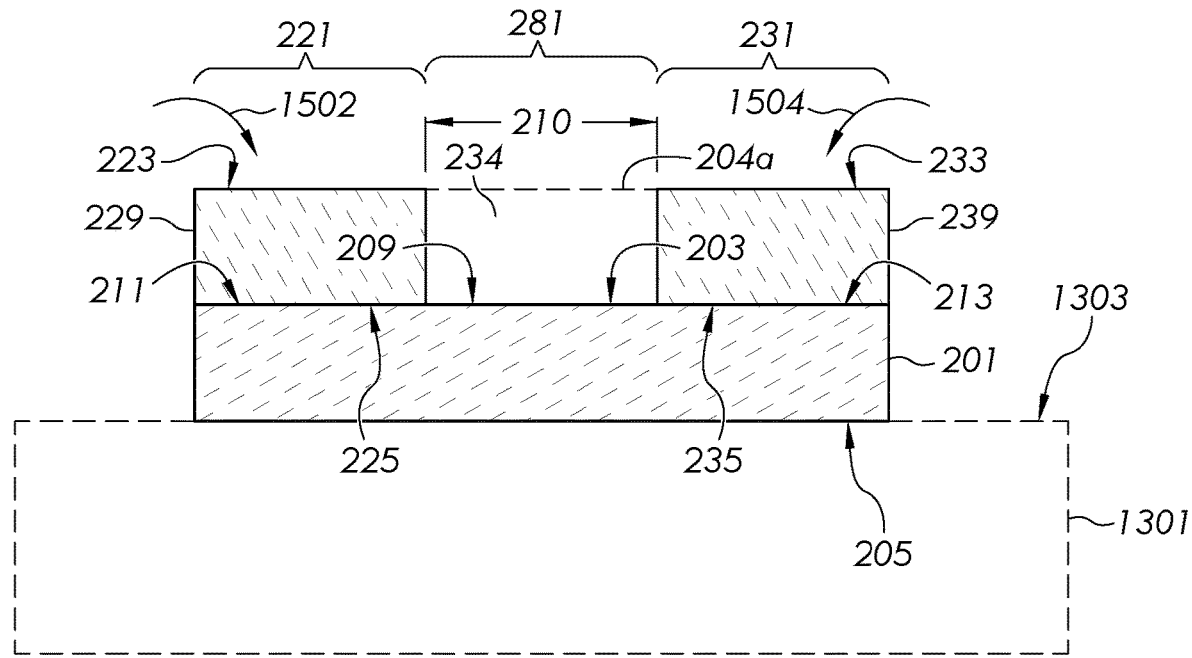

After step 1105, as shown in FIG. 15, methods can proceed to step 1107 comprising disposing the first portion 229 over the first major surface 203 of the substrate layer 201, as shown by arrow 1502, and disposing the second portion 239 over the first major surface 203 of the substrate layer 201, as shown by arrow 1504, such that the inner edge of the first portion 229 and the inner edge of the second portion 239 are separated by a minimum distance 210. In aspects, the minimum distance 210 can be within one or more of the ranges discussed above for the minimum distance 210. In aspects, disposing the first portion 229 over the first major surface 203 can comprise contacting the first major surface 203 of the substrate layer 201 with the first inner surface area 225 of the first portion 229. In further aspects, an initial bond can be formed between the first portion 229 and the substrate layer 201, for example, due to electrostatic forces, van der Waals forces, and/or dynamic hydrogen bonding between the first major surface 203 of the substrate layer 201 with the first inner surface area 225 of the first portion 229. In further aspects, the initial bond may be weak enough to be overcome by hand. In further aspects, the surface roughness and/or the peak-to-valley measurement of the first major surface 203 and/or the first inner surface area 225 can be within one or more of the corresponding ranges discussed above. In aspects, disposing the second portion 239 over the first major surface 203 can comprise contacting the first major surface 203 of the substrate layer 201 with the second inner surface area 235 of the second portion 239. In further aspects, an initial bond can be formed between the second portion 239 and the substrate layer 201, for example, due to electrostatic forces, van der Waals forces, and/or dynamic hydrogen bonding between the first major surface 203 of the substrate layer 201 with the second inner surface area 235 of the second portion 239. In further aspects, the surface roughness and/or the peak-to-valley measurement of the first major surface 203 and/or the second inner surface area 235 can be within one or more of the corresponding ranges discussed above. Providing surfaces comprising low surface roughness and/or peak-to-valley measurements can facilitate bonding of the first portion and/or the second portion to the substrate layer.

In aspects, steps 1105 and/or 1107 can occur in a cleanroom environment. For example, steps 1105 and/or 1107 can occur following Class 100 and/or Class 1000 cleanroom protocols. Providing a cleanroom environment for between contacting the substrate layer with the hydroxide-containing solution and disposing the first portion and/or the second portion over the first major surface of the substrate layer can facilitate bonding of the first portion and/or the second portion to the substrate layer as well as reduce the incidence of optical distortions, for example, by avoiding contamination of the surface with particles or other materials that can interfere with the interface between the surfaces to be bonded.

After step 1107, methods can proceed to step 1117 comprising removing the carrier substrate 1301. In aspects, the carrier substrate 1301 can be removed from the substrate layer 201 by physically pulling and/or sliding the first major surface 203 relative to the carrier major surface 1303. In aspects, the carrier substrate 1301 can be removed by inserting a material, for example, a razor blade, a string, or a wire between the first major surface 203 and the carrier major surface 1303.

Figure 16:
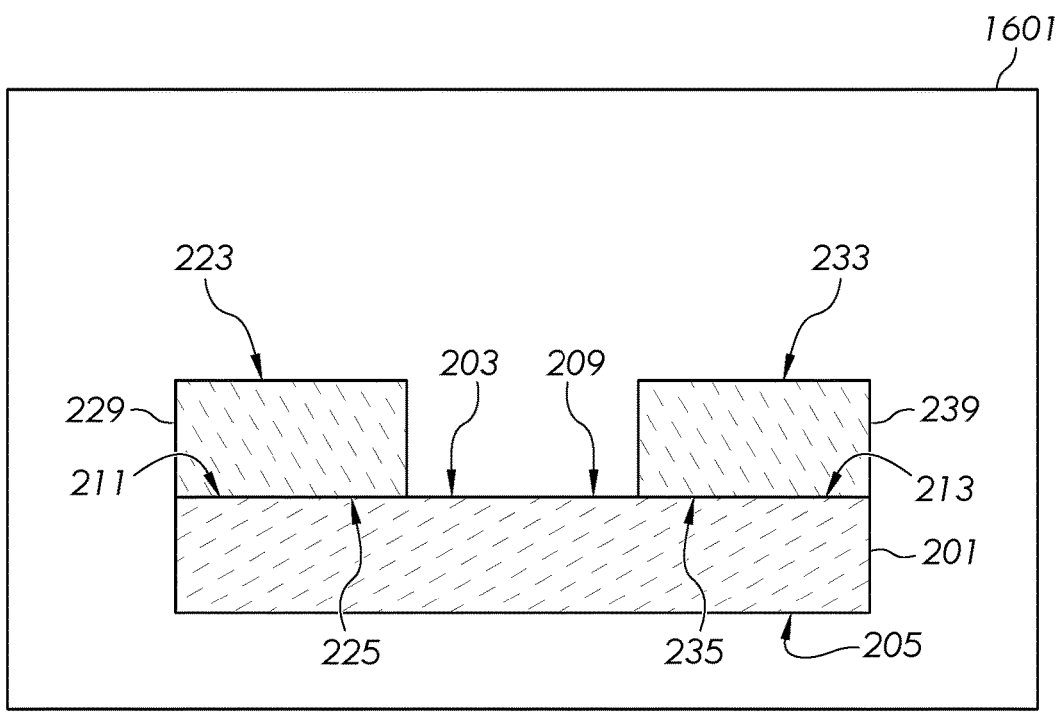

After step 1107 or 1117, methods can proceed to step 1109 comprising heating the substrate layer 201, the first portion 229, and the second portion 239 at a first temperature for a first period of time. As used herein, heating a material "at a first temperature" means that the material is placed in an environment (e.g., an oven) maintained at the first temperature. In aspects, as shown in FIG. 16 step 1109 can comprise heating the substrate layer 201, the first portion 229, and the second portion 239 by placing them in an oven 1601 maintained at the first temperature for the first period of time. Without wishing to be bound by theory, a temperature of at least 100° C. can be required to substantially dehydrate the substrate layer 201, the first portion 229, and the second portion 239. Without wishing to be bound by theory, a temperature above 400° C. can cause condensation reactions to occur that can covalently and permanently bond (e.g., fuse) the substrate layer 201, the first portion 229, and/or the second portion 239 together. In aspects, the temperature can be about 100° C. or more, about 120° C. or more, about 140° C. or more, about 150° C. or more, about 400° C. or less, about 300° C. or less, about 250° C. or less, about 200° C. or less, about 180° C. or less, or about 170° C. or less. In aspects, the temperature can be in a range from about 100° C. to about 400° C., from about 100° C. to about 300° C., from about 120° C. to about 300° C., from about 120° C. to about 250° C., from about 140° C. to about 250° C., from about 140° C. to about 200° C., from about 150° C. to about 200° C., from about 150° C. to about 180° C., from about 150° C. to about 170° C., or any range or subrange therebetween. In aspects, the period of time can be about 1 hour or more, about 2 hours or more, about 3 hours or more, about 4 hours or more, about 24 hours or less, about 12 hours or less, about 9 hours or less, about 8 hours or less, or about 7 hours or less. In aspects, the period of time can be in a range from about 1 hour to about 24 hours, from about 1 hour to about 12 hours, from about 2 hours to about 12 hours, from about 2 hours to about 9 hours, from about 3 hours to about 9 hours, from about 3 hours to about 8 hours, from about 4 hours to about 8 hours, from about 4 hours to about 7 hours, from about 5 hours to about 7 hours, or any range or subrange therebetween. Exemplary aspects of step 1109 comprises heating the substrate layer 201, the first portion 229, and the second portion 239 in an oven 1601 maintained at a temperature of 160° C. for 5 hours or at a temperature of 200° C. for 3 hours. Heating the substrate layer 201, the first portion 229, and the second portion 239 a temperature between 100° C. and 400° C. (e.g., about 160° C.) for from about 1 hour to about 24 hours (e.g., about 5 hours) can facilitate strong bonding, for example via formation of hydrogen bond networks across the interface(s), without fusing the materials together permanently. After step 1109, the foldable substrate 206 comprising the substrate layer 201, the first portion 229, and the second portion 239 can comprise a bond strength between the substrate layer 201 and the first portion 229 and/or between the substrate layer 201 and the second portion 239 within one or more of the ranges discussed above for the bond strength.

In further aspects, step 1109 can comprise heating the substrate layer 201, the first portion 229, and the second portion 239 at the first temperature for the first period of time followed by a second temperature for a second period of time. In even further aspects, the second temperature can be within one or more of the temperature ranges discussed above for the first temperatures (e.g., from about 100° C. to about 300° C.). In even further aspects, the second temperature can be less than the first temperature, for example, by about 25° C. or more, about 50° or more, about 75° or more, about 200° C. or less, about 150° C. or less, or about 100° C. or less. In still further aspects, the second temperature can be less than the first temperature by an amount in a range from about 25° C. to about 200° C., from about 25° C. to about 150° C., from about 50° C. to about 150° C., from about 50° C. to about 100° C., from about 75° C. to about 100° C., or any range or subrange therebetween. In even further aspects, the second period of time can be within one or more of the time ranges discussed above for the first period of time (e.g., from about 2 hours to about 12 hours). In even further aspects, the second period of time can be longer than the first period of time. An exemplary aspect of step 1109 comprising two different temperatures comprises heating the substrate layer 201, the first portion 229, and the second portion 239 in an oven 1601 maintained at 275° C. for 1 hour followed by 175° C. for 5 hours.

In even further aspects, step 1109 can comprise heating the substrate layer 201, the first portion 229, and the second portion 239 at the first temperature for the first period of time followed by the second temperature for the second period of time and then a third temperature for a third period of time. In even further aspects, the third temperature can be within one or more of the ranges discussed above for the first temperature while being less than the first temperature. In still further aspects, in addition to the second temperature being less than the first temperature, the third temperature can be less than the second temperature, for example, by an amount within one or more of the ranges discussed above for an amount that the second temperature is less than the first temperature by. In even further aspects, the third period of time can be within one or more of the times discussed above for the first period of time. In still further aspects, in addition to the second period of time being longer than the first period of time, the third period of time can be longer than the second period of time. An exemplary aspect of step 1109 comprising three different temperatures comprises heating the substrate layer 201, the first portion 229, and the second portion 239 in an oven 1601 maintained at 275° C. for 1 hour followed by 200° C. for 3 hours and then 175° C. for 5 hours.

Figure 17:
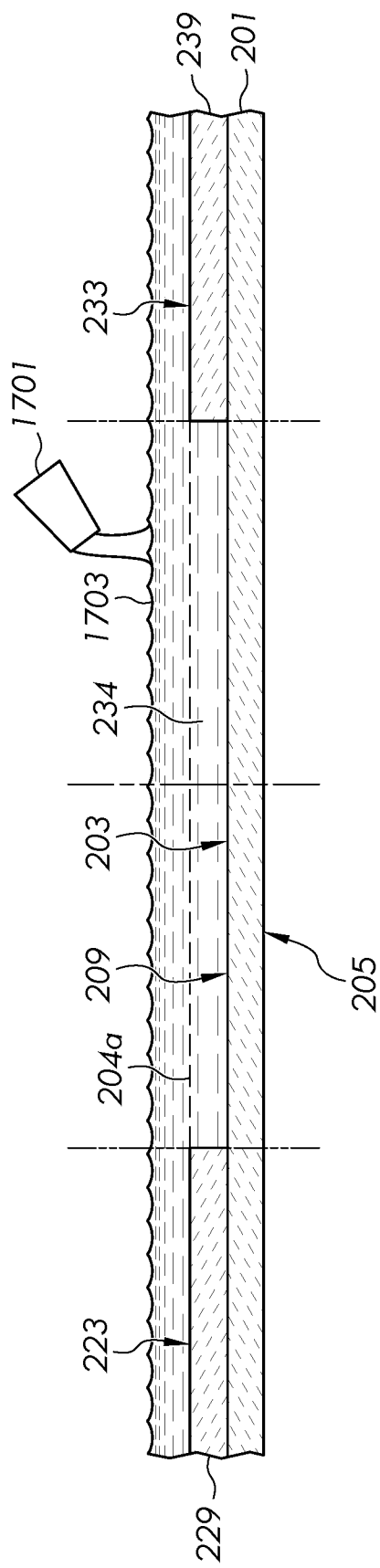
Figure 18:
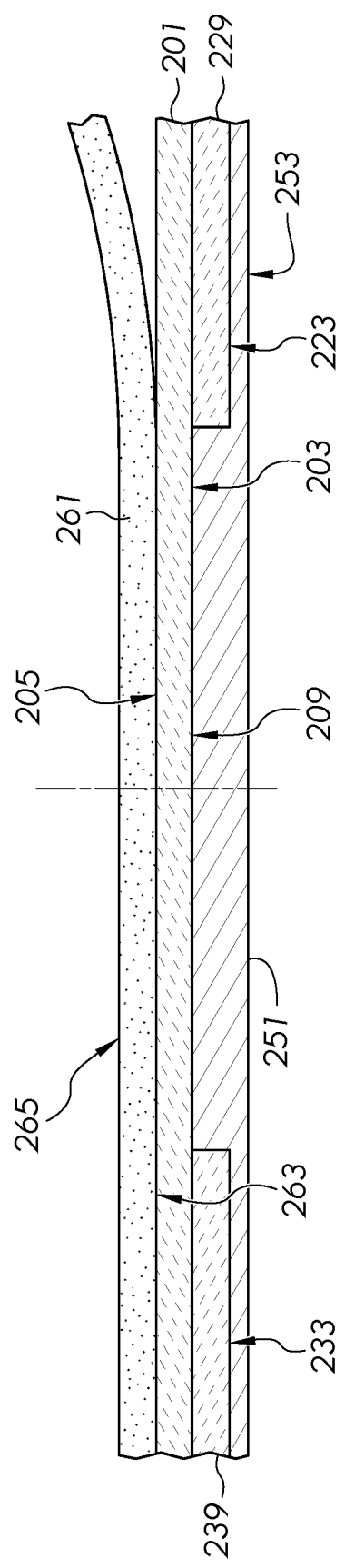

After step 1109, as shown in FIGS. 17-21, methods can proceed to step 1111, which can comprise disposing one or more of a coating 251, a polymer-based portion 241, and/or an adhesive over the foldable substrate 206 comprising the substrate layer 201. In aspects, as shown in FIGS. 17-18, step 1111 can comprise disposing a coating 251 over the first major surface 203 of the substrate layer 201, the first outer surface area 223 of the first portion 229, and/or the second outer surface area 233 of the second portion 239. In further aspects, as shown in FIG. 17, disposing a coating 251 can comprise dispensing a first liquid 1703 from a container 1701 (e.g., conduit, flexible tube, micropipette, or syringe). In even further aspects, the first liquid 1703 can fill the recess 234. In even further aspects, as shown, the first liquid 1703 can cover the first outer surface area 223 of the first portion 229, and/or the second outer surface area 233 of the second portion 239. In aspects, the first liquid 1703 may comprise a coating precursor, a solvent, particles, nanoparticles, and/or fibers. In aspects, the coating precursor can comprise, without limitation, one or more of a monomer, an accelerator, a curing agent, an epoxy, and/or an acrylate. In aspects, the solvent for the adhesive precursor may comprise a polar solvent (e.g., water, an alcohol, an acetate, acetone, formic acid, dimethylformamide, acetonitrile, dimethyl sulfoxone, nitromethane, propylene carbonate, poly(ether ether ketone)) and/or a non-polar solvent (e.g., pentane, 1,4-dioxane, chloroform, dichloromethane, diethyl ether, hexane, heptane, benzene, toluene, xylene). The first liquid 1703 can be cured to form a coating 251, as shown in FIG. 18. Curing the first liquid 1703 can comprise heating the first liquid 1703, irradiating the first liquid 1703 with ultraviolet (UV) radiation, and/or waiting a predetermined amount of time (e.g., from about 30 minutes to 24 hours, from about 1 hour to about 8 hours). In aspects, another method (e.g., chemical vapor deposition (CVD) (e.g., low-pressure CVD, plasma-enhanced CVD), physical vapor deposition (PVD) (e.g., evaporation, molecular beam epitaxy, ion plating), atomic layer deposition (ALD), sputtering, spray pyrolysis, chemical bath deposition, sol-gel deposition) may be used to form the coating 251. In aspects, although not shown, the coating 251 can be disposed in the recess 234 (e.g., fill the recess 234) without contacting the first outer surface area 223 of the first portion 229 and/or the second outer surface area 233 of the second portion 239. In aspects, as shown in FIG. 18, step 1111 can further comprise disposing an adhesive layer 261 over the second major surface 205 of the substrate layer 201, for example, to produce the foldable apparatus 101 shown in FIG. 2.

In aspects, as shown in FIG. 19, step 1111 can comprise disposing an adhesive layer (e.g., adhesive layer 261) over the first major surface 203 of the substrate layer 201, the first outer surface area 223 of the first portion 229, and/or the second outer surface area 233 of the second portion 239, for example, by dispensing an adhesive liquid 1903 from a container 1901 (e.g., conduit, flexible tube, micropipette, or syringe) and then curing the adhesive liquid 1903 to form the adhesive layer. In further aspects, the adhesive liquid 1903 can fill the recess 234. In even further aspects, as shown, the adhesive liquid 1903 can cover the first outer surface area 223 of the first portion 229, and/or the second outer surface area 233 of the second portion 239. In aspects, the adhesive liquid 1903 can comprise an adhesive precursor, a solvent, particles, nanoparticles, and/or fibers. In aspects, the adhesive precursor can comprise, without limitation, one or more of a monomer, an accelerator, a curing agent, an epoxy, a silicone, and/or an acrylate. The adhesive liquid 1903 can be cured to form the adhesive layer 261, for example, to produce a foldable apparatus resembling FIG. 3. Curing the adhesive liquid 1903 can comprise heating the adhesive liquid 1903, irradiating the adhesive liquid 1903 with ultraviolet (UV) radiation, and/or waiting a predetermined amount of time (e.g., from about 30 minutes to 24 hours, from about 1 hour to about 8 hours). In aspects, although not shown, disposing the adhesive layer can comprise disposing one or more sheets of an adhesive material similar to the adhesive layer 261 shown in FIG. 18. For example, there can be an integral interface between the one or more sheets comprising the adhesive layer, which can reduce (e.g., avoid) optical diffraction and/or optical discontinuities as light travels between the sheets since the one or more sheets can include substantially the same index of refraction. In aspects, although not shown, the adhesive layer 261 can be disposed in the recess 234 (e.g., fill the recess 234) without contacting the first outer surface area 223 of the first portion 229 and/or the second outer surface area 233 of the second portion 239.

In aspects, as shown in FIGS. 20-21, step 1111 can comprise disposing a polymer-based portion 241 over the first major surface 203 of the substrate layer 201, the first outer surface area 223 of the first portion 229, and/or the second outer surface area 233 of the second portion 239, for example, by dispensing a second liquid 2003 from a container 2001 (e.g., conduit, flexible tube, micropipette, or syringe) and then curing the second liquid 2003 to form the adhesive layer. In further aspects, the second liquid 2003 can fill the recess 234. In even further aspects, although not shown, the second liquid 2003 can cover the first outer surface area 223 of the first portion 229, and/or the second outer surface area 233 of the second portion 239. In aspects, the second liquid 2003 can comprise a precursor of the polymer-based portion, a solvent, particles, nanoparticles, and/or fibers. In aspects, the coating precursor can comprise, without limitation, one or more of a monomer, an accelerator, a curing agent, a urethane, a silicone, an epoxy, and/or an acrylate. The second liquid 2103 can be cured to form the polymer-based portion 241, for example, to produce a foldable apparatus resembling FIG. 4. Curing the second liquid 2003 can comprise heating the second liquid 2003, irradiating the second liquid 2003 with ultraviolet (UV) radiation, and/or waiting a predetermined amount of time (e.g., from about 30 minutes to 24 hours, from about 1 hour to about 8 hours). In aspects, as shown in FIG. 21, the polymer-based portion 241 can be disposed in the recess 234 (e.g., fill the recess 234) without contacting the first outer surface area 223 of the first portion 229 and/or the second outer surface area 233 of the second portion 239. In aspects, as shown in FIG. 21, step 1111 can further comprise disposing an adhesive layer 261 over the second major surface 205 of the substrate layer 201, for example, to produce the foldable apparatus 401 shown in FIG. 4.

After step 1109 or 1111, methods can be complete at step 1113. In aspects, a release liner (e.g., see release liner 271 in FIG. 2) or a display device (e.g., see display device 307 in FIG. 3) may be disposed on the first contact surface 263 of the adhesive layer 261. At the end 1113 of the flow chart in FIG. 11, the foldable apparatus is complete.

Figure 11:
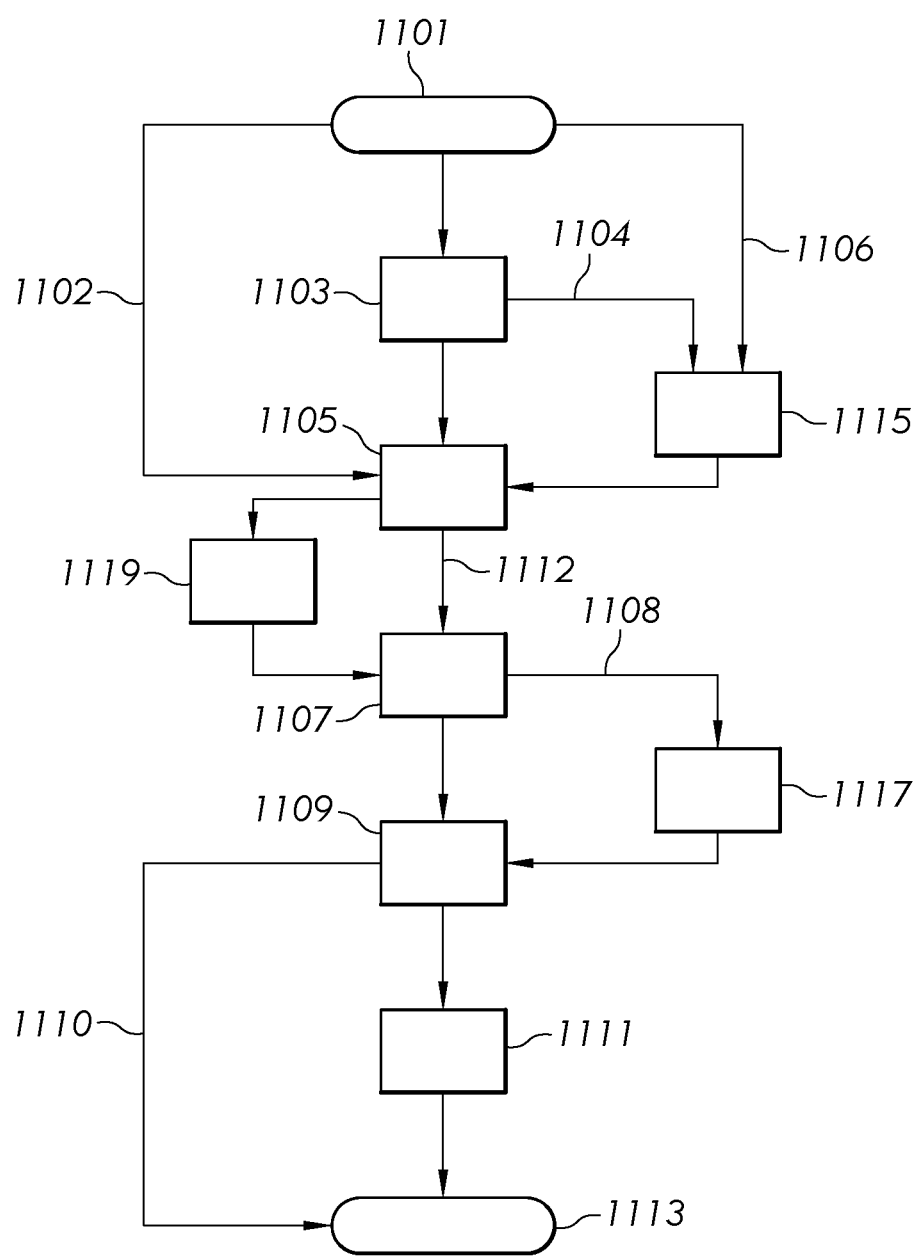
FIG. 11 is a flow chart illustrating example methods making foldable apparatus in accordance with aspects of the disclosure.

In aspects, methods of making a foldable apparatus in accordance with aspects of the disclosure can proceed along steps 1101, 1103, 1105, 1119, 1107, 1117, 1109, 1111, and 1113 of the flow chart in FIG. 11 sequentially. In aspects, arrow 1102 can be followed from step 1101 to step 1105 omitting step 1103, for example, when the substrate layer 201 is already chemically strengthened at the end of step 1101 or the substrate layer 201 is not to be chemically strengthened. In aspects, arrow 1106 can be followed from step 1101 to step 1115 omitting step 1103 and adding step 1115, for example, when the substrate layer 201 is to be disposed over a carrier substrate 1301 but it is already chemically strengthened at the end of step 1101 or the substrate layer 201 is not to be chemically strengthened. In aspects, arrow 1104 can be followed from step 1103 to step 1115, for example, if the substrate layer 201 is to be disposed over a carrier substrate 1301. In aspects, arrow 1112 can be followed from step 1105 to step 1107, for example, if the first portion 229 is to be disposed on the substrate layer 201 without maintaining the substrate layer 201 at a predetermined relative humidity beforehand. In further aspects, arrow 1108 can be followed from step 1107 to step 1117, for example, to remove the carrier substrate 1301 that the substrate layer 201 is disposed over from step 1115 before heating the substrate layer 201 in step 1109. In aspects, arrow 1110 can be followed from step 1109 to step 1113 omitting step 1111, for example if the foldable substrate 206 is to resemble foldable apparatus 501 without a coating 251, an adhesive layer 261, and/or a polymer-based portion 241. In aspects, between step 1105 and step 1109 can occur in a cleanroom environment of class 100 or greater. Any of the above options may be combined to make a foldable apparatus in accordance with aspects of the disclosure.

EXAMPLES

Various aspects will be further clarified by the following examples. Pen Drop Test results for Example A and Comparative Examples B-C are presented in Table 1. Bond strength and changes in compressive stress during heating are presented for the different heating conditions for Examples A and D-H in Table 2. Examples I-K were subject to different environmental conditions before the first portion and second portion were disposed on the substrate layer, which properties reported in Table 3. Examples A-K all comprised a glass-based material (Composition 1 having a nominal composition in mol % of: 63.6 $SiO_2$; 15.7 $Al_2O_3$; 10.8 $Na_2O$; 6.2 $Li_2O$; 1.16 ZnO; 0.04 $SnO_2$; and 2.5 $P_2O_5$). Unless otherwise states, the relative humidity of the environment was about 25%.

Example A comprised a substrate layer comprising the glass-based material comprising a layer thickness of 30 µm, a first portion comprising the glass-based material comprising a thickness of 100 µm, and a second portion comprising a glass-based material (Composition 1) comprising a thickness of 100 µm. The substrate layer was chemically strengthened in 100% $KNO_3$ molten salt solution at 400° C. for 3 hours. The first portion and the second portion were unstrengthened. In a cleanroom following class 1000 protocols, the substrate layer, first portion, and the second portion were cleaned using RCA SC-1, which comprised ammonium hydroxide and a pH of 10.6 and a temperature of 60° C. for 10 minutes with megasonication, rinsed with DI water for 8 minutes at 25° C., and then subject to a Marangoni dry process comprising rinsing with isopropyl alcohol and then dry nitrogen for 14 minutes. While still in the cleanroom, the first portion was disposed on the first major surface and the second portion was disposed on the second major surface such that the first portion and the second portion were separated by a minimum distance of 20 mm to form the foldable substrate. The foldable substrate was heated in an oven maintained at 160° C. for 5 hours.

Comparative Example B comprised a 30 μm thick piece of glass-based material (Composition 1) that was chemically strengthened in 100% KNO₃ molten salt solution at 400° C. for 3 hours, like the substrate layer of Example A. Comparative Example C comprised a 100 μm thick piece of glass-based material (Composition 1) that was unstrengthened.

TABLE 1

Pen Drop Test Results of Example A and Comparative Examples B-C

| Example | Median Pen Drop Height (cm) | # samples | Range of Pen Drop Heights (cm) |
|---|---|---|---|
| A | 56 | 40 | 40-80 |
| B | 22 | 10 | 14-28 |
| C | 14 | 100 | 4-28 |

Table 1 presents the result of the Pen Drop Test for Example A and Comparative Examples B-C. For Example A, pen drops occurred in the first region and/or the second region but not the central region with the pen configured to contact the unstrengthened glass-based material. Comparative Example C comprised a median pen drop height of 14 cm based on 100 samples that had pen drop heights from 4 cm to 28 cm. Comparative Example B comprised a median pen drop height of 22 cm based on 10 samples that had pen drop heights from 14 cm to 28 cm. Comparative Example B that was unstrengthened and comprised a thickness of 100 μm comprised a median pen drop height that was 8 cm (57%) greater than the median pen drop height of Comparative Example B that was chemically strengthened and comprised a thickness of 30 μm. Example A comprised a median pen drop height of 56 cm based on 40 samples that had pen drop heights from 40 cm to 80 cm. In the regions of Example A test, Example A essentially comprises a direct bond between Comparative Example B and Comparative Example C. The median pen drop height of Example A is greater than either of Comparative Examples B-C and is greater than the sum of Comparative Examples B-C. Further, the lowest pen drop height for Example A is about double (182% for Comparative Example B, 285% for Comparative Example C) the median pen drop height of Comparative Examples B-C.

Example A can achieve an effective bend radius of 1.5 mm. Further, Example A can withstand the Static Bend test (e.g., 10 days at 60° C. and 90% relative humidity) at an effective bend radius of 1.5 mm. Moreover, Example A can withstand the Cyclic Bend test. Indeed, Example A can withstand more than 80,000 cycles between a parallel palate distance of 30 mm and 3 mm conducted at 50 μm/second. A visual inspection of Example A did not reveal any optical distortions. Likewise, a shadowgraph of Example A did not reveal any defects (e.g., bubbles, particles) at the interface between the glass-based materials.

Examples D-H were prepared identically to Example A except that the "Thermal Treatment" stated in Table 2 was applied instead of heating the foldable substrate in an oven maintained at 160° C. for 5 hours. The "Bond Strength" reported in Table 2 is the median value (e.g., B50 value) of 30 samples created under the stated thermal treatment. The maximum compressive stress of the substrate layer was measured before and after the thermal treatment using a surface stress meter (FSM-6000) to determine the "Compressive Stress Decrease" shown in Table 2. As shown in Table 2, the thermal treatment for Examples D-G comprised heating to a single temperature for at least 1 hour, and the bond strength of Examples D-G increased as the temperature of the thermal treatment was increased. However, Example H comprised heating to three temperatures with the highest temperature first and the lowest temperature third, and Example H comprised a greater bond strength than Examples D-G.

TABLE 2

Properties of Examples A and D-H

| Example | Bond Strength (J/m²) | Compressive Stress Decrease (%) | Thermal Treatment |
|---|---|---|---|
| D | 0.883 | 1.2 | 200° C. for 3 hours |
| E | 1.007 | 24.2 | 250° C. for 8 hours |
| F | 1.094 | 17.6 | 275° C. for 1 hour |
| G | 0.916 | 25.9 | 300° C. for 1 hour |
| H | 1.303 | 5.7 | 250° C. for 1 hour; 200° C. for 3 hours; 175° C. for 5 hours |

As shown in Table 2, Examples E-G comprised decreases in compressive stress from about 17% to about 26%. In contrast, Example D comprised a decrease in compressive stress of 1.2%. Without wishing to be bound by theory, the decrease in compressive stress is driven by diffusion of the ions exchanged into the foldable substrate, which follows an Arrhenius relationship. Consequently, lower temperatures and shorter time at a given temperature results in lower decreases in compressive stress. Therefore, it is expected that bond strengths may increase by extending the thermal treatment of Examples F-G from 1 hour to 3 hours; however, the compressive stress decrease is also expected to increase. Even though the thermal treatment of Example H comprises a maximum temperature comparable to that of Example E, Example H comprises a decrease in compressive stress of 5.7%, which is the lowest of Examples E-H.

Examples I-J were prepared identically to Example A except that the samples were placed in different environments for 1 hour between being treated with the SC1 solution and when the first portion and the second portion were disposed on the substrate layer. Example K was prepared identically to Example A except that water was misted from a spray bottle on the first major surface of the substrate layer before the first portion and the second portion were disposed on the first major surface of the substrate layer. Examples I-K were visually examined using shadowgraphy to look for bubbles or other defects at the interface both before and after the thermal treatment. As shown in Table 3, bubbles were visible in Example I before the thermal treatment that persisted after the thermal treatment. Qualitatively, Example I was deemed to have low adhesion between the first portion and the substrate layer. As shown in Table 3, Example J was visually clear both before and after the thermal treatment. Qualitatively, Example J was deemed to have high adhesion between the first portion and the substrate layer. A shown in Table 3, Example K was initially visually clear; however, after the thermal treatment, bubbles were visible and portions of the substrate layer were broken. Without wishing to be bound by theory, Example K broke during the thermal treatment due to steam pockets that formed from water droplets expanding during the thermal treatment. Without wishing to be bound by theory, a monolayer or less of water may be present on a surface of the substrate layer for low relative humidity (e.g., less than about 30%), which can lead to low adhesion due to the low density of hydroxyl groups. Without wishing to be bound by theory, multilayers of water may be present on the surface of the substrate layer without forming droplets when the relative humidity is high (e.g., from about 60% to about 90%, from about 70% to about 80%), which leads to high adhesion because of the high density of hydroxyl groups.

TABLE 3

Properties of Examples I-K

| Example | Relative Humidity | Appearance (pre-thermal treatment) | Appearance (post-thermal treatment) | Adhesion |
|---|---|---|---|---|
| I | 25% | Bubbles | Bubbles | Low |
| J | 75% | Clear | Clear | High |
| K | Misting | Clear | Bubbles and breakage | N/A |

The above observations can be combined to provide foldable apparatus and foldable substrates comprising a low effective minimum bend radius, high impact resistance, low closing force, increased durability, and reduced fatigue. Foldable apparatus comprising foldable substrates and foldable substrates can comprise a substrate layer, a first portion, and a second portion. The portions can comprise glass-based portions and/or ceramic-based portions, which can provide good dimensional stability, reduced incidence of mechanical instabilities, good impact resistance, and/or good puncture resistance. In aspects, the first portion and/or the second portion can comprise glass-based portions and/or ceramic-based portions comprising one or more compressive stress regions, which can further provide increased impact resistance and/or increased puncture resistance. In aspects, the first portion and/or the second portion may be substantially unstrengthened (e.g., low or substantially no compressive stress region associated with chemically strengthening of the corresponding portion), which can increase pen drop performance of the foldable substrate. The substrate layer can comprise a glass-based portion and/or a ceramic-based portion, which can provide good dimensional stability, reduced incidence of mechanical instabilities, good impact resistance, and/or good puncture resistance. The substrate layer can comprise a glass-based substrate and/or a ceramic-based substrate comprising one or more compressive stress regions, which can further provide increased impact resistance and/or increased puncture resistance. By providing a foldable substrate comprising a glass-based material and/or ceramic-based material, the foldable substrate can also provide increased impact resistance and/or puncture resistance while simultaneously facilitating good folding performance. In aspects, the substrate thickness can be sufficiently large (e.g., from about 80 micrometers (microns or μm) to about 2 millimeters) to further enhance impact resistance and puncture resistance. Providing foldable substrates comprising a central region comprising a layer thickness that is less than a substrate thickness can enable small effective minimum bend radii (e.g., about 10 millimeters or less) based on the reduced thickness in the central region.

In aspects, the foldable apparatus and/or foldable substrates can comprise a recess, for example, a first central surface area recessed from a first outer surface area by a first distance. Providing a recess can enable the layer thickness to be less than the substrate thickness. Controlling properties of a first material positioned in a recess and a second material positioned in a second recess can control the position of a neutral axis of the foldable apparatus and/or foldable substrates, which can reduce (e.g., mitigate, eliminate) the incidence of mechanical instabilities, apparatus fatigue, and/or apparatus failure.

In aspects, the foldable apparatus and/or foldable substrates can comprise a first transition portion attaching the central region to the first region and/or a second transition region attaching the central region to the second region. Providing transition regions with continuously increasing thicknesses can reduce stress concentration in the transition regions and/or avoid optical distortions. Providing a sufficient length of the transition region(s) (e.g., about 1 mm or more) can avoid optical distortions that may otherwise exist from an abrupt, stepped change in thickness of the foldable substrate. Providing a sufficiently small length of the transition regions (e.g., about 5 mm or less) can reduce the amount of the foldable apparatus and/or foldable substrates having an intermediate thickness that may have reduced impact resistance and/or reduced puncture resistance.

Apparatus and methods of aspects of the disclosure and reduce (e.g., mitigate, eliminate) the incidence of mechanical instabilities, apparatus fatigue, and/or apparatus failure by avoiding a difference between an expansion of different portions of the foldable apparatus and/or the foldable substrates as a result of chemically strengthening the entire foldable substrate. Rather, in aspects, the substrate layer can be chemically strengthened (e.g., prior to assembly with the first portion and the second portion) while the first portion and/or the second portion can be substantially unstrengthened. In aspects, the substrate layer, the first portion, and/or the second portion can be chemically strengthened prior to assembly of the foldable substrate and/or the foldable apparatus. Controlling the difference between the expansion of different portions after assembly can reduce the chemical strengthening induced strain between portions of the foldable apparatus and/or the foldable substrates that can facilitate a greater fold-induced strain before the foldable apparatus and/or foldable substrates reach a critical buckling strain (e.g., onset of mechanical instabilities). Further, reducing mechanical instabilities and/or the difference between the substrate layer and the first portion and/or the second portion can reduce optical distortions, for example, caused by strain within the foldable apparatus and/or foldable substrate from such difference(s).

Directly bonding the first portion to the substrate layer and/or directly bonding the second portion to the substrate layer can provide increased impact resistance, increased puncture resistance, reduced optical distortions, and reduced thickness of the foldable substrate and/or foldable apparatus. Direct bonding can allow the first portion and/or second portion to more directly reinforce the mechanical properties, impact properties, and/or puncture resistance of the substrate layer by having an inner surface area of the first portion and/or the first portion directly contact a surface of the substrate layer. Direct bonding can avoid (e.g., eliminate) the use of an adhesive layer between the first portion and the substrate layer and/or between the second portion and the substrate layer, which reduces the number of interfaces in the foldable substrate and can reduce the incidence of optical distortions. Further, the incidence of optical distortions through direct bonding, which can reduce the incidence of bubbles and other defects by providing a solid connection between the bonded surfaces. Direct bonding can reduce the overall thickness of the foldable substrate and/or foldable apparatus, for example, by avoiding (e.g., eliminating) the use of an adhesive layer between the first portion and the substrate layer and/or between the second portion and the substrate layer. Further, properties of a thinner foldable substrate made using direct bonding can have properties comparable to a thicker foldable substrate generated through other means.

Methods of the disclosure can enable making foldable substrates comprising one or more of the above-mentioned benefits. In aspects, methods of the disclosure can achieve the above-mentioned benefits in a single chemically strengthening step, for example making a foldable substrate comprising a chemically strengthened substrate layer, a substantially unstrengthened first portion, and a substantially unstrengthened second portion or by separately chemically strengthening the substrate layer, first portion, and second portion prior to assembly, either of which can reduce time, equipment, space, and labor costs associated with producing a foldable substrate.

Direct bonding of the first portion and/or the second portion to the substrate layer comprises cleaning at least the surface of the substrate layer to be bonded to provide a low roughness surface that is substantially free of organic materials and particulates, which can produce a strong bond and reduce the incidence of optical distortions. Maintaining the substrate layer, first portion, and/or second portion in a high relative humidity environment (e.g., from about 60% to about 90%, from about 70% to about 80%) can increase a density of hydroxyl groups at the surface, which can increase the resulting bond strength while reducing the incidence of optical distortions. Direct bonding can further comprise disposing the first portion and/or the second portion on the substrate layer such that the first portion and the second portion and separated by a minimum distance that can define a recess, which can enable enhanced folding performance. Direct bonding can further comprise heating the first portion, second portion, and substrate layer for a period of time sufficient to generate a strong bond between the first portion and the substrate layer and between the second portion and the substrate layer. Heating to a temperature in a range from about 150° C. to about 400° C. can enable the formation of strong bonds while avoiding detrimental changes to the foldable substrate for excessive heating (e.g., warping, bonding to the heating apparatus and/or carriers, decomposition, decreased compressive stresses from compressive stress regions extending to deeper depths of compression and/or having deeper associated depths of layer). Providing multiple temperatures in decreasing order can enable a high bond strength while decreasing an extent that the compressive stress of the substrate layer is decreased.

Directional terms as used herein—for example, up, down, right, left, front, back, top, bottom—are made only with reference to the figures as drawn and are not intended to imply absolute orientation.

It will be appreciated that the various disclosed aspects may involve features, elements, or steps that are described in connection with that aspect. It will also be appreciated that a feature, element, or step, although described in relation to one aspect, may be interchanged or combined with alternate aspects in various non-illustrated combinations or permutations.

It is also to be understood that, as used herein the terms "the," "a," or "an," mean "at least one," and should not be limited to "only one" unless explicitly indicated to the contrary. For example, reference to "a component" comprises aspects having two or more such components unless the context clearly indicates otherwise. Likewise, a "plurality" is intended to denote "more than one."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Ranges can be expressed herein as from "about" one particular value, and/or to "about" another particular value. When such a range is expressed, aspects include from the one particular value and/or to the other particular value. Similarly, when values are expressed as approximations, by use of the antecedent "about," it will be understood that the particular value forms another aspect. Whether or not a numerical value or endpoint of a range in the specification recites "about," the numerical value or endpoint of a range is intended to include two aspects: one modified by "about," and one not modified by "about." It will be further understood that the endpoints of each of the ranges are significant both in relation to the other endpoint and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In aspects, "substantially similar" may denote values within about 10% of each other, for example, within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements, or steps of particular aspects may be disclosed using the transitional phrase "comprising," it is to be understood that alternative aspects, including those that may be described using the transitional phrases "consisting" or "consisting essentially of," are implied. Thus, for example, implied alternative aspects to an apparatus that comprises A+B+C include aspects where an apparatus consists of A+B+C and aspects where an apparatus consists essentially of A+B+C. As used herein, the terms "comprising" and "including", and variations thereof shall be construed as synonymous and open-ended unless otherwise indicated.

The above aspects, and the features of those aspects, are exemplary and can be provided alone or in any combination with any one or more features of other aspects provided herein without departing from the scope of the disclosure.

It will be apparent to those skilled in the art that various modifications and variations can be made to the present disclosure without departing from the spirit and scope of the disclosure. Thus, it is intended that the present disclosure cover the modifications and variations of the aspects herein provided they come within the scope of the appended claims and their equivalents.

What is claimed is:
1. A foldable substrate comprising:
a substrate layer comprising a first major surface and a second major surface opposite the first major surface, a layer thickness defined between the first major surface and the second major surface is in a range from about 10 micrometers to about 2 millimeters;
a first portion comprising a first outer surface area and a first inner surface area opposite the first outer surface area, a first thickness defined between the first outer surface area and the first inner surface area is in a range from about 10 micrometers to about 1 millimeter, and the first inner surface area contacting the first major surface; and
a second portion comprising a second outer surface area and a second inner surface area opposite the second outer surface area, a second thickness defined between the second outer surface area and the second inner surface area is in a range from about 10 micrometers to about 1 millimeter, and the second inner surface area contacting the first major surface,
wherein the first portion is spaced apart from the second portion by a minimum distance in a range from about 1 millimeter to about 100 millimeters, and a substrate thickness is defined between the second major surface and the first outer surface area of the first portion, and
wherein the substrate layer, the first portion, and the second portion are each glass-based substrates,
wherein the first portion is directly bonded to the first major surface, and
wherein a bond strength between the first portion and the substrate layer is about 1 Joule per meter squared (J/m$^2$) or more.

2. The foldable substrate of claim 1, wherein the foldable substrate achieves a parallel plate distance of 5 millimeters.

3. The foldable substrate of claim 1, wherein the foldable substrate comprises a minimum parallel plate distance in a range from 2 millimeters to about 10 millimeters.

4. The foldable substrate of claim 1, wherein the foldable substrate can withstand a pen drop height of 40 centimeters or more on the first outer surface area or the second outer surface area.

5. The foldable substrate of claim 1, wherein the substrate layer comprises a first compressive stress region extending to a first depth of compression from the first major surface, the substrate layer comprises a second compressive stress region extending to a second depth of compression from the second major surface, and a first maximum compressive stress of the first compressive stress region is about 500 MegaPascals or more.

6. The foldable substrate of claim 1, wherein the first portion comprises a first unstressed region at the first outer surface area, and the second portion comprises a third unstressed region at the second outer surface area.

7. The foldable substrate of claim 1, wherein the first portion comprises a third compressive stress region extending from the first outer surface area to a third depth of compression in a range from about 15% to about 25% of the first thickness, and the second portion comprises a fifth compressive stress region extending from the second outer surface area to a fifth depth of compression in a range from about 15% to about 25% of the second thickness.

8. The foldable substrate of claim 1, wherein a first region of the first major surface of the substrate layer contacting the first inner surface area comprises a first surface roughness Ra of 1 nanometer or less, and a second region of the first major surface of the substrate layer contacting the second inner surface area comprises a second surface roughness Ra of 1 nanometer or less.

* * * * *